United States Patent [19]

Hayakawa et al.

[11] Patent Number: 4,786,935

[45] Date of Patent: Nov. 22, 1988

[54] LIGHT MEASURING DEVICE

[75] Inventors: Shingo Hayakawa; Shuichi Kiyohara; Masanori Ishikawa, all of Kanagawa, Japan

[73] Assignee: Canon Kabushiki Kaisha, Tokyo, Japan

[21] Appl. No.: 9,995

[22] Filed: Feb. 2, 1987

[30] Foreign Application Priority Data

Feb. 8, 1986 [JP] Japan .................................. 61-026275
Feb. 21, 1986 [JP] Japan .................................. 61-037757
Mar. 18, 1986 [JP] Japan .................................. 61-060171

[51] Int. Cl.$^4$ .............................................. G03B 7/08
[52] U.S. Cl. ..................................... 354/432; 356/222
[58] Field of Search ............... 354/429, 430, 431, 432, 354/434, 435; 356/222, 226

[56] References Cited

U.S. PATENT DOCUMENTS 4,394,078 7/1983 Terashita ............................ 354/432
4,527,881 7/1985 Sugawara ........................... 354/432

Primary Examiner—L. T. Hix
Assistant Examiner—David M. Gray
Attorney, Agent, or Firm—Robin, Blecker & Daley

[57] ABSTRACT

A light measuring device comprises light receiving means arranged to divide a photographing field at least into three areas including a middle area located in the middle of the field, a first outer area located on the outer side of the middle area and a second outer area located on the outer side of the first outer area and to obtain luminance information on each of the areas; luminance difference detecting means for obtaining information of a luminance difference between adjacent areas among the plurality of areas from a plurality of luminance information values obtained by the light receiving means; computing means including photometric value computing circuits equivalent to a plurality of computing formulas each of which including as a function at least one of the plurality of luminance information values obtained by the light receiving means; and selection means for selecting one of the photometric value computing circuits of the computing means which is equivalent to one of the computing formulas on the basis of at least one of the plurality of luminance information values obtained by the light receiving means and the luminance difference information obtained by the luminance difference detecting means.

17 Claims, 28 Drawing Sheets

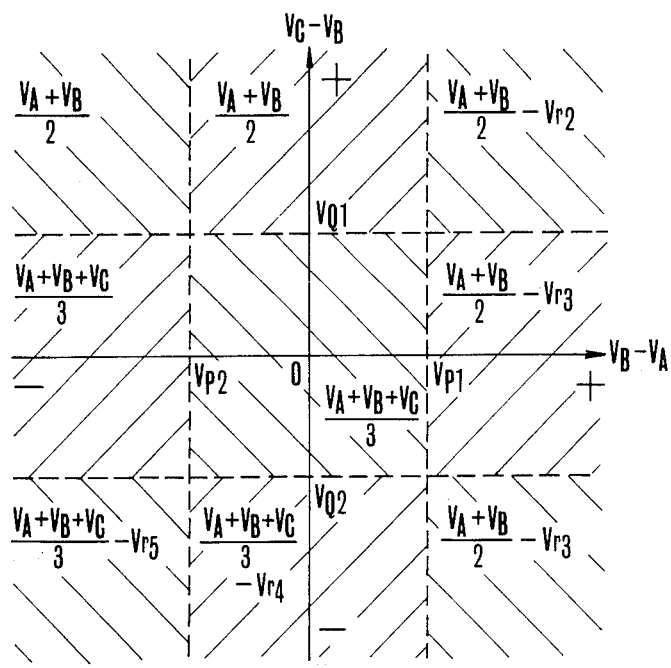
FIG.5(a) Ⅰ $V_C \geq V_{r1}$
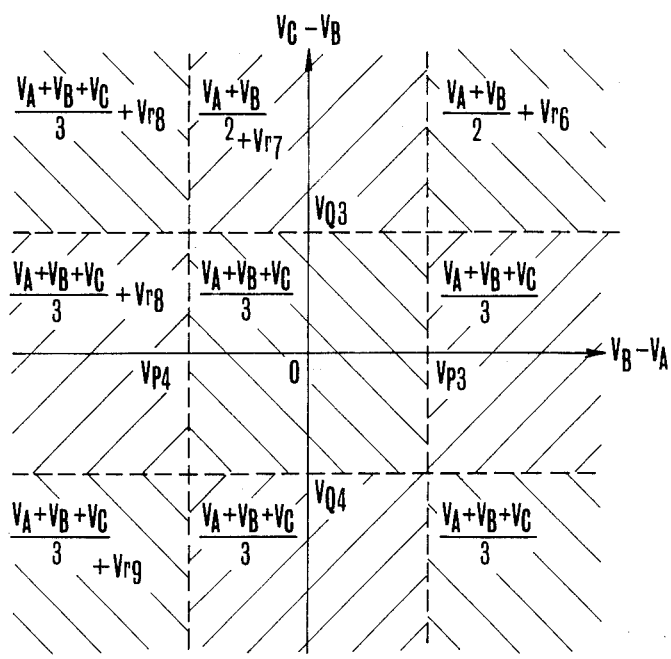
FIG.5(b) Ⅱ $V_C < V_{r1}$ 4,786,935

LIGHT MEASURING DEVICE

BACKGROUND OF THE INVENTION

1. Field of the Invention

This invention relates to a light measuring device of the kind obtaining a photometric value by dividing a photographing field into a plurality of areas and by carrying out various computing operations on the luminance information obtained from each of these areas.

2. Description of the Related Art

Heretofore there have been proposed various light measuring devices of the kind arranged to give an apposite exposure for each photographic picture plane using a plurality of photometric values obtained respectively from a plurality of divided areas of a photographing field. For example, Japanese Utility Model Publication No. SHO 51-9271 has disclosed a light measuring device arranged to give as an appropriate photometric value an arithmetic mean value between the maximum and minimum values of outputs of a plurality of photoelectric elements. However, in the case of this device, an under- or over-exposure tends to result from an excessively bright or dark background.

Meanwhile, Japanese Patent Application Laid-Open No. SHO 55-114918 has disclosed a light measuring device wherein a photometric operation is performed by dividing a photographing field into a plurality of areas including a middle area and four peripheral areas encompassing the middle area; a plurality of photometric values thus obtained are normalized by their mean value output; then, the photographing field is classified on the basis of a normalization output thus obtained; and an apposite photometric value is computed from a classification output thus obtained. In accordance with this arrangement, however, an erroneous photometric value might be obtained because the size of a main object to be photographed cannot be clearly grasped by the device.

SUMMARY OF THE INVENTION

This invention is based on the assumption that a main object to be photographed is situated in the middle part of the photographing field. It is a principal object of the invention to provide a light measuring device which is capable of computing an apposite photometric value by clearly grasping the size of the main object in particular.

The above and further objects and features of this invention will become apparent from the following detailed description of preferred embodiments thereof taken in connection with the accompanying drawings.

BRIEF DESCRIPTION OF THE DRAWINGS

FIG. 4($b$) is a circuit diagram showing by way of example the details of a gate circuit shown in FIG. 4($a$).

FIGS. 5($a$) and 5($b$) are illustrations of photometric value computing formulas selected by the circuit of FIG. 3.

DETAILED DESCRIPTION OF THE PREFERRED EMBODIMENTS

Figure 1:
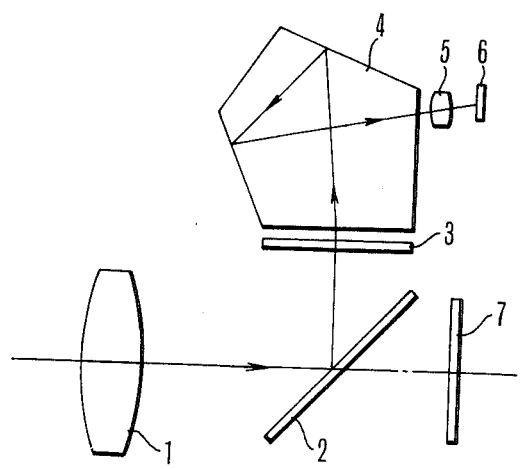
FIG. 1 is a schematic illustration of an optical system arranged in a single-lens reflex camera to which this invention is applied.

FIG. 1 shows in outline the arrangement of an optical system of a single-lens reflex camera to which this invention is applied. The illustration includes a photo taking lens 1; a quick return mirror 2; a focusing screen 3; a pentagonal prism 4; an image-forming lens 5; a light receiving part 6; and a image plane 7. In the case of this specific embodiment, an object's image formed on the focusing screen 3 by the photo taking lens 1 is guided to and imaged on the light receiving part 6 by means of the image-forming lens 5.

Figure 2:
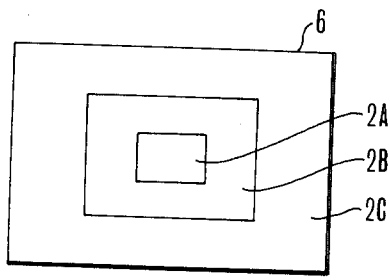
FIG. 2 is an illustration of a plurality of photometric areas of the light receiving surface of light receiving means arranged as a first embodiment of this invention.

FIG. 2 illustrates the light receiving surface of the light receiving part 6 arranged as a first embodiment. In FIG. 2, the illustration includes a middle area 2A of a photographing field; an intermediate area 2B which surrounds the middle area 2A; and a peripheral area 2C which further surrounds the intermediate area 2B. In this case, a plurality of light receiving photosensitive elements are arranged to receive the light of various areas of the photographing field corresponding to those area of the light receiving surface with the field divided into three areas 2A, 2B and 2C. The light receiving part 6 is thus arranged to measure the luminance of the photographing field for each of these areas.

Figure 3:
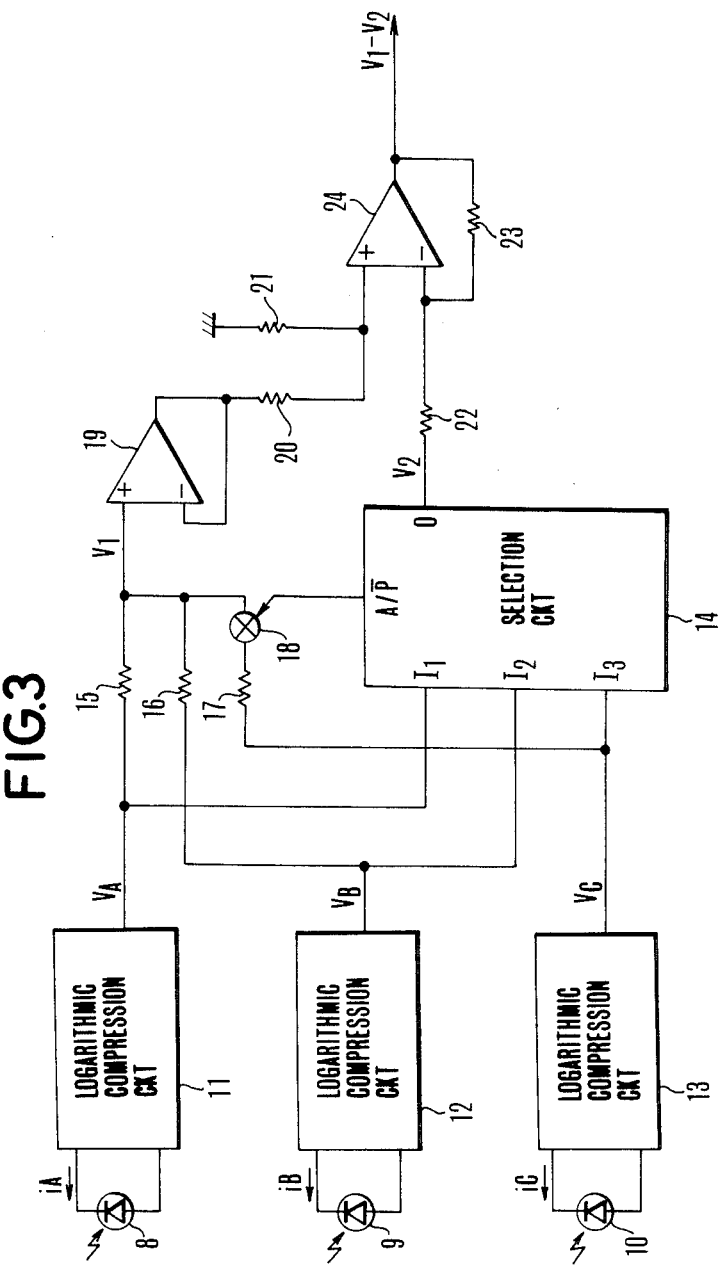
FIG. 3 is a circuit diagram showing a light measuring device arranged in the first embodiment.

FIGS. 3 and 4 show the circuit arrangement of the first embodiment. Referring to FIG. 3, silicon photodiodes (SPDs) 8, 9 and 10 are disposed in positions corresponding to the above stated three areas 2A, 2B and 2C respectively. The SPDs 8, 9 and 10 generate photo currents iA, iB and iC according to the luminance of the corresponding areas. Logarithmic compression circuits 11, 12 and 13 are arranged to produce signal voltages VA, VB and VC by logarithmically compressing these photo currents. By using constants a1, a2, a3 ( >0) and b ( >0) and the photo currents iA, iB and iC, the voltages VA, VB and VC can be expressed as follows:

$$VA = a1 + b \cdot \ln iA$$

$$VB = a2 + b \cdot \ln iB$$

$$VC = a3 + b \cdot \ln iC$$

The above formulas are on the assumption that the values of the constants a1, a2 and a3 are predetermined within the logarithmic compression circuits 11, 12 and 13 in such a way as to obtain a state of $VA = VB = VC$ when the degrees of luminance of the above stated areas are equal to each other. A selection circuit 14 is arranged to receive at its input terminals I1, I2 and I3 the voltages VA, VB and VC produced from the logarithmic compression circuits 11, 12 and 13 and to determine the selection of one of a plurality of computing formulas represented by circuits respectively as will be described later. Resistors 15, 16 and 17 are of equal resistance values. An analog switch 18 is arranged to form a mean value circuit jointly with the resistors 15, 16 and 17. When a high level voltage is produce from the output terminal $A/\overline{P}$ of the selection circuit 14 and supplied to the control terminal of the analog switch 18, the switch 18 becomes conductive. Then, the output voltage V1 of the mean value circuit becomes $(VA+VB+VC)/3$. When a low level voltage is produced from the output terminal $A/\overline{P}$ of the selection circuit 14 and supplied to the control terminal of the analog switch 18, the switch 18 opens and the output voltage V1 of the mean value circuit becomes $(VA+VB)/2$. An operation amplifier 19 is arranged to have its output terminal and its inverting input terminal interconnected to serve as voltage follower. The output voltage V1 of the mean value circuit is supplied to the non-inverting input terminal of the amplifier 19. The amplifier 19 produces a voltage V1 irrespectively of the conditions of circuit elements ensuing its output terminal. Resistors 20, 21, 22 and 23 are of equal resistance values. An operation amplifier 24 and these resistors 20, 21, 22 and 23 jointly form a subtraction circuit. Assuming that a voltage produced from another output terminal 0 of the selection circuit 14 is V2, the subtraction circuit produces a voltage $V1-V2$. This voltage $V1-V2$ represents a photometric value determined by a plurality of computing formulas which will be described later herein.

Figure 4A:
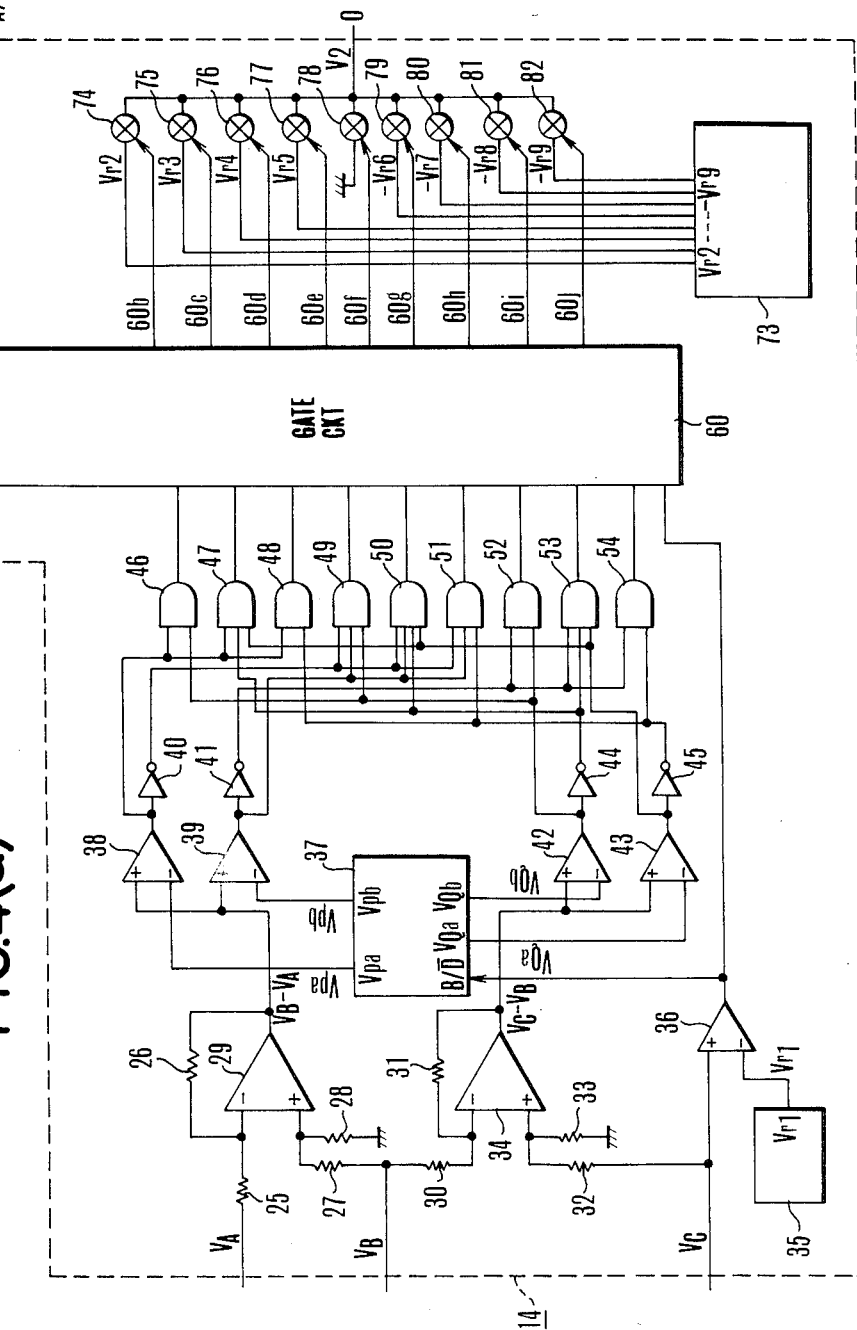
FIG. 4($a$) is a circuit diagram showing the details of a selection circuit shown in FIG. 3.

FIG. 4(a) shows the details of the selection circuit 14 of FIG. 3. Referring to FIG. 4(a), resistors 25, 26, 27 and 28 are of equal resistance values. An operational amplifier 29 is arranged to form a first subtraction circuit in conjunction with these resistors. Resistors 30, 31, 32 and 33 are arranged likewise to be of equal resistance values. Another operational amplifier 34 forms a second subtraction circuit in conjunction with the resistors 30, 31, 32 and 33. The first subtraction circuit is arranged to receive voltages VA and VB and produce a voltage $VB-VA$. The second subtraction circuit is arranged to receive voltages VB and VC and produce a voltage $VC-VB$. A reference voltage generating circuit 35 is arranged to generate a reference voltage Vrl. A comparator 36 is arranged to have the voltage VC supplied to its non-inverting input terminal and the reference voltage Vrl to its inverting input terminal. The comparator 36 produces a high level voltage when the voltage VC is higher than or equal to the voltage Vrl and a low level voltage when the former is lower than the latter. In the case of this specific embodiment, the reference voltage Vrl is set at such a level that permits a discrimination between an indoor photographing field and an outdoor photographing field. Another reference voltage generating circuit 37 is arranged to generate reference voltages Vpa, Vpb, VQa and VQb. The circuit 37 is provided with a control terminal $B/\overline{D}$ which is arranged to receive the output of the comparator 36 as a control voltage. When a high level control voltage is applied to the control terminal $B/\overline{D}$ of the reference voltage generating circuit 37, the reference voltages are assumed to become as follows: $Vpa=Vp1$, $Vpb=Vp2$, $VQa=VQ1$ and $VQb=VQ2$. When the control voltage input is at a low level, the reference voltages are assumed to become: $Vpa=Vp3$, $Vpb=Vp4$, $VQa=VQ3$ and $VQb=VQ4$. The reference voltages Vp1, Vp3, VQ1 and VQ3 have the positive sign while the reference voltages Vp2, Vp4, VQ2 and VQ4 have the negative sign. These reference voltages are in the following magnitude relation: $Vp2<0<Vp1$, $VQ2<0<VQ1$, $Vp4<0<Vp3$ and $VQ4<0<VQ3$. Reference numerals 38 and 39 denote comparators and 40 and 41 inverters. The comparators 38 and 39 are arranged to receive the output voltage $VB-VA$ of the operational amplifier 29 of the first subtraction circuit at their non-inverting input terminals. The inverting input terminal of the comparator 38 is arranged to receive either the reference voltage Vp1 or Vp3 according as the control voltage applied to the control terminal $B/\overline{D}$ of the reference voltage generating circuit 37 is at a high level or at a low level. The inverting input terminal of the other comparator 39 is arranged likewise to receive either the reference voltage Vp2 or Vp4. Numerals 42 and 43 denote comparators and 44 and 45 inverters. The comparators 42 and 43 are arranged to receive the output voltage $VC-VB$ of the operational amplifier 34 of the second subtraction circuit at their non-inverting input terminals. The inverting input terminal of the comparator 43 is arranged to receive either the reference voltage vQ1 or VQ3 according as the level of the control voltage applied to the control terminal of the reference voltage generating circuit 37 is high or low. The inverting input terminal of the comparator 42 is arranged likewise to receive either the reference volage VQ2 or VQ4. The comparators 38, 39, 42 and 43 produce high level voltages when the positive input voltage is higher or equal to the negative input voltage and low level voltages when the positive input voltage is lower than the negative input voltage according to the levels of the positive input voltages of the noninverting input terminals and the negative inverting input voltages of their inverting input terminals. Reference numerals 46 to 54 denote AND gates. At least one of the AND gates 46 to 54 produces a high level voltage according to the combination of the high and low levels of the outputs of the comparators 38, 39, 42 and 43 while the rest of the AND gates produce low level voltages.

A gate circuit 60 is formed by a combination of AND gates and OR gates. The gate circuit 60 is arranged to receive the output of the comparator 36 and those of the AND gates 46 to 54 and to produce signals 60a to 60j for control as will be described later. A reference voltage generating circuit 73 is arranged to generate reference voltages Vr2 to Vr9. The reference voltages Vr2, Vr3, Vr4 and Vr5 are larger than 0 while the reference voltages Vr6, Vr7, Vr8 and Vr9 are smaller than 0. Further these voltages are set to be in relations Vr2<Vr3, Vr4>Vr5, |Vr6|<|Vr7| and |Vr8|>|Vr9| Reference numerals 74 to 82 denote analog switches. The input terminal of the switch 74 is arranged to receive the reference voltage Vr2 ; that of the switch 75 to receive the reference voltage Vr3; that of the switch 76 to receive the voltage Vr4; that of the switch 77 to receive the voltage Vr5; that of the switch 79 to receive the voltage Vr6; that of the switch 80 to receive the voltage Vr7; that of the switch 81 to receive the voltage Vr8; and that of the switch 82 to receive the voltage Vr9 respectively. Meanwhile, the input terminal of the analog switch 78 is at 0 volt. The output terminals of these analog switches 74 to 82 are interconnected and are arranged to produce from the output terminal 0 a voltage V2. To the control terminal of the analog switch 74 is supplied a signal 60b produced from the above stated gate circuit 60. When this signal 60b is at a high level, the switch 74 becomes conductive to allow the reference voltage Vr2 to be produced from the output terminal thereof. Likewise, a signal 60c is supplied to the control terminal of the switch 75; a signal 60d to that of the switch 76; a signal 60e to that of the switch 77; a signal 60f to that of the switch 78; a signal 60g to that of the switch 79; a signal 60h to that of the switch 80; a signal 60i to that of the switch 81; and a signal 60j to that of the switch 82. Meanwhile, the gate circuit 60 produces another signal 60a, which is supplied from the output terminal A/$\overline{P}$ to the control terminal of the analog switch 18 shown in FIG. 3. When this signal 60a is at a high level, the analog switch 18 becomes conductive and produces a voltage V1 at a value (VA+VB+VC) / 3. When the signal 60a is at a low level, the switch 18 becomes nonconductive to make the output voltage V1 to be (VA+VB) / 2.

Figure 4B:
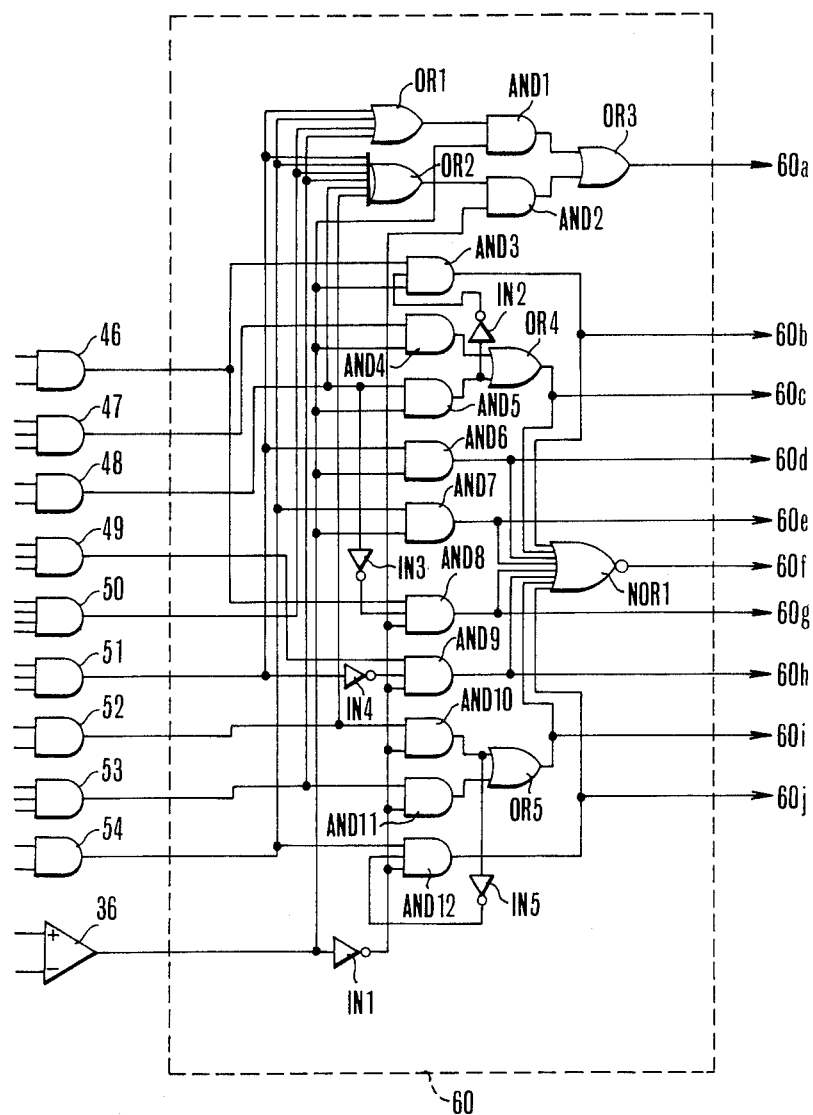

FIG. 4(b) shows by way of example the combination of the above stated AND and OR gates of the gate circuit 60. Referring to FIG. 4(b), the illustration OR gates OR1 to OR5; AND gates AND1 to AND12; inverters IN1 to IN5; and a NOR gate NOR1. The gate circuit 60 shown in FIG. 4(a) is arranged to have its output signals 60a to 60j controlled according to the output signals of the AND gates 46 to 54 as will be further described later. For that purpose, various combinations of gates are conceivable besides the example given in FIG. 4(b).

Figure 6A:
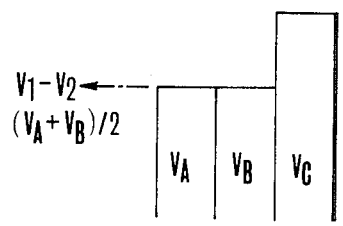
FIGS. 6($a$) to 6($i$) and 7($a$) to 7($i$) are illustrations of the levels of photometric values obtained by the photometric value computing formulas selected by the circuit of FIG. 3.

Referring now to FIGS. 5(a) to 7(i), the operations of the circuit arrangements shown in FIGS. 3, 4(a) and 4(b) are as follows:

(1) In case that a luminance signal Vc obtained from the outermost area 2C of the light receiving part 6 (or the photographing field area) shown in FIG. 2 is larger than the reference voltage Vr1, that is, when the field is determined to be an outdoor field (or when the peripheral part of the image plane is considered bright because of some bright object such as a sky or the like), a photometric value V1−V2 is obtained according to a luminance signal difference VB−VA (hereinafter referred to as ΔBA) and another luminance signal difference VC−VB (hereinafter referred to as ΔCB) by using the reference voltages Vp1, Vp2, VQ1 and VQ2 (which are in the relations of Vp2<0<Vp1 and VQ2<0<VQ1) in the following manner:

(1—1) In the case of $$\begin{bmatrix} Vp2 & < & \Delta BA & < & Vp1 \\ VQ1 & < & \Delta CB & & \end{bmatrix},$$

or, more specifically, in case where a luminance signal difference ΔBA between the middle are 2A and the first outer area 2B of the photographing field area is small while a luminance signal difference ΔBA between the first outer area 2B and the outermost area 2C is larger than the predetermined positive value VQ1 as shown in FIG. 6(a), the main object to be photographed can be assumed to exist in both the areas 2A and 2B. Therefore, to give an appropriate exposure for the main object, the photometric value V1−V2 is obtained on the basis of the luminance signals VA and VB of the areas 2A and 2B from the following computing formula (1):

$$V1-V2=(VA+VB)/2 \qquad (1)$$

Referring first to FIG. 4(a), the selection circuit 14 among other circuit elements operates as follows: Since, in the above stated instance, the luminance signal (a voltage) VC of the outermost area 2C is larger than the reference voltage Vr1, the comparator 36 produces a high level output. Accordingly, a high level signal is applied to the control terminal B/$\overline{D}$ of the reference voltage generating circuit 37. As a result, the reference voltages of the circuit 37 become Vpa=Vp1, Vpb=Vp2, VQa=VQ1 and VQb=VQ2. Meanwhile, since the output signal (voltage) VB−VA of the operational amplifier 29 is under the condition of Vp2<ΔBA <Vp1, the output level of the comparator 38 becomes low and that of the comparator 39 high. Further, since the output signal (voltage) VC−VB of the operational amplifier 34 is under the condition of VQ1<ΔCB, the output level of the comparator 42 becomes high and that of the comparator 43 also high. Therefore, the output level of the AND gate 49 alone becomes high. The high level output of the AND gate 49, the low level output of AND gates 46 to 48 and 50 to 54 and the high level output of the comparator 36 causes the gate circuit 60 to produce the signal 60a at a low level. The output level of the output terminal A/$\overline{P}$ becomes low. The level of the signal 60f alone becomes high. Other signals 60b to 60e and 60g to 60j of the gate circuit 60 become low. The voltage of the output terminal O then becomes 0 V. As a result, the operational amplifier 19 produces a voltage (VA+VB) / 2. A voltage O V is then supplied to the inverting input terminal of the operational amplifier 24. Therefore, the output V1−V2 of the amplifier 24 becomes (VA+VB) / 2).

Figure 6B:
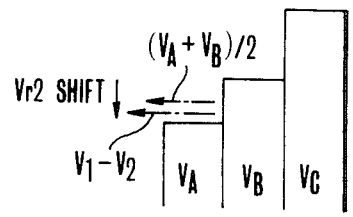

(1-2 ) In the case of $$\begin{bmatrix} Vp1 & < & \Delta BA \\ VQ1 & < & \Delta CB \end{bmatrix},$$

or, more specifically, in case where the luminance signal difference ΔBA between the areas 2A and 2B is larger than the predetermined positive value Vp1 while the luminance signal difference ΔCB between the areas 2B and 2C is also larger than the predetermined positive value VQ1 as shown in FIG. 6(b) the main object can be assumed to be likely existing not only in the whole area 2A but also in a part of the area 2B. In this case, the photometric value V1−V2 may be obtained on the basis of the luminance signal VA of the area 2A alone. However, it is known from experience a better exposure value is obtainable with a background luminance signal also taken into consideration to some degree. Therefore, the photometric value V1−V2 is obtained for main objects VA and VB from the following computing formula (2) by using a correction value Vr2:

$$V1-V2=(VA+VB)/2-Vr2 \quad (2)$$

The circuit operation in this case is as follows: All the comparators 36, 38, 39, 42 and 43 produces high level outputs. Among the AND gates 46 to 54, the AND gate 46 alone produces a high level output. The rest of them produce low level outputs. The gate circuit 60 receives the output of the comparator 36 and those of the AND gates 46 to 54 and produces its output signal 60a at a low level, its output signal 60b at a high level and its output signals 60c to 60j at low levels. As a result, the output of the operational amplifier 19 becomes a voltage (VA+VB) / 2. The output V1−V2 of the operational amplifier 24 becomes (VA+VB)/2−Vr2.

Figure 6C:
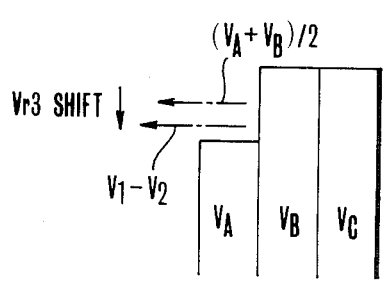

(1-3) In the event of $$\begin{bmatrix} Vp1 & < & \Delta BA & \\ VQ2 & < & \Delta CB & < & VQ1 \end{bmatrix},$$

or, more specifically, in case where the luminance signal difference ΔBA between the areas 2A and 2B is larger than the predetermined positive value Vp1 while the luminance signal difference ΔCB is small as shown in FIG. 6(c), the main object is considered to be likely existing either in the whole area 2A or in a part of the area 2A, if the main object is very small. Under such a condition, the photometric value V1−V2 may be obtained solely on the basis of the luminance signal VA of the area 2A. However, to ensure a better exposure with the luminance signal VB from the background area 2B taking into consideration, the photometric value V1−V2 is obtained on the basis of the areas 2A and 2B from the following computing formula (3) by using a correction value Vr3 larger than the correction value Vr2:

$$V1-V2=(VA+VB)/2-Vr3 \quad (3)$$

The circuit operation is as follows: The comparators 36, 38, 39 and 42 produce high level output. The comparator 43 produces a low level output. The AND gates 46 and 48 produce high level outputs while other AND gates 47 and 49 to 54 produce low level outputs. The gate circuit 60 receives the output of the comparator 36 and those of AND gates 46 to 54. The signal 60a of the gate circuit 60 is produced at a low level. The signal 60c is produced at a high level and signals 60b and 60d to 60j at low levels. The output of the operational amplifier 19 becomes the voltage (VA+VB) /2. The output V1−V2 of the operational amplifier 24 becomes (VA+VB) /2−Vr3.

Figure 6D:
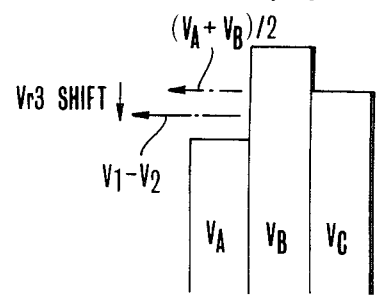
Figure 6E:
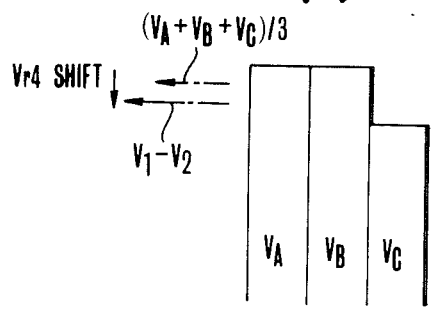

(1-4) In the event of $$\begin{bmatrix} Vp1 & < & \Delta BA \\ \Delta CB & < & VQ2 \end{bmatrix},$$

or, more specifically, in the event that a luminance signal difference ΔBA between the areas 2A and 2B is larger than the predetermined positive value Vp1 while a luminance signal difference ΔCB between the areas 2B and 2C is smaller than the predetermined negative value VQ2 as shown in FIG. 6(d), the main object can be assumed to be of about the same size as in the case of the Para. (1-3) above while in the area 2B, there is some object of a considerably high degree of brightness, such as the sun, the reflection of a sea surface or the like, or some part of a scenery that has a considerably high degree of brightness. In that event, luminance data is obtained from all the areas 2A, 2B and 2C and the photometric value V1−V2 may be adequately obtained without any correction value. However, another method of obtaining an adequate result is employed in this embodiment. More specifically stated, the photometric value is obtained in that event from the following computing formula (4) using the luminance signals of the areas 2A and 2B and the correction value Vr3 in the same manner as in the case of Para. (1-3) above: ps $$V1-V2=(VA+VB)/2-Vr3 \quad (4)$$

In this instance, the circuit operation is as follows: The comparators 36, 38 and 39 produce high level outputs. The comparators 42 and 43 produce low level outputs. The AND gate 48 produces a high level output while other AND gates 46, 47 and 49 to 54 produce low level outputs respectively. The gate circuit 60 receives the output of the comparator 36 and those of the AND gates 46 to 54. The level of the output signal 60a of the gate circuit 60 becomes low; that of the signal 60c becomes high; and those of the signals 60b and 60d to 60j become low. The output of the operational amplifier 19 becomes the voltage (VA+VB) /2. The output V1−V2 of the operational amplifier 24 becomes (VA+VB) /2−Vr3.

(1-5) Under a condition of $$\begin{bmatrix} Vp2 & < & \Delta BA & < & Vp1 \\ \Delta CB & < & VQ2 & & \end{bmatrix},$$

that is, in case where the luminance signal difference ΔBA between the areas 2A and 2B is small while the luminance signal difference ΔCB between the areas 2B and 2C is larger than the value VQ2 in negative absolute value, the main object can be assumed to be large existing in both the areas 2A and 2B and to be in a whity color. In this instance, a photometric value may be adequately obtainable on the basis of the luminance signals of the areas 2A and 2B. However, if the brightness or luminance of the peripheral part of the image plane is lower than that of the middle part, the whity main object can be better photographed by obtaining a photometric value with the luminance signal of the peripheral area 2C also taken into consideration to a certain suitable degree (high-light control). It has been ascertained by experience that the latter gives a better exposure value. Therefore, to give an exposure that allows the main object to be highlighted, the photometric value V1−V2 is obtained from the following computing formula (5) using all the luminance signals VA, VB and VC together with a correction value Vr4:

$$V1-V2=(VA+VB+VC)/3-Vr4 \quad (5)$$

The circuit arrangement operates as follows: The comparators 36 and 39 produce high level outputs. The comparators 38, 42 and 43 produce low level outputs. The AND gate 51 produces a high level output. Other AND gates 46 to 50 and 52 to 54 produce low level outputs. Therefore, receiving the output of the comparator 36 and those of the AND gates 46 to 54, the gate circuit 60 makes the level of its output signal 60a a high, that of the signal 60d also high and those of the signals 60b, 60c and 60e to 60j low. The output of the operational amplifier 19 becomes a voltage (VA+VB+VC)/3. The output V1−V2 of the operational amplifier 24 becomes (VA+VB+VC)/3−Vr4.

Figure 6F:
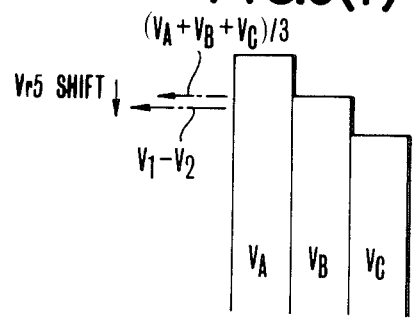

(1-6) Under a condition of $$\begin{bmatrix} \Delta BA & < & Vp2 \\ \Delta CB & < & VQ2 \end{bmatrix},$$

that is, in case where the luminance signal difference ΔBA between the areas 2A and 2B is larger than the predetermined value Vp2 in negative absolute value while the luminance signal difference ΔCB between the areas 2B and 2C is also larger than the predetermined value VQ2 in negative absolute value, as shown in FIG. 6(f), the main object can be regarded as a whity object of a medium size located in the whole area 2A and a part of the area 2B. To highlight the main object like in the case of the Para. (1-5) above, the photometric value is obtained in this case from the following computing formula (6) on the basis of the luminance values of the areas 2A, 2B and 2C by using a correction value Vr5, which is smaller than Vr4:

$$V1-V2=VA+VB+VC)/3-Vr5 \quad (6)$$

The circuit operation: The comparator 36 produces a high level output. The comparators 38 to 43 produce low level outputs. The AND gate 54 produces a high level output. Other AND gates 46 to 53 produce low level outputs. Upon receipt of the output of the comparator 36 and those of the AND gates 46 to 54, the gate circuit 60 makes the level of its output signal 60a high, that of the signal 60e also high and those of the signals 60to 60d and 60f to 60j low. The output of the operational amplifier 19 becomes a voltage (VA VB+VC)/3. The output V1−V2 of the operational amplifier 24 becomes (VA+VB VC)/3−Vr5.

Figure 6G:
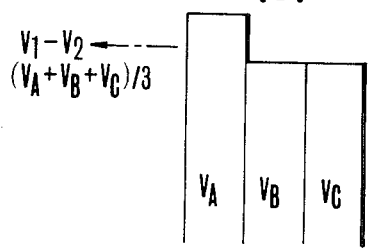

(−7) Under a condition of $$\begin{bmatrix} \Delta BA & < & Vp2 & \\ VQ2 & < & \Delta CB & < & VQ1 \end{bmatrix},$$

or, in other words, with the difference ΔBA between the luminance signals of the areas 2A and 2B larger than the predetermined value Vp2 in negative absolute value and with the difference ΔCB between the luminance signals of the areas 2B and 2C being small, as shown in FIG. 6(g), the main object can be regarded as existing either in the whole area 2A or just in a part of the area 2A because of its small size. In addition to that, the main object can be considered to be a whity object. In that instance, to obtain a highlighted effect on the main object like in the above stated case, the photometric value V1−V2 is obtained from the following formula (7) on the basis of luminance of the areas 2A, 2B and 2C, without any correction value:

$$V1-V2=(VA+VB+VC)/3 \quad (7)$$

The circuit operation: The comparators 36 and 42 produce high level outputs. The comparators 38, 39 and 42 produce low level outputs. The AND gates 52 and 54 produce high level outputs. Other AND gates 46 to 51 and 53 produce low level outputs. Upon receipt of the output of the comparator 36 and those of the AND gates 46 to 54, the gate circuit 60 makes the level of its signal 60a high, that of its signal 60f also high and those of other signals 60b to 60e and 60g to 60j low. The output of the operational amplifier 19 becomes a voltage (VA+VB+VC)/3. Then, the output V1 V2 of the operational amplifier 24 becomes (VA+VB+VC)/3

Figure 6H:
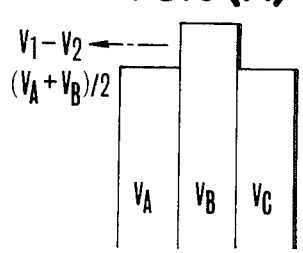

(1-8) Under a condition of $$\begin{bmatrix} \Delta BA & < & Vp2 \\ VQ1 & < & \Delta CB \end{bmatrix},$$

or, in other words, in case where the difference ΔBA between the luminance signals of the areas 2A and 2B is larger than the predetermined value Vp2 in negative absolute value while the difference ΔCB between the luminance signals of the areas 2B and 2C is also larger than the predetermined value VQ1, as shown in FIG. 6(h), the main object can be assumed to be of the same size as in the case of Para. (1—1) and to have some bright and dark parts therein thus resulting in a somewhat high degree of luminance of the area 2A or, as in the case of a scenery, the area 2B can be assumed to be occupied by some object of a considerably low degree of luminance. Under that condition, it has been found by the inventors that the photometric value V1−V2 may be adequately obtained from luminance values of all the areas 2A, 2B and 2C with some correction value arranged. However, in the case of this embodiment, the photometric value V1−V2 is arranged to be obtained under that condition by another method which also gives an adequate result. Namely, like in the case of Para. (1—1), the photometric value is obtained from the following formula (8) using the luminance signals for the areas 2A and 2B and without using any correction value:

$$V1-V2=(VA+VB)/2 \quad (8)$$

The circuit operation: The comparators 36, 42 and 43 produce high level outputs. The comparators 38 and 39 produce low level outputs. The AND gate 52 produces a high level output. Other AND gates 46 to 51, 53 and 54 produce low level outputs. Upon receipt of the output of the comparator 36 and those of the AND gates 46 to 54, the gate circuit 60 makes the level of its output signal 60a low, that of its signal 60f high and those of its other signals 60to 60e and 60g to 60j low. The output of the operational amplifier 19 becomes a voltage (VA+VB)/2. The output V1−V2 of the operational amplifier 24 becomes (VA+VB)/2.

Figure 6I:
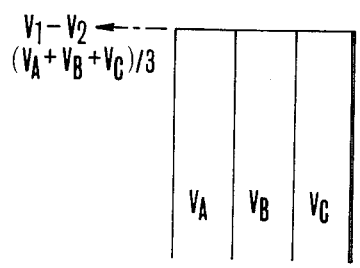

(1-9) Under a condition of $$\begin{bmatrix} Vp2 & < & \Delta BA & < & Vp1 \\ VQ2 & < & \Delta CB & < & VQ1 \end{bmatrix},$$

or, more specifically stated, in case where the difference ΔBA between the luminance signals of the areas 2A and 2B is small and the difference ΔCB between the luminance signals of the areas 2B and 2C is also small as shown in FIG. 6(i), the main object can be regarded as occupying the whole photographing field or, as in the case of a scenery, no specific object can be regarded as being treated as a main object. In this instance, the photometric value V1−V2 is obtained on the basis of the luminance of the areas 2A, 2B and 2C from the following formula (9) without using any correction value:

$$V1-V2=(VA+VB+VC)/3 \qquad (9)$$

The circuit operation: The comparators 36, 39 and 42 produce high level outputs. The comparators 38 and 43 produce low level outputs. The AND gates 49, 51 and 52 produce high level outputs and other AND gates 46 to 48, 50, 53 and 54 low level outputs. Upon receipt of the output of the comparator 36 and those of the AND gates 46 to 54, the gate circuit 60 makes the level of its output signal 60a high, that of its signal 60f high and those of its other signals 60b to 60e and 60g to 60j low. The output of the operational amplifier 19 becomes a voltage (VA+VB+VC)/3. The output V1−V2 of the operational amplifier 24 becomes (VA+VB+VC)/3.

Figure 7A:
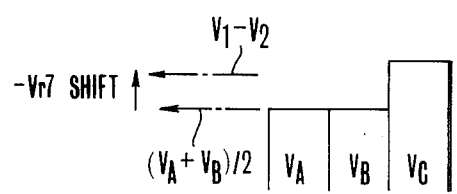

(2) luminance signal VC obtained from the outermost area 2C among the divided areas of photographing field 6 shown in FIG. 2 (the light receiving part 6) is smaller than the reference voltage Vr1 thus suggesting an indoor condition with a wall or the like located in the background, the photometric value V1-V2 obtained in a manner similar to the operations under the conditions mentioned in the foregoing Para. (1) above by using the constants Vp3, Vp4, VQ3 and VQ4 (Vp4<0<Vp3 and VQ4<0<VQ3) according to the values of the luminance signal differences ΔBA and ΔCB. In this case. the embodiment operates as described below:

(2-1) Under a condition of $$\begin{bmatrix} Vp4 & < & \Delta BA & < & Vp3 \\ VQ3 & < & \Delta CB & & \end{bmatrix},$$

that is, in case where the difference ΔBA between the luminance signals of the areas 2A and 2B is small while the difference ΔCB between the luminance signals of the areas 2B and 2C is larger than the predetermined value VQ3, as shown in FIG. 7(a), the main object to be photographed can be assumed to be large thus existing in both the areas 2A and 2B and to be in a blackish color. In this instance, the photometric value may be obtainable simply from the luminance signals of the areas 2A, 2B and 2C without any correcting coefficient. It is, however, preferable to ensure that the blackish main object photographed in a black state without fail (shadow control). Therefore, in this specific embodiment, the photometric value V1−V2 is obtained to give such an exposure that produces a shadow depicting effect on the main object by using the luminance signals of the areas 2A and 2B with a correction value Vr7 according to the following formula (10):

$$V1-V2=(VA+VB)/2+Vr7 \qquad (10)$$

The circuit arrangement in this instance operates as follows: Since a photometric signal (voltage) VC for the outermost area 2C is smaller than the reference voltage Vr1 in this instance, the comparator 36 produces a low level output. Therefore, a low level signal is supplied to the control terminal B/D of the reference voltage generating circuit 37. As a result, the reference voltages generated by this circuit 37 becomes Vpa=Vp3, Vpb=Vp4, VQa=VQ3 and VQb=VQ4. Meanwhile, the comparators 36 and 39 produce low level outputs. The comparators 38, 42 and 43 produce high level outputs. The AND gate 49 produces a high level output while other AND gates 46 to 48 and 50 to 54 produce low level outputs. Then, receiving the output of the comparator 36 and those of the AND gates 46 to 54, the gate circuit 60 makes the level of its output signal 60a low, that of its signal 60h high and those of other signals 60b to 60g, 60i and 60j. The output of the operational amplifier 19 becomes a voltage (VA+VB)/2. The output V1−V2 of the operational amplifier 24 becomes (VA+VB)/2 Vr7.

Figure 7B:
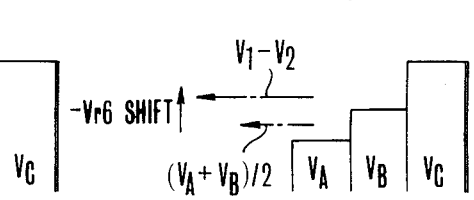
Figure 7C:
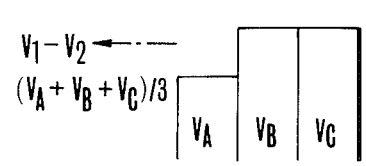

(2—2) Under a condition of $$\begin{bmatrix} Vp3 & < & \Delta BA \\ VQ3 & < & \Delta CB \end{bmatrix},$$

that is, in case where the difference ΔBA between the luminance signals of the areas 2A and 2B is larger than the predetermined value Vp3 and the difference ΔCB between the luminance signals of the areas 2B and 2C is larger than the predetermined value VQ3, as shown in FIG. 7(b), the main object is assumed to be existing in the whole area 2A and in a part of the area 2B and to be in a blackish color. In that instance, to give the same shadow depicting exposure as in the case of Para. (2-1) above, the photometric value V1−V2 is obtained from the following formula (11) using the luminance signals of the areas 2A and 2B with a negative correction value −Vr6 (|Vr6|<|Vr7|):

$$V1-V2=(VA+VB)/2+Vr6 \qquad (11)$$

The circuit operation: The comparator 36 produces a low level output. Other comparators 38 to 43 all produce high level outputs. The AND gate 46 produces a high level output. Other AND gates 47 to 54 produce low level outputs. Upon receipt of the outputs of the comparators 36 and the AND gates 46 to 54, the gate circuit 60 makes the level of its output signal 60low, that of its output signal 60high and those of other output signals 60b to 60f and 60h to 60j low. The output of the operational amplifier 19 becomes a voltage (VA+VB)/2. The output V1−V2 of the operational amplifier 24 becomes (VA+VB)/2+Vr6.

(2-3) Under a condition of $$\begin{bmatrix} Vp3 & < & \Delta BA & & \\ VQ4 & < & \Delta CB & < & VQ3 \end{bmatrix},$$

that is, when the difference ΔBA between the luminance signals of the areas 2A and 2B is larger than the predetermined value Vp3 and the difference ΔCB between the luminance signals of the areas 2B and 2C is smaller than the predetermined value Vp3, the main object is assumed to be either occupying the whole area 2A or to be small in size and in a blackish color. To obtain a shadow depicting exposure for the main object, the photometric value V1−V2 is in that instance obtained from the following formula (12) on the basis of the degrees of luminance of the areas 2A and 2B and without using any correction value:

$$V1-V2=(VA+VB+VC)/3 \quad (12)$$

The circuit operation: The comparators 36 and 43 produce low level outputs. The comparators 38 to 42 produce high level outputs. The AND gates 46 and 48 produce high level outputs. Other AND gates 47 and 49 to 54 produce low level outputs. Upon receipt of the outputs of the comparator 36 and the AND gates 46 to 54, the gate circuit 60 makes the level of its signal 60a low, that of its signal 60f high and those of its other signals 60b to 60e and 60g to 60j low. The output of the operational amplifier 19 becomes a voltage (VA+VB+VC)/3. The output V1−V2 of the operational amplifier 24 becomes (VA+VB+VC)/3.

Figure 7D:
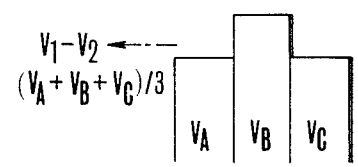

(2-4) Under a condition of $$\begin{bmatrix} Vp3 & < & \Delta BA \\ \Delta CB & < & VQ4 \end{bmatrix},$$

that is, when the difference ΔBA between the luminance signals of the areas 2A and 2B is larger than the predetermined value Vp3 and the difference ΔCB between the luminance signals of the areas 2B and 2C is larger than the predetermined value VQ4 in negative absolute value as shown in FIG. 7(d), the main object is assumed to be of about the same size as in the case of Para. (2-3) above and to have such a highly bright object as an electric lamp in the area 2B. It has been known from data that, compared with an outdoor condition having the sun or the like located in the area 2B, the influence of a high brightness object under an indoor condition like in this instance is not so great. In this instance, therefore, the photometric value V1−V2 is obtained from the following formula (13) on the basis of the luminance of the areas 2A, 2B and 2C without any correction value:

$$V1-V2=(VA+VB+VC)/3 \quad (13)$$

The circuit operation: The comparators 36, 42 and 43 produce low level outputs. The comparators 38 and 39 produces high level outputs. The AND gate 48 produces a high level output. Other AND gates 46, 47 and 49 to 54 produce low level outputs. Therefore, upon receipt of the outputs of the comparator 36 and the AND gates 46 to 54, the gate circuit 60 makes the level of its output signal 60a high, that of its signal 60f also high and those of its other output signals 60b to 60e and 60g to 60j low. The output of the operational amplifier 19 becomes a voltage (VA+VB+VC)/3. The output V1−V2 of the operational amplifier 24 becomes (VA+VB+VC)/3.

Figure 7E:
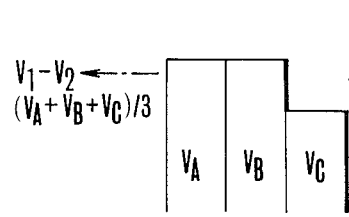

(2-5) Under a condition of $$\begin{bmatrix} Vp4 & < & \Delta BA & < & Vp3 \\ \Delta CB & < & VQ4 & & \end{bmatrix},$$

that is, when the difference ΔBA between the luminance signals of the areas 2A and 2B is small while the difference ΔCB between the luminance signals of the areas 2B and 2C is larger than the predetermined value VQ4 in negative absolute value, as shown in FIG. 7(e), the main object is assumed to be existing in both the areas 2A and 2B with these areas 2A and 2B solely illuminated by light. Under such a condition, it is conceivable to obtain a photometric value solely on the basis of the luminance of the areas 2A and 2B. In the case of this embodiment, however, the area 2C which is, in this instance, a dark peripheral area within the photographing field is also taken into consideration. The photometric value V1−V2 is thus obtained from the following formula (14) on the basis of the luminance values of the areas 2A, 2B and 2C without using any correction value:

$$V1-V2=(VA+VB+VC)/3 \quad (14)$$

The circuit operation: The comparators 36, 38 and 42 produce low level outputs. The comparators 39 produces a high level output. The AND gate 51 produces a high level output. Other AND gates 46 to 50 and 52 to 54 produce low level outputs. Upon receipt of the outputs of the comparator 36 and the AND gates 46 to 54, the gate circuit 60 makes the level of its output signal 60a high, that of its signal 60f also high and those of other signals 60b to 60e and 60g to 60j low. The output of the operational amplifier 19 becomes a voltage (VA+VB+VC)/3. The output V1−V2 of the operational amplifier 24 also becomes (VA+VB+VC)/3.

Figure 7F:
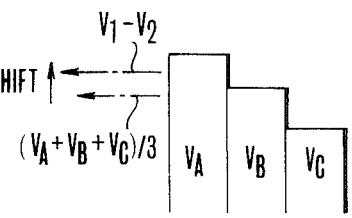

(2-6) Under a condition of $$\begin{bmatrix} \Delta BA & < & Vp4 \\ \Delta CB & < & VQ4 \end{bmatrix},$$

that is, when the difference ΔBA between the luminance signals of the areas 2A and 2B is larger than the predetermined value Vp4 in negative absolute value while the difference ΔCB between the luminance signals of the areas 2B and 2C is also larger than the predetermined value VQ4 in negative absolute value, as shown in FIG. 7(f), the main object can be assumed to be existing in the whole area 2A and in a part of the area 2B and the whole of the area 2A and a part of the area 2B to be under illumination by some light. Under this condition, it is necessary to make correction with some correction value, unlike in the case of Para. (2-5) above, for obtaining an exposure suited to the main object. Therefore, the photometric value V1−V2 is obtained from the following formula (15) using the luminance values of the areas 2A, 2B and 2C with a negative correction value −Vr9 employed:

$$V1-V2=(VA+VB+VC)/3+Vr9 \quad (15)$$

The circuit operation in this instance is as follows: The comparators 36 to 45 all produce low level outputs. The AND gate 54 produces a high level output. Other AND gates 46 to 53 produce low level outputs. Accordingly, by receiving the outputs of the comparator 36 and the AND gates 46 to 54, the gate circuit 60 makes the level of its output signal 60a high, that of another signal 60j also high and those of other signals 60b to 60i low. The operational amplifier 19 produces a voltage (VA+VB+VC)/3. The output V1−V2 of the operational amplifier 24 becomes (VA+VB+VC)/3+Vr9.

Figure 7G:
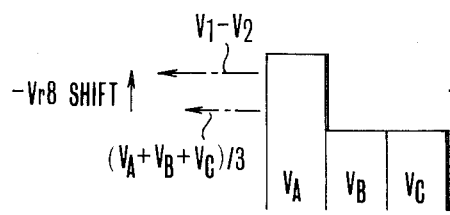

(2-7) Under a condition of $$\begin{pmatrix} \Delta BA & < & Vp4 & \\ VQ4 & < & \Delta CB & < & VQ3 \end{pmatrix},$$

that is, when the difference ΔBA between the luminance signals of the areas 2A and 2B is larger than the predetermined value Vp4 in negative absolute value while the difference ΔCB between the luminance signals of the areas 2B and 2C is small as shown in FIG. 7(g), the main object can be assumed to be existing either in the whole area 2A or just in a part of the area 2A because of its small size. Under that condition, to give an apposite exposure for the main object, the photometric value V1−V2 is obtained from the following formula (16) using the luminance values of the areas 2A, 2B and 2C with a negative correction value −Vr8 also employed:

$$V1-V2 = (VA+VB+VC) / 3 + Vr8 \qquad (16)$$

The circuit operation: The comparators 36, 38, 39 and 43 produce low level outputs. Meanwhile, the comparator 42 produces a high level output. The AND gates 52 and 54 produce high level outputs. Other AND gates 46 to 51 and 53 produce low level outputs. Upon receipt of the outputs of the comparator 36 and the AND gates 46 to 54, the gate circuit 60 makes the level of its output signal 60a high, that of another signal 60i also high and those of other signals 60b to 60h and 60j low. The operational amplifier 19 produces a voltage (VA+VB+VC) / 3. The output V1−V2 of the operational amplifier 24 becomes (VA+VB+VC) / 3+Vr8.

Figure 7H:
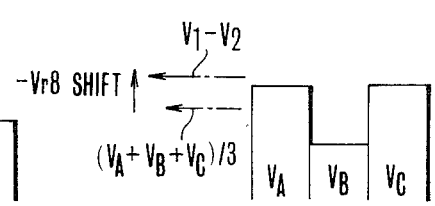

(2-8) Under a condition of $$\begin{pmatrix} \Delta BA & < & Vp4 \\ VQ3 & < & \Delta CB \end{pmatrix},$$

that is, when the difference ΔBA between the luminance signals of the areas 2A and 2B is larger in negative absolute value than the predetermined value Vp4 while the difference ΔCB between the luminance signals of the areas 2B and 2C is also larger than the predetermined value VQ3, as shown in FIG. 7(h), the main object can be assumed to be of about the same size as in the case of Para. (2-1) above including bright and dark parts therein thus causing the luminance of the area 2B to be somewhat high though the main object is as a whole in a blackish color or, in the case of indoor photographing, the area 2B can be assumed to have a window or the like with an object of a relatively low degree of luminance occupying the area 2B. Under such a condition, it is known from data that an adequate result may be obtainable by obtaining the photometric value V1−V2 on the basis of the luminance values of only the areas 2A and 2B without any correction value depending on the conditions of the photographing field. In the case of this embodiment, however, a method for obtaining an overall acceptable result is employed. Namely, the photometric value V1−V2 is obtained on the basis of the luminance values of all the areas 2A, 2B and 2C from the following formula (17) using a negative correction value −Vr8:

$$V1-V2 = (VA+VB+VC) / 3 + Vr8 \qquad (17)$$

The circuit operation: The comparators 36 to 39 produce low level outputs. The comparators 42 and 43 produce high level outputs. The AND gate 52 produces a high level output. Other AND gates 46 to 51, 53 and 54 produce low level outputs. Upon receipt of the outputs of the comparator 36 and the AND gates 46 to 54, the gate circuit 60 makes the level of its output signal 60a high, that of its signal 60i also high and those of its other signals 60b to 60h and 60j low. The operational amplifier 19 produces a voltage (VA+VB+VC) / 3. The output V1−V2 of the operational amplifier 24 becomes (VA+VB+VC) / 3+Vr8.

Figure 7I:
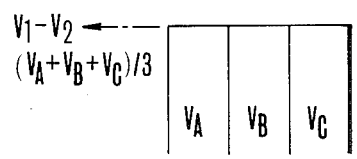

(2-9) Under a condition of $$\begin{pmatrix} Vp4 & < & \Delta BA & < & Vp3 \\ VQ4 & < & \Delta CB & < & VQ3 \end{pmatrix},$$

that is, when the difference ΔBA between the luminance signals of the areas 2A and 2B is small while the difference ΔCB between the luminance signals of the areas 2B and 2C is also small as shown in FIG. 7(i), either the main object can be assumed to occupy the whole photographing field or the field can be assumed to have nothing in particular set as the main object. In this instance, to give an exposure suitable for all the areas 2A, 2B and 2C, the photometric value V1−V2 is obtained from the following formula (18) using the luminance values of all the areas 2A, 2B and 2C with no correction value:

$$V1-V2 = (VA\ VB\ VC) / 3 \qquad (18)$$

The circuit operation: The comparators 36, 38 and 43 produce low level outputs. The comparators 39 and 42 produce high level outputs. The AND gates 49 and 51 produce high level outputs. Other AND gates 46 to 48, 50 and 52 to 54 produce low level outputs. Upon receipt of the outputs of the comparator 36 and the AND gates 46 to 54, the gate circuit 60 makes the level of its output signal 60a high, that of another signal 60f also high and those of other signals 60b to 60e and 60g to 60j low. The output of the operational amplifier 19 becomes a voltage (VA+VB+VC) / 3 and the output V1−V2 of the operational amplifier 24 also (VA+VB+VC) / 3.

The photometric arrangement of the embodiment described is capable of detecting the size of the main object and making appropriate correction according to the detected size on the assumption that the main object is located in the middle part (the area 2A) of the photographing field. Another advantage of the photometric arrangement resides in that: When the object to be photographed is found to be in a whity or blackish color, the object can be photographed with its whity or blackish feature intentionally made conspicuous by correcting the exposure through highlight- or shadow-depicting control over the exposure. The degree of correction of the photometric value for that purpose is arranged to vary with the size of the main object, so that the photometric value can be effectively controlled.

In the illustrations given in FIGS. 6 and 7, when the luminance signal difference between adjacent areas is small, these areas are depicted as if they are at an equal level of luminance for the sake of illustration. In actuality, the measured luminance value of each area of course differs to some degree, for example, from that of the neighboring area in most cases even when the luminance difference between the adjacent areas is smaller than the predetermined value Vp1.

In the foregoing description of the embodiment, the computing formulas used for obtaining the photometric value V1−V2 are divided into two groups, one for cases where the luminance of the peripheral part of the image plane is high and the other for cases where the luminance is low. However, this arrangement may be replaced by an arrangement of dividing these formulas into three groups instead of two by including a group for cases where the peripheral part has some intermediate degree of luminance. The latter classification permits more elaborate control over the photometric value. The photographing field may be divided into more than three annular zones or areas to use the luminance signal differences among a greater number of neighboring areas.

As described in the foregoing, the first embodiment gives a highly advantageous photometric arrangement based on the assumption that the main object is located in the middle part of the photographing field. The photometric arrangement is particularly advantageous in that the size of the main object is discernible and that a computing formula best suited for the size of the object is selectable from among a plurality of photometric value computing formulas. Therefore, the photometric value computation can be appositely accomplished.

Figure 8:
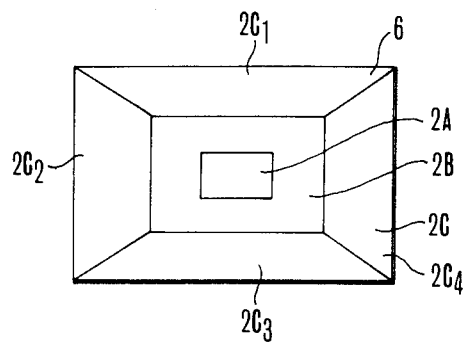
FIG. 8 is an illustration of a plurality of photometric areas of the light receiving surface of light receiving means arranged as a second embodiment of this invention.

A second embodiment of this invention is arranged as follows: FIG. 8 shows the light receiving surface of a light receiving part 6 which is positioned as shown in FIG. 1 and arranged as a part of the second embodiment. As shown in FIG. 8, the light receiving surface includes a middle area 2A which is located in the middle part of a photographing field; an intermediate area 2B which surrounds the middle area 2A; and a peripheral area 2C which surrounds the area 2B and is divided into four parts 2C1 to 2C4. In the case of this embodiment, a plurality of light receiving photo-sensitive elements are arranged to receive the light of the areas of the photographing field corresponding to the above stated areas. The photographing field is thus divided into six areas 2A, 2B and 2C1 to 2C4. The embodiment measures the luminance of the field for each of these areas.

FIGS. 9 to 12 are circuit diagrams showing the circuit arrangement of the second embodiment.

Figure 9:
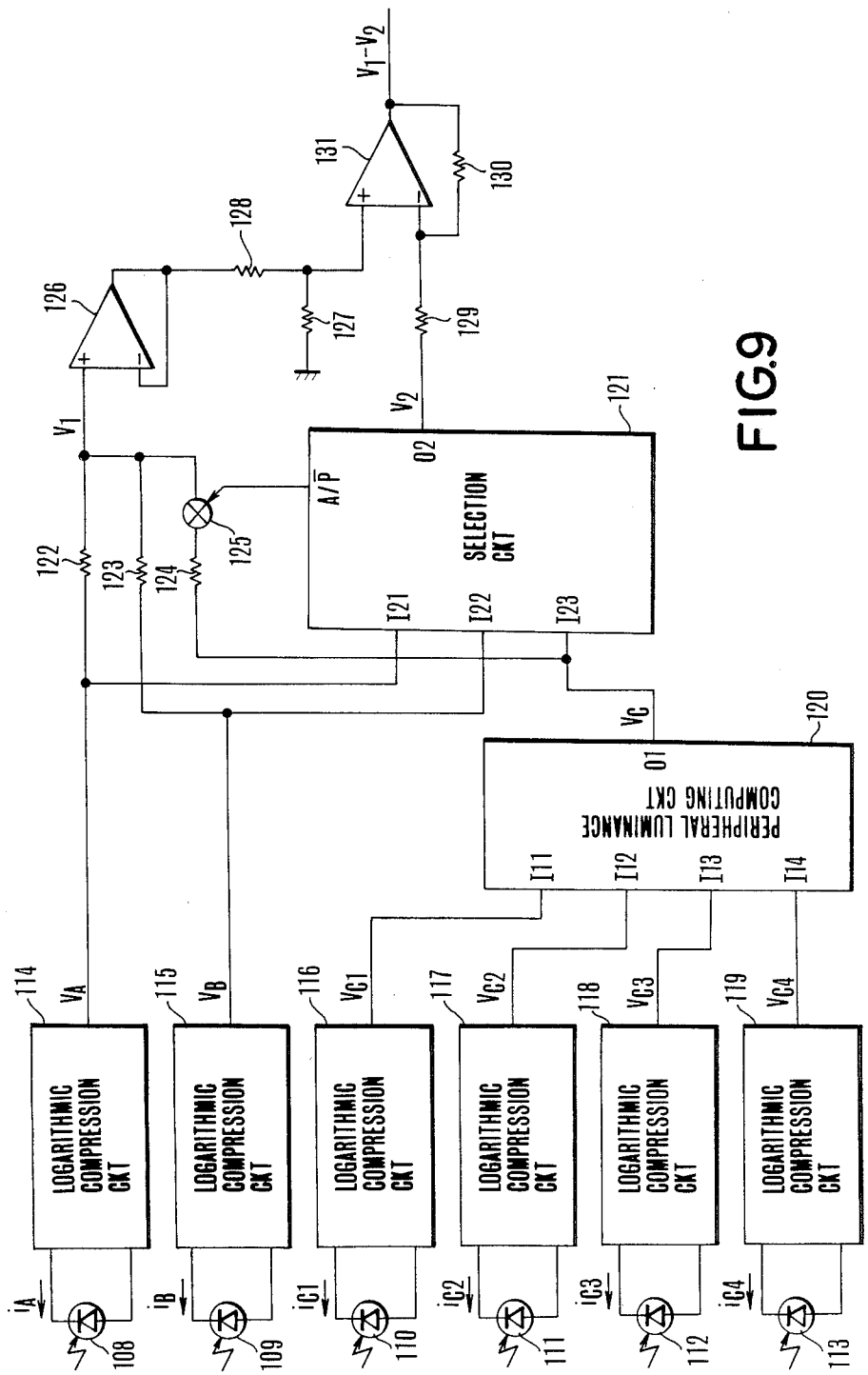
FIG. 9 is a circuit diagram showing a light measuring device arranged as the second embodiment.

Referring to FIG. 9, silicon photo-diodes (SPDs) 108, 109, 110, 111, 112 and 113 are arranged to correlate with the above stated six areas 2A, 2B, 2C1, 2C2, 2C3 and 2C4. These SPDs generate photo currents iA, iB, iC1, iC2, iC3 and iC4 according to the degrees of luminance of the corresponding areas. Logarithmic compression circuits 114 to 119 are arranged to logarithmically compress these photo currents and to produce voltage values VA, VB, VC1, VC2, VC3 and VC4, which can be expressed as shown below by using constants a1, a2, a3, a4, a5 a6 (which is greater than or equal to 0) and b (greater than 0) and the photo currents iA, iB, iC1, iC2, iC3 and iC4:

$$VA = a1 + b \cdot \ln iA \quad VC2 = a4 + b \cdot \ln iC2$$
$$VB = a2 + b \cdot \ln iB \quad VC3 = a5 + b \cdot \ln iC3$$
$$VC1 = a3 + b \cdot \ln iC1 \quad VC4 = a6 + b \cdot \ln iC4$$

Figure 11:
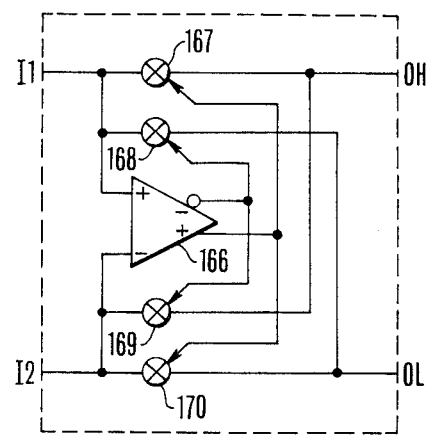
FIG. 11 is a circuit diagram showing the details of a magnitude discrimination circuit shown in FIG. 10.
Figure 10:
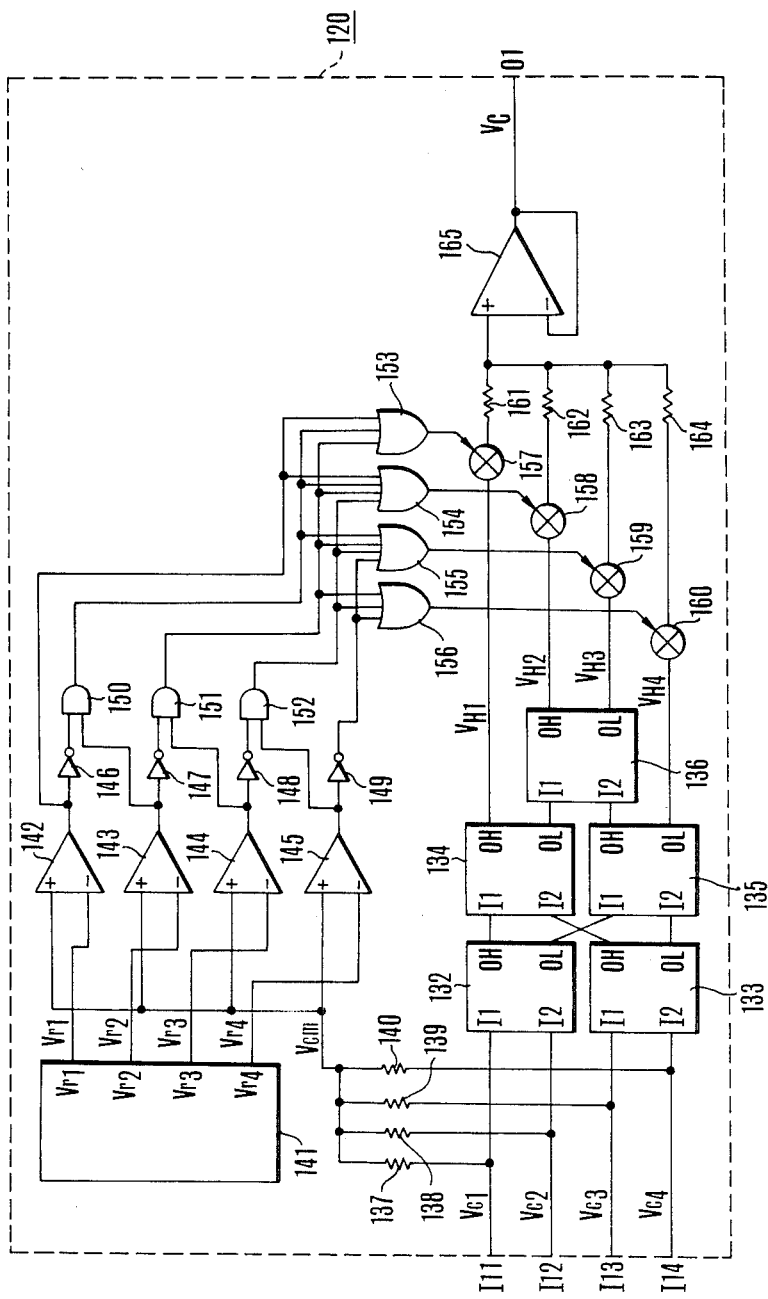
FIG. 10 is a circuit diagram showing the details of a peripheral luminance computing circuit shown in FIG. 9.

In the above formulas, the constants a1, a2, a3, a4, a5 and a6 are preset within the logarithmic compression circuits 114 to 119 in such a way as to have the following relation when these areas have the same degree of luminance: $VA = VB = VC1 = VC2 = VC3 = VC4$. A peripheral luminance computing circuit 120 is arranged to receive the voltages VC1, VC2, VC3 and VC4 produced from the circuits 116 to 119 at its input terminals I11, I12, I13 and I14 respectively and to produce from its output terminal 01 a voltage VC by computing the luminance value of the outermost peripheral area 2C of the photographing field. The details of arrangement of this peripheral luminance computing circuit 120 are as shown in FIG. 10. Referring to FIG. 10, each of magnitude comparison circuits 132, 133, 134, 135 and 136 is arranged to receive two voltage values at its input terminals I1 and I2 and to produce the larger of the two voltage inputs from its output terminal OH and the smaller of these inputs from another output terminal OL. FIG. 11 shows by way of example the details of arrangement of each of these comparison circuits 132 to 136. Referring to FIG. 11, a comparator 166 is provided with non-inverting and inverting input terminals and non-inverting and inverting output terminals. The comparator 166 produces a high level voltage output from the non-inverting output terminal and a low level voltage from the inverting output terminal when a voltage V+ received at the non-inverting input terminal is higher than or equal to a voltage V− received at the inverting input terminal and produces a low level voltage from the non-inverting output terminal and a high level voltage from the inverting output terminal when the input voltage V− is lower than the input voltage V−. Analog switches 167 to 170 are arranged to become conductive when a voltage applied to their control terminals is at a high level and open when the voltage applied is at a low level. Assuming that the voltage coming to the input terminal I1 of the comparison circuit is VI1 and the voltage coming to the other input terminal I2 is VI2, when the incoming voltage VI1 is higher than or equal to the incoming voltage VI2, the voltage V+ coming to the non-inverting input terminal of the comparator 166 is higher than or equal to the voltage V− coming to the inverting input terminal of the comparator 166. In this instance, the level of the output voltage of the comparator 166 becomes low. The level of the control voltage on the analog switches 167 and 170 becomes high. The level of the control voltage on other analog switches 168 and 169 becomes low. As a result, the analog switches 167 and 170 become conductive while the analog switches 168 and 169 open. Therefore, the voltage VI1 is produced via the analog switch 167 from the output terminal OH. The voltage VI2 is produced via the analog switch 170 from the output terminal OL. In case that the voltage VI1 is lower than the voltage VI2, the voltage V+ received at the non-inverting input terminal of the comparator 166 becomes lower than the voltage V− received at the inverting input terminal of the comparator. Then, the voltage of the non-inverting output terminal of the comparator 166 becomes low and that of the inverting output terminal becomes high. Then, since the control voltage applied to the analog switches 167 and 170 is at a low level in that event, the switches 167 and 170 open. Since the control voltage applied to the analog switches 168 and 169 is then at a high level, the switches 168 and 169 become conductive. In that instance, the voltage VI2 is produced via the analog switch 169 from the output terminal OH while the voltag VI1 is produced via the analog switch 168 from the output terminal OL. The output terminal OH is thus arranged to produce the higher of the voltages VI1 and VI2 and the output terminal OL to produce the lower of the two voltages. In the case of FIG. 10, five magnitude comparison circuits are thus arranged to produce the highest of the voltages VC1, VC2, VC3 and VC4 as a voltage VH1, the second highest of them as a voltage VH2, the third highest of them as a voltage VH3 and the lowest of them as VH4. The voltage VC1 is supplied to the input terminal I1 of the magnitude comparison circuit 132 while the voltage VC2 is supplied to its input terminal I2. Then, the higher of the two voltage inputs is produced from the output terminal OH of the circuit 132 while the lower of the two is produced from the output terminal OL thereof. The magnitude comparison circuit 133 is likewise arranged to receive the voltage VC3 at its input terminal I1 and the voltage VC4 at its other input terminal I2 and to produce the higher of these inputs from its output terminal OH and the lower of them from its terminal OL. The magnitude comparison circuit 134 is arranged to receive the voltages produced from the output terminals OH of the comparison circuits 132 and 133 at the input terminals I1 and I2 respectively; to compare these inputs; to produce the higher of them from its output terminal OH; and to produce the lower of them from the other output terminal OL. The voltages thus produced from the output terminal OH of the circuit 134 is the highest of the voltages VC1, VC2, VC3 and VC4. The magnitude comparison circuit 135 is arranged likewise to receive at its input terminals I1 and I2 the voltages from the output terminals OL of the magnitude comparison circuits 132 and 133; to compare the magnitudes of them; to produce from its output terminal OH the higher of them; and to produce from its output terminal OL the lower of them. The voltage produced from the output terminal OL of the circuit 135 is the lowest of the voltages VC1, VC2, VC3 and VC4. Another magnitude comparison circuit 136 is arranged to receive at its input terminals I1 and I2 the voltage from the output terminal OL of the comparison circuit 135 and the voltage from the output terminal OH of the comparison circuit 135 and to compare these inputs. The magnitude comparison circuit 136 is thus arranged to compare two intermediate voltage values excluding the highest and the lowest of the voltages VC1, VC2, VC3 and VC4. As a result, the second highest of the voltages VC1, VC2, VC3 and VC4 is produced from the output terminal OH of the circuit 136 while the third highest of these voltages is produced from the output terminal OL of the comparison circuit 136. The voltages VC1, VC2, VC3 and VC4 are thus rearranged in the order of higher voltage values, i.e. they are rearranged to be $VH1 \geq VH2 \geq VH3 \geq VH4$. Resistors 137 to 140 are arranged to be of the same resistance value and to average the values VC1, VC2, VC3 and VC4. A voltage VCm thus obtained can be expressed as $VCm = (VC1 + VC2 + VC3 + VC4)/4$. A reference voltage generating circuit 141 is arranged to generate reference voltages Vr1, Vr2, Vr3 and Vr4. The magnitude relation among these reference voltages Vr1, Vr2, Vr3 and Vr4 is as follows: $Vr1 > Vr2 > Vr3 > Vr4$. Comparators 142 to 145 are arranged to compare the above stated average value VCm with the reference voltages Vr1, Vr2, Vr3 and Vr4. These comparators 142, 143, 144 and 145 produce high level voltages if the value VCm is larger than or equal to the reference voltage values Vr1, Vr2, Vr3 and Vr4 and low level voltages if the value VCm is smaller than them respectively. The embodiment includes inverters 146, 147, 148 and 149 and AND gates 150, 151 and 152. The input terminal of the inverter 146 is connected to the output terminal of the comparator 142, that of the inverter 147 to the output terminal of the comparator 143, that of the inverter 148 to the output terminal of the comparator 144 and that of the inverter 149 to the output terminal of the comparator 145. One of the input terminals of the AND gate 150 is connected to the output terminal of the inverter 146 while the other input terminal is connected to the output terminal of the comparator 143. One of the input terminals of the AND gate 151 is connected to the output terminal of the inverter 147 and the other to the output terminal of the comparator 144. One of the input terminals of the AND gate 152 is connected to the output terminal of the inverter 148 and the other to the output terminal of comparator 145. Reference numerals 153 to 156 denote OR gates. The OR gate 153 has three input terminals, which are connected to the output terminal of the comparator 142, to that of the AND gate 150 and to that of the AND gate 151 respectively. The OR gate 154 has four input terminals, which are connected to the output terminal of the comparator 142 and to those of the AND gates 150, 151 and 152 respectively. The OR gate 155 has four input terminals, which are connected to the output terminals of the AND gates 150, 151 and 152 and to that of the inverter 149 respectively. The OR gate 156 has three input terminals, which are connected to the output terminals of the AND gates 151 and 152 and to that of the inverter 149 respectively. Analog switches 157 to 160 are arranged to be controlled by the OR gates 153 to 156. Resistors 161 to 164 are of the same resistance value. These resistors 161 to 164 are arranged to average two, three or four of voltages VH1, VH2, VH3 and VH4, counting them in the order of highe voltages, according as they are produced from the analog switches 157 to 160 when these switches become conductive or to average two or three of these voltage outputs counting them in the order of lower voltages. An operational amplifier 165 has its output terminal and its inverting input terminal interconnected and is arranged to serve as a voltage follower. The output terminal of the operational amplifier 165 produces a voltage which is thus arranged to be equal to an incoming voltage received at its non-inverting input terminal irrespectively of the conditions of circuit elements ensuing the output terminal. The output voltage of the amplifier 165 is used as the voltage VC and is produced from the output terminal O1 of the peripheral luminance computing circuit 120. Referring further to FIG. 10, the features of the photographing field and the value of the voltage VC obtained from a magnitude relation of the above stated average value VCm to the reference voltages Vr1, Vr2, Vr3 and Vr4 are as described below:

(1) $Vr1 \leq VCm$—Analog switches 157 and 158 are conductive: This condition strongly suggests a scene with a fairly bright background. In view of this, therefore, the value VC is set at $VC = (VH1 + VH2)/2$ with the luminance of the areas 2C1, 2C2, 2C3 and 2C4 which have relatively low degree of luminance disregarded.

(2) $Vr2 \leq VCm < Vr1$—Switches 157 and 158 are conductive: This suggests a scene with a rather bright background like an outdoor scene under a clear sky. Under such a condition, however, some undesirable background object tends to appear showing a low degree of luminance such as a shadowed ground. In this case, therefore, the value VC is set at $VC = (VH1 + VH2 + VH3)/3$ by ignoring the luminance of the area of the lowest luminance.

(3) $Vr3 \leq VCm < Vr2$—Analog switches 157, 158, 159 and 160 are conductive: This condition suggests a normal bright scene. In this instance, therefore, relatively bright parts and relatively dark parts alike cannot be ignored. Therefore, the value VC is set at VC=(VH1+VH2+VH3+VH4) / 4.

(4) Vr4≦VCm<Vr3—Analog switches 158, 159 and 160 are conductive: This suggests a scene with a rather dark background. Therefore, by ignoring the area of the highest degree of luminance, the value VC is set at VC=(VH2+VH3+VH4) / 3.

(5) VCm<Vr4—Switches 159 and 160 are conductive: This suggests a scene with a considerably dark background like a night scene. Under such a condition, some object that is undesirable for background luminance such as electric lamps tends to appear. In this instance, by ignoring the area of a relatively high degree of luminance, the value VC is set at VC=(VH3+VH4) / 2.

As described above, the peripheral luminance computing circuit 120 is arranged to give the computed value VC which is obtained by averaging two, three or four of the values VH1, VH2, VH3 and vH4 counting them in the order of larger values or by averaging two or three of them by counting them in the order of smaller values. The value VC thus computed is then produced from the output terminal 01. Again referring to FIG. 9, a selection circuit 121 is arranged to have the output voltages VA and VB of the logarithmic compression circuits 114 and 115 and the output voltage VC of the peripheral luminance computing circuit 120 supplied to its input terminals I21, I22 and I23 respectively and to determine which of a plurality of computing formulas is to be selected as will be described later. FIG. 9 includes resistors 122, 123 and 124 which are of the same resistance value and an analog switch 125. The resistors 122, 123 and 124 and the analog switch 125 jointly form a mean value circuit. When a high level voltage is supplied from the output terminal A/$\overline{P}$ of the selection circuit 121 to the control terminal of the analog switch 125, the switch 125 becomes conductive. Then, the output voltage V1 of the mean value circuit becomes (VA+VB+VC)/3. The analog switch 125 opens upon receipt at its control terminal of a low level voltage produced from the output terminal A/$\overline{P}$ of the selection circuit 121. With the switch 125 having thus opened, the output voltage V1 of the mean value circuit becomes (VA+VB)/2. An operational amplifier 126 has its output terminal connected to its inverting input terminal and is thus arranged to function as a voltage follower. The output voltage V1 of the mean value circuit is supplied to the non-inverting input terminal of the amplifier 126. The output terminal of the amplifier 126 produces a voltage which remains the same as the voltage V1 irrespectively of the conditions of circuit elements ensuing the output terminal. Resistors 127, 128, 129 and 130 are of the same resistance value and are arranged to form a subtraction circuit in conjunction with an operational amplifier 131. Assuming that a voltage produced from the output terminal 02 of the selection circuit 121 is V2, the subtraction circuit produces a voltage V1−V2. This voltage V1−V2 represents a photometric value to be determined by the plurality of computing formulas described later herein.

Figure 12:
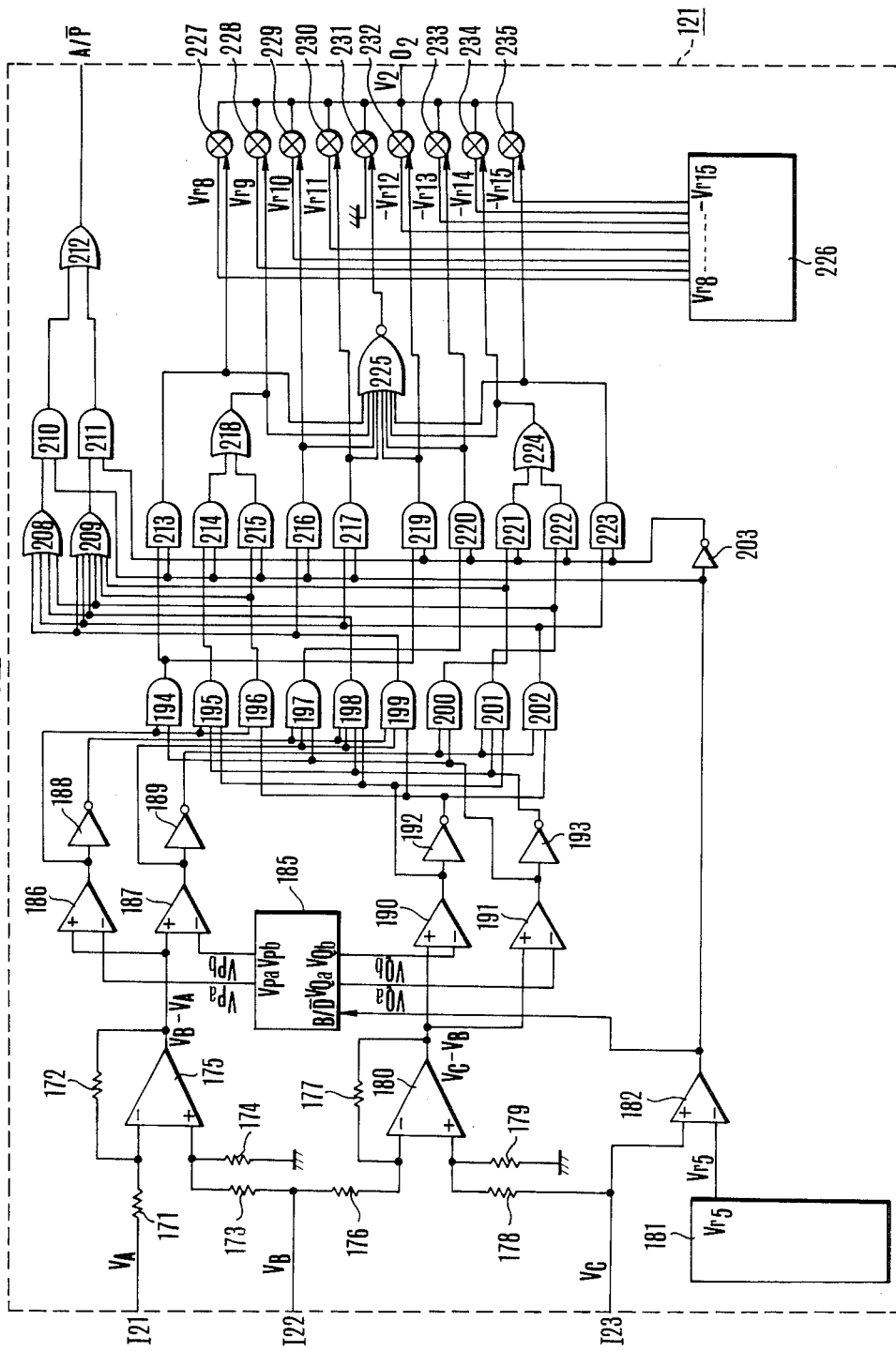
FIG. 12 is a circuit diagram showing the details of a selection circuit shown in FIG. 9.
Figure 13A:
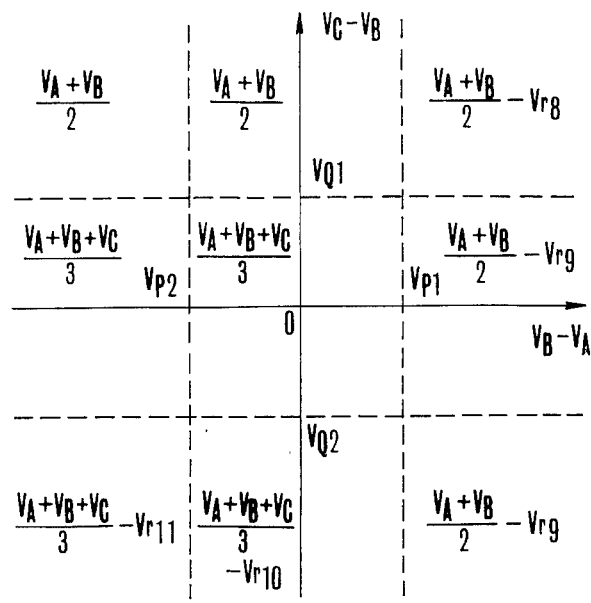
FIGS. 13($a$) and 13($b$) are illustrations of photometric value computing formulas selectable by the circuit of FIG. 9.
Figure 13B:
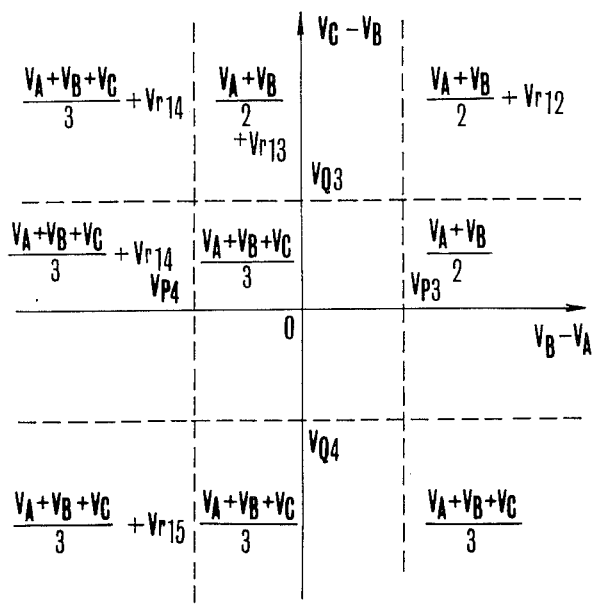

FIG. 12 is a circuit diagram showing the details of the selection circuit 121 of FIG. 9. Resistors 171, 172, 173 and 174 have the same resistance value. An operational amplifier 175 is arranged to form a first subtraction circuit in conjunction with the resistors 171 to 174. Another group of resistors 176, 177, 178 and 179 likewise are of the same resistance value. Another operational amplifier 180 forms a second subtraction circuit in conjunction with these resistors 176 to 179. The first subtraction circuit is arranged to receive the voltages VA and VB and to produce a voltage VB−VA. The second subtraction circuit is arranged to receive the voltages VB and VC and to produce a voltage VC−VB. A reference voltage generating circuit 181 generates a reference voltage Vr5. A comparator 182 is arranged to receive the voltage VC at its non-inverting input terminal and the above stated reference voltage Vr5 at its inverting input terminal. The comparator 182 produces a high level voltage when the voltage VC is higher than or equal to the reference voltage Vr5 and a low level voltage when the latter (Vr5) is higher than the former (VC). Another reference voltage generating circuit 185 is arranged to generate reference voltages VPa, VPb, VQa and VQb. The reference voltage generating circuit 185 is provided with a ontrol terminal B/$\overline{D}$, which is arranged to receive the output voltage of the comparator 182 as a control voltage. When a high level control voltage is received at the terminal B/$\overline{D}$, the reference voltages of the circuit 185 are assumed to be as follows: VPa=VP1, VPb=VP2, VQa=VQ1 and VQb=VQ2. When a low level control voltage is received, the reference voltages are assumed to be: VPa=VP3, VPb=VP4, VQa=VQ3 and VQb=VQ4. The reference voltages VP1 to VP4 and VQ1 to VQ4 are in positive values in the case of VP1, VP3, VQ1 and VQ3 and are in negative values in the case of VP2, VP4, VQ2 and VQ4. Reference numerals 186 and 187 denote comparators and 188 and 189 inverters. The output voltage VB−VA of the operational amplifier 175 of the first subtraction circuit is supplied to the non-inverting input terminals of the comparators 186 and 187. The inverting input terminal of the comparator 186 is arranged to receive either the reference voltage VP1 or VP3 according as the control voltage received at the control terminal B/$\overline{D}$ of the reference voltage generating circuit 185 is at a high level or at a low level. The inverting input terminal of the other comparator 187 is likewise arranged to receive either the reference voltage VP2 or PV4. Numerals 190 and 191 denote comparators, and 192 and 193 inverters. The comparators 190 and 191 are arranged to receive the voltage VC−VB produced from the operational amplifier 180 of the second subtraction circuit. Meanwhile, the inverting input terminal of the comparator 191 is arranged to receive either the reference voltage VQ1 or VQ3 according as the control voltage received at the control terminal B/$\overline{D}$ of the reference voltage generating circuit 185 is at a high level or at a low level. The inverting input terminal of the comparator 190 is likewise arranged to receive either the reference voltage VQ2 or the reference voltage VQ4. These comparators 186, 187, 190 and 191 produce either high level voltages or low level voltages from their output terminals according to the magnitudes of the voltages V+ supplied to their non-inverting input terminals and the voltages V− supplied to their inverting input terminals. In other words, they produce high level voltages when the voltage V+ is higher than or equal to the voltage V− and low level voltages when the latter is higher than the former. The selection circuit 121 further includes AND gates 194 to 202. One of these AND gates produces a high level voltage according to the high- and low-level combination of the outputs of the comparators 186, 187, 190 and 191 while the rest of the AND gates produce low level voltages. Among the AND gates 146 to 154, some of them produces a high level output according to magnitude relations between the voltages VB−VA and VPa or VPb and between the voltages VC−VB and VQa or VQb as described in detail below:

(1) $VB - VA \geq VPa$
   (a) $VC - VB \geq VQa$     AND gate 194
   (b) $VQa > VC - VB \geq VQb$     AND gate 195
   (c) $VQb > VC - VB$     AND gate 196

(2) $VPa > VB - VA \geq VPb$
   (a) $VC - VB \geq VQa$     AND gate 197
   (b) $VQa > VC - VB \geq VQb$     AND gate 198
   (c) $VQb > VC - VB$     AND gate 199

(3) $VPb > VB - VA$
   (a) $VC - VB \geq VQa$     AND gate 200
   (b) $VQa > VC - VB \geq VQb$     AND gate 201
   (c) $VQb > VC - VB$     AND gate 202

An inverter 203 is arranged to invert the output of the comparator 182. Numerals 208 and 209 denote OR gates; 210 and 211 denote AND gate; and 212 denotes an OR gate. The OR gate 208 has four input terminals which are connected to the output terminals of the AND gates 198, 199, 201 and 202. When one of the AND gates 198, 199, 201 and 202 produces a high level voltage, the OR gate 208 produces a voltage at a high level. The OR gate 209 has six input terminals connected to the output terminals of the AND gates 196 and 198 to 202. When one of the AND gates 196 and 198 to 202 produces a high level voltage, the output level of the OR gate 209 becomes high. One of two input terminals of the AND gate 210 is connected to the output terminal of the OR gate 208 while the other is connected to the output terminal of the comparator 182. When the comparator 182 produces a high level output, the output state of the AND gate 210 is equal to that of the OR gate 208. In that instance, since one of two input terminals of the AND gate 211 is connected to the output terminal of the inverter 203 and since one of the inputs of the AND gate 211 is at a low level, the output level of the AND gate 211 is low.

One of two input terminals of the AND gate 211 is connected to the output terminal of the OR gate 209 and the other to the output terminal of the inverter 203. When the comparator 182 produces a low level voltage, the low level voltage is supplied to one of the input terminals of the AND gate 210. Therefore, the level of the output of the AND gate 210 then becomes a low level voltage. At that time, the output voltage of the inverter 203 is at a high level to apply the high level voltage to one of two input terminals of the AND gate 211. Therefore, the output state of the AND gate 211 is equal to that of the OR gate 209. The outputs of the AND gates 210 and 211 are respectively supplied to the OR gate 212. When at least one of the AND gates 210 and 211 is producing a high level voltage, the OR gate 212 produces a high level voltage. The output terminal of the OR gate 212 is arranged to serve as the output terminal A/P of the selection circuit 121.

The circuit 121 further includes AND gates 213, 217, 219 and 223; OR gates 218 and 224; and a NOR gate 225. A reference voltage generating circuit 226 is arranged to generate reference voltages Vr8, Vr9 Vr10, Vr11, −Vr12, −Vr13, −Vr14 and −Vr15. Numerals 227 and 235 denote analog switches. One of two input terminals of each of two-input AND gates 213 to 217 is connected to the output terminal of the comparator 182. On of two input terminals of each of two-input AND gates 219 to 223 is connected to the output terminal of the inverter 203. The other input terminal of the AND gate 213 is connected to the output terminal of the AND gate 194; that of the AND gate 214 to the output terminal of the AND gate 195; that of the AND gate 215 to the output terminal of the AND gate 196; that of the AND gate 216 to the output terminal of the AND gate 199; that of the AND gate 217 to the output terminal of the AND gate 202 respectively. The other input terminal of the AND gate 219 is connected to the output terminal of the AND gate 194; that of the AND gate 220 to the output terminal of the AND gate 197; that of the AND gate 221 to the output terminal of the AND gate 200; that of the AND gate 222 to the output terminal of the AND gate 201; and that of the AND gate 223 to the output terminal of the AND gate 202.

Therefore, when a high level voltage is produced from the output terminal of the comparator 182, each of the AND gates 213 to 217 has a low level voltage supplied to one of its input terminals. Therefore, the output of the AND gate 213 becomes equal to that of the AND gate 194; the output of the AND gate 214 equal to that of the AND gate 195; the output of the AND gate 215 equal to that of the AND gate 196; the output of the AND gate 216 equal to that of the AND gate 199; and the output of the AND gate 217 equal to that of the AND gate 202. The levels of the output voltages of the AND gates then become low. Conversely, when the output terminal of the inverter 203 produces a high level voltage, each of the AND gates 213 to 217 receives a low level voltage at one of its input terminals and each of the AND gates 219 to 223 a high level voltage at one of its input terminals. Therefore, the AND gates 213 to 217 produce low level voltages. The output of the AND gate 219 is then equal to that of the AND gate 194; the output of the AND gate 220 equal to that of the AND gate 197; the output of the AND gate 221 equal to that of the AND gate 200; the output of the AND gate 222 equal to that of the AND gate 201; and the output of the AND gate 223 equal to that of the AND gate 202. One of two input terminals of the OR gate 218 is connected to the output terminal of the AND g te 214 and the other to that of the AND gate 215. The output level of the OR gate 218 becomes high when at least one of the output voltages of the AND gates 215 and 216 is at a high level. One of two input terminals of the OR gate 224 is connected to the output terminal of the AND gate 221 and the other to that of the AND gate 222. The output level of the OR gate 224 becomes high when at least one of the output voltages of the AND gates 221 and 222 is at a high level. The NOR gate 225 is provided with eight input terminals, which are respectively connected to the output terminal of the AND gate 213, that of the OR gate 218, that of the AND gate 216, that of the AND gate 217, that of the AND gate 219, that of the AND gate 220; that of the OR gate 224 and that of the AND gate 223. The level of the output voltage of the NOR gate becomes high when the levels of the outputs of all the AND gates 213, 217, 219 and 223 are high and is low in all other cases.

Analog switches 227, 230, 232 and 235 are arranged to receive at their input terminals reference voltages generated by a reference voltage generating circuit 226. A reference voltage Vr8 is applied to the input terminal of the switch 228; a reference voltage Vr9 to that of the switch 228; a reference voltage Vr10 to that of the switch 229; a reference voltage Vr11 to that of the switch 230; a reference voltage −Vr12 to that of the switch 232; a reference voltage −Vr13 to that of the switch 233; a reference voltage −Vr14 to that of the switch 234; and a reference voltage −Vr15 to that of the switch 235. The input terminal of the analog switch 231 is at a zero volt. The output terminals of the analog switches 227 to 237 are interconnected to jointly form the output terminal 02 of the selection circuit 121. The control terminal of the switch 227 is connected to the output terminal of the AND gate 213; that of the switch 228 to the output terminal of the OR gate 218; that of the switch 229 to the output terminal of the AND gate 216; that of the switch 230 to the output terminal of the AND gate 217; that of the switch 231 to the output terminal of the NOR gate 225; that of the switch 232 to the output terminal of the AND gate 219; that of the switch 233 to the output terminal of the AND gate 220; that of the switch 234 to the output terminal of the OR gate 224; and that of the switch 235 to the output terminal of the AND gate 223. The AND gate 213, OR gate 218, AND gate 216, AND gate 217, NOR gate 225, AND gate 219, AND gate 220, OR gate 224 and AND gate 223 are arranged to have a high output level at the output terminal of one of them while the output levels of the rest of them are low irrespectively of the interrelation among the levels and magnitudes of the three inputs VA, VB and VC of the selection circuit of FIG. 9. Therefore, among the analog switches 227 to 235, only one of them that receives a high level control voltage becomes conductive while the rest of them remain in their open states.

When the output of the AND gate 213 is a high level voltage, the analog switch 227 becomes conductive and the voltage Vr8 is produced from the output terminal 02. When the output of the OR gate 218 is a high level voltage, the analog switch 228 becomes conductive to allow the voltage Vr9 to be produced from the output terminal 02. When the output voltage level of the AND gate 216 is high, the switch 229 becomes conductive to allow the voltage Vr10 to be produced from the output terminal 02. When the output voltage level of the AND gate 217 is high, the switch 230 becomes conductive to allow the voltage Vr11 to be produced from the output terminal 02. When the output voltage level of the NOR gate 225 is high, the switch 231 becomes conductive to have a 0 (zero) voltage output produced from the output terminal 02. When the output voltage level of the AND gate 219 is high, the switch 232 becomes conductive to allow the voltage −Vr12 to be produced from the output terminal 02. When the output voltage level of the AND gate 220 is high, the switch 233 becomes conductive to allow the voltage −Vr13 to be produced from the output terminal 02. When the output voltage level of the OR gate 224 is high, the switch 234 becomes conductive to allow the voltage −Vr14 to be produced from the output terminal 02. When the output voltage level of the AND gate 223 is high, the switch 235 becomes conductive to allow the voltage −Vr15 to be produced from the output terminal 02.

The reference voltages Vr8, Vr9, Vr10 and Vr11 is higher than 0 while other reference voltages −vr12, −Vr13, −Vr14 and −Vr15 are lower than 0.

Figure 14A:
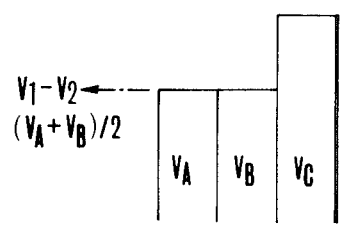
FIGS. 14($a$) to 14($i$) and 15($a$) to 15($i$) are illustrations of the levels of photometric values obtained by the photometric value computing formulas selected by the circuit of FIG. 9.

Referring to FIGS. 13(a) to 15(i), the circuit arrangement shown in FIGS. 9 and 12 operates as follows:

(1) In case that the luminance signal VC obtained from the outermost area 2C (divided into the areas 2C1 to 2C4) of the photographing field (the light receiving part 6) is higher than the reference voltage Vr5, this suggests an outdoor photographing field with the peripheral part of the image plane brightened by some bright object such as a sky or the like existing in the background. Under such a condition, the photometric value V1−V2 is obtained by using a luminance signal difference VB−VA (hereinafter referred to as luminance signal difference ΔBA) and another luminance signal difference VC−VB (hereinafter referred to as luminance signal difference ΔCB) also by using as constants the reference voltages VP1, VP2, VQ1 and VQ2 (which are in the relations of VP2<0<VP1 and VQ2<0<VQ1) in the manner as described in the following Paragraphs:

(1-1) Under a condition of $$\begin{pmatrix} VP2 & < & \Delta BA & < & VP1 \\ VQ1 & < & \Delta CB & & \end{pmatrix},$$

that is, in case where the luminance signal difference ΔBA between the middle area 2A of the photographing field area and a first outer (or intermediate) area 2B is small while the difference ΔCB between the luminance signals of the first outer area 2B and the outermost area 2C is larger than the predetermined positive value VQ1, as shown in FIG. 14(a), the main object to be photographed can be assumed to likely exist in both the areas 2A and 2B. Then. to give an exposure suited for the main object, the photometric value V1−V2 is obtained from the following formula (1-1) by using the luminance signals VA and VB without using any correction value:

$$V1-V2=(VA+VB)/2 \tag{1-1}$$

In this instance, the circuit arrangement shown in FIGS. 9 and 12 operates as follows: In the selection circuit 121 shown in FIG. 12, the comparator 182 produces a high level output as the photometric signal (voltage) for the outermost area 2C (areas 2C1 to 2C4) is higher than the reference voltage Vr5. Therefore, a high level signal is supplied to the control terminal B/D of the reference voltage generating circuit 185. This causes the reference signals of the circuit 185 to become VPa=VP1, VPb=VP2, VQa=VQ1 and VQb=VQ2. Meanwhile, the output voltage signal VB−VA of the operational amplifier 175 comes to be in the condition of VP2<ΔBA<VP1. Therefore, the output level of the comparator 186 becomes low and that of the comparator 187 high. Further, since the output voltage signal VC−VB of the operational amplifier 180 comes to be in the condition of VQ1<ΔCB, the output level of the comparator 190 becomes high and that of the comparator 191 also high. As a result, the output level of the AND gate 197 alone becomes high. The high level output of the AND gate 197, the low level outputs of the AND gates 194 to 196 and 198 to 202 and the high level output of the AND gate 206 cause the output level of the OR gate 212 to become low. The level of the output terminal A/P̄ becomes low. Then, the output level of the NOR gate 225 alone becomes high while those of other AND gates 213 to 223 become low to make the voltage of the output terminal 02 of the selection circuit 121 zero. Accordingly, the operational amplifier 126 of FIG. 9 produces a voltage (VA+VB)/2. The operational amplifier 131 then receives zero voltage at its inverting input terminal. The output V1−V2 of the amplifier 131 thus becomes the voltage (VA+VB)/2.

Figure 14B:
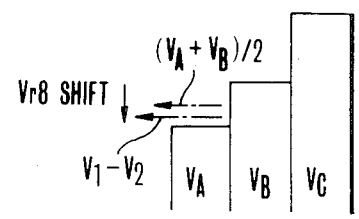

(1-2) Under a condition of $$\begin{pmatrix} VP1 & < & \Delta BA \\ VQ1 & < & \Delta CB \end{pmatrix},$$

that is, when the luminance signal difference ΔBA between the areas 2A and 2B is larger than the predetermined positive value VP1 and the luminance signal difference ΔCB is also larger than the predetermined positive value VQ1 as shown in FIG. 14(b), the main object can be regarded as existing in the whole area 2A and also in a part of the area 2B. In this instance, the photometric value V1−V2 may be obtained on the basis of only the luminance signal VA of the area 2A. However, it is known from experience that a better exposure value is obtainable with the luminance signal of the background also taken into consideration. Therefore, the photometric value V1−V2 is obtained according to the following formula (1-2) using the luminance signals VA and VB for the main object existing areas with a correction value Vr8:

$$V1-V2=(VA+VB)/2-Vr8 \qquad (1-2)$$

The circuit operation: The comparators 188, 189, 192 and 193 all produce high level outputs. The AND gate 194 alone produces a high level output while other AND gates 195 to 202 produce low level outputs. Therefore, the output level of the OR gate 212 becomes low. The output level of the AND gate 213 becomes high. The output of the operational amplifier 126 becomes a voltage (VA+VB)/2. The output V1−V2 of the operational amplifier 131 becomes (VA+VB)/2−Vr8.

Figure 14C:
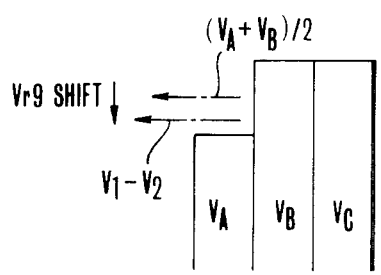

(1-3) Under a condition of $$\begin{pmatrix} VP1 & < & \Delta BA & \\ VQ2 & < & \Delta CB & < & VQ1 \end{pmatrix},$$

that is, when the luminance signal difference ΔBA between the areas 2A and 2B is larger than the predetermined positive value VP1 while the luminance signal difference ΔCB between the areas 2B and 2C is small or ignorable as shown in FIG. 14(c), the main object can be regarded as existing within the whole area 2A and is probably small in size. In this case, the photometric value V1 −V2 may be obtained on the basis of the luminance of the area 2A alone. However, to give a better exposure for the main object by taking the luminance signal VB of the area 2B which represents a background, the photometric value V1−V2 is obtained from the following formula (1-3) on the basis of the areas 2A and 2B with a correction value Vr9 (larger than Vr8) employed:

$$V1-V2=(VA+VB)/2-Vr9 \qquad (1-3)$$

The circuit operation: The comparators 186, 187 and 190 all produce high level outputs. The AND gate 195 alone produces a high level while other AND gates 194 and 196 to 202 produce low level outputs. The comparator 182 produces a high level output. Therefore, the OR gate 212 produces a low level output. The OR gate 218 produces a high level output. The output of the operational amplifier 126 becomes a voltage (VA+VB)/2. The output V1−V2 of the operational amplifier 131 becomes (VA+VB)/2−Vr9.

Figure 14D:
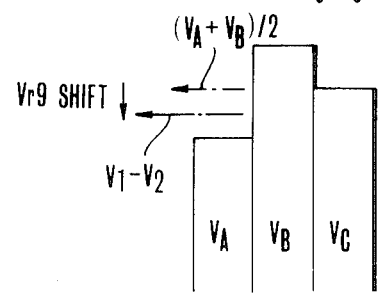

(1-4) Under a condition of $$\begin{pmatrix} VP1 & < & \Delta BA \\ \Delta CB & < & VQ2 \end{pmatrix},$$

that is, when the luminance signal difference ΔBA between the areas 2A and 2B is larger than the positive predetermined value VP1 and the luminance signal difference ΔCB between the areas 2B and 2C is smaller than the negative predetermined value VQ2, as shown in FIG. 14(d), the main object can be assumed to be of about the same size as in the case of Para. (1-3) above and to have some object that is of a considerably high degree of luminance, such as the sun or a reflecting sea surface, in the area 2B or, in the case of photographing a landscape scenery, the area 2B can be assumed to have a considerably bright object located therein. In such a case, the inventors have found that the photometric value V1−V2 can be adequately obtained from a formula V1−V2=(VA+VB+VC)/3 using the luminance values of all the areas 2A, 2B and 2C without using any correction value. However, this embodiment employs another method for obtaining an adequate result. Namely, the photometric value is obtained in this instance from the following formula (1-4) using the luminance values of the areas 2A and 2B, in the same manner as in Para. (1-3) above, and also using a correction value Vr9:

$$V1-V2=(VA+VB)/2-Vr9 \qquad (1-4)$$

The circuit operation: The comparators 186 and 187 produce high level outputs while the comparators 190 and 191 produce low level outputs. The AND gate 196 produces a high level output while other AND gates 194, 195 and 197 to 202 produce low level outputs. The comparator 182 produces a high level output. Therefore, the OR gate 212 makes its output level low and the OR gate 218 it output level high. The output of the operational amplifier 126 becomes a voltage (VA+VB)/2. The output V1−V2 of the operational amplifier 131 becomes (VA+VB)/2−Vr9.

Figure 14E:
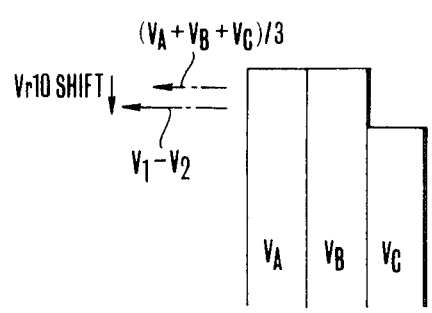

(105) Under a condition of $$\begin{pmatrix} VP2 & < & \Delta BA & < & VP1 \\ \Delta CB & < & VQ2 & \end{pmatrix},$$

that is, when the luminance signal difference ΔBA between the areas 2A and 2B is small and the luminance signal difference ΔCB is larger in negative absolute value than the predetermined value VQ2, as shown in FIG. 14(e), the main object can be assumed to exist in both the areas 2A and 2B and to be in a whity color. In that instance, the photometric value may be obtained by using the luminance values of the areas 2A and 2B. However, the whity state of the main object can be photographed without fail, in the event of a lower degree of luminance of the peripheral part of the image plane than that of the middle part, by taking the luminance of the peripheral area 2C into consideration to some degree (highlight control). It has been ascertained from data that a better exposure value is obtainable by the latter method. Therefore, to obtain an exposure that gives a highlighting effect on the main object, the photometric value V1−V2 is obtained from the following formula (1-5) using all the luminance signals VA, VB and VC with a correction value Vr10 also employed:

$$V1-V2=(VA+VB+VC)/3-Vr10 \quad (1-5)$$

The circuit operation: The comparator 187 produces a high level output. The comparators 186, 190 and 191 produce low level outputs. The AND gate 199 produces a high level output while other AND gates 194, 198 and 200 to 202 produce low level outputs. The comparator 182 produces a high level output. Therefore, the OR gate 212 makes its output level high. The output of the operational amplifier 126 becomes a voltage (VA+VB+VC)/3. The output V1−V2 of the operational amplifier 131 becomes (VA+VB+VC)/3−Vr10.

Figure 14F:
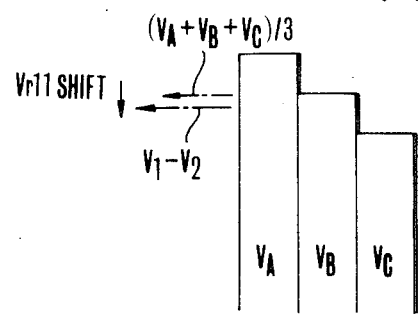

(1-6) Under a condition of $$\begin{pmatrix} \Delta BA & < & VP2 \\ \Delta CB & < & VQ2 \end{pmatrix},$$

that is, when the luminance signal difference ΔBA between the areas 2A and 2B is larger in negative absolute value than the predetermined value VP2 while the luminance signal difference ΔCB between the areas 2B and 2C is also larger in negative absolute value than the predetermined value VQ2, as shown in FIG. 14(f), the main object can be assumed to be in a medium size existing not only in the whole area 2A but also in a part of the area 2B and to be in a whitish color. In this case, to highlight the main object in the same manner as in the case of Para. (1-5) above, the photometric value V1−V2 is obtained from the following formula (1-6). using a correction value Vr11 (smaller than Vr10) along with the luminance values of the areas 2A, 2B and 2C:

$$V1-V2=(VA+VB+VC)/3-Vr11 \quad (1-6)$$

The circuit operation: The comparators 186 to 191 produce low level outputs. The AND gate 202 produces a high level output. Other AND gates 194 to 201 produce low level outputs. The comparator 182 produces a high level output. Therefore, the output level of the OR gate 212 becomes high and that of the AND gate 217 high. The output of the operational amplifier 126 becomes (VA+VB+VC)/3. The output V1−V2 of the operational amplifier 131 becomes (VA+VB+VC)/3 Vr11.

Figure 14G:
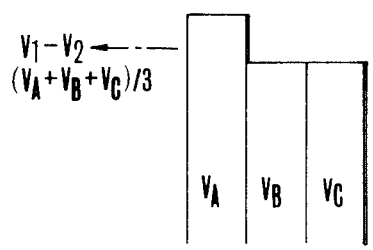

(1-7) Under a condition of $$\begin{pmatrix} \Delta BA & < & VP2 & \\ VQ2 & < & \Delta CB & < & VQ1 \end{pmatrix},$$

that is, when the luminance signal difference ΔBA between the areas 2A and 2B is larger in negative absolute value than the predetermined value VP2 and the luminance signal difference ΔCB is small as shown in FIG. 14(g), the main object can be assumed to be in a whitish color either existing in the whole area 2A or only in a part of the area 2A as it is small in size. Then, to obtain a highlighting effect on the main object like in the above stated case, the photometric value V1−V2 is obtained from the following formula (1-7) using the luminance values of the areas 2A, 2B and 2C without any correction:

$$V1-V2=(VA+VB+VC)/3 \quad (1-7)$$

The circuit operation: The comparator 190 produces a high level output. The comparators 186, 187 and 191 produce low level outputs. The AND gate 201 produces a high level output while other AND gates 194 to 200 and 202 produce low level outputs. The comparator 182 produces a high level output. Therefore, the OR gate 212 and the NOR gate 225 make their output levels high respectively. The output of the operational amplifier 126 thus becomes a voltage (VA+VB+VC)/3. The output V1−V2 of the operation amplifier also becomes (VA+VB+VC)/3.

Figure 14H:
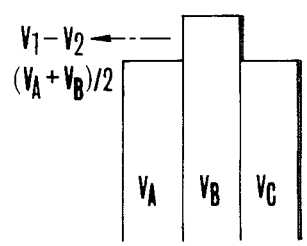

(1-8) Under a condition of $$\begin{pmatrix} \Delta BA & < & VP2 \\ VQ1 & < & \Delta CB \end{pmatrix},$$

that is, when the luminance signal difference ΔBA between the areas 2A and 2B is larger than the predetermined value VP2 in negative absolute value while the luminance signal difference ΔCB between the areas 2B and 2C is larger than the predetermined value VG1 as shown in FIG. 14(h), the main object can be assumed to be of about the same size as in the case of Para. (1-1) above having bright and dark parts thus resulting in a somewhat high degree of luminance of the area 2A or, in the case of a landscape scenery, the area 2B may be assumed to be occupied by some object that has a considerably low degree of luminance. Under such a condition, the present inventors have found that an adequate result is obtainable by obtaining the photometric value V1−V2 from a formula V1−V2=(VA+VB+VC)/3 using the luminance values of all the areas 2A, 2B and 2C without any correction. However, in the case of this embodiment, another method for obtaining an adequate result is employed and the photometric value is obtained from the following formula (1-8) using the luminance values of the areas 2A and 2B, in the same manner as in the case of Para. (1-1) above without any correction:

$$V1-V2=(VA+VB)/2 \quad (1-8)$$

The circuit operation: The comparators 190 and 191 produce high level outputs. The comparators 186 and 187 produce low level outputs. The AND gate 200 produces a high level output while other AND gates 194 to 199, 201 and 202 produce low level outputs. The comparator 182 produces a high level output. Therefore, the output level of the OR gate 212 becomes low and that of the NOR gate 225 high. The output of the operational amplifier 126 becomes a voltage (VA+VB)/2. The output V1−V2 of the operational amplifier 131 then also becomes (VA+VB)/2.

Figure 14I:
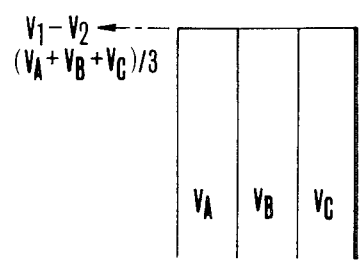

(1-9) Under a condition of $$\begin{pmatrix} VP2 & < & \Delta BA & < & VP1 \\ VP2 & < & \Delta CB & < & VQ1 \end{pmatrix},$$

that is, when the difference ΔBA between the luminance signals from the areas 2A and 2B is small while the difference ΔCB between the luminance signals of the areas 2B and 2C is also small as shown in FIG. 14(i), the main object can be assumed to occupy the whole photographing field or the field can be assumed to have nothing in particular that is intended to be the main object. In this instance, the photometric value V1−V2 is obtained from the following formula (1-9) using the luminance values of the areas 2A, 2B and 2C without any correction:

$$V1-V2=(VA+VB+VC)3 \quad (1-9)$$

The circuit operation: The comparators 187 and 190 produce high level outputs. The comparators 186 and 191 produce low level outputs. The AND gate 198 produces a high level output while other AND gates 194 to 197 and 199 to 202 produce low level output. The comparator 182 produces a high level output. Therefore, the output level of the OR gate becomes high and that of the NOR gate 225 also high. The output of the operational amplifier 126 becomes a voltage (VA+VB+VC)/3. The output V1−V2 of the operational amplifier 131 becomes (VA+VB+VC)/3.

Figure 15A:
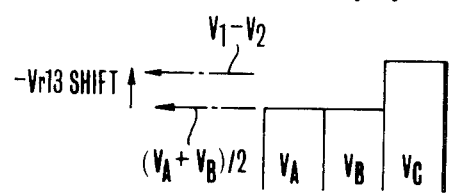

(2) In case that the luminance signal VC obtained from the outermost area 2C of the photographing field as shown in FIG. 8 is smaller than the reference voltage Vr5 thus suggesting some indoor wall or the like in the background, constants VP3, VP4, VQ3 and VQ4 (VP4 0 VP3 and VQ4<0<VQ3) are used as applicable in conjunction with the luminance signal differences ΔBA and ΔCB, like in the case of Para. (1) above, in obtaining the photometric value V1−V2 as described below:

(2-1) Under a condition of $$\begin{pmatrix} VP4 & < & \Delta BA & < & VP3 \\ VQ3 & < & \Delta CB & & \end{pmatrix},$$

that is, when the difference ΔBA between the luminance signals of the areas 2A and 2B is small while the difference ΔCB between the luminance signals of the areas 2B and 2C is larger than the predetermined value VQ3 as shown in FIG. 15(a), the main object to be photographed can be regarded as in a large size existing in both the areas 2A and 2B and as in a blackish color. In this instance, a photometric value may be adequately obtained by simply using the luminance values of the areas 2A and 2B without any correction value. However, it is preferable to have the blackish state of the main object better depicted under shadow control. Therefore, in this embodiment, a shadow depicting exposure is ensured for the main object by obtaining the photometric value V1−V2 from the following formula (2-1) using a negative correction value −Vr13 along with the luminance values of the areas 2A and 2B:

$$V1-V2=(VA+VB)/2+Vr13 \quad (2-1)$$

In this instance, the circuit arrangement operates as follows: Since the photometric signal (voltage) for the outermost area 2C (divided into areas 2C1 to 2C4) is lower than the predetermined voltage Vr5, the comparator 182 produces a low level output. Therefore, a low level signal is applied to the control terminal B/D of the reference voltage generating circuit 185. The reference voltages of the circuit 185 then becomes VPa=VP3, VPb=VP4, VQa=VQ3 and VQb=VQ4. Meanwhile, the comparator 186 produces a low level output. The comparators 187, 190 and 191 produce high level outputs. The AND gate 197 produces a high level output while other AND gates 194 to 196 and 198 to 202 produce low level outputs. The inverter 203 produces a high level output. Therefore, the output level of the OR gate 212 becomes low and that of the AND gate 220 high. The output of the operational amplifier 126 becomes a voltage (VA+VB)/2. The output V1−V2 of the operational amplifier 131 becomes (VA+VB)/2+Vr13.

Figure 15B:
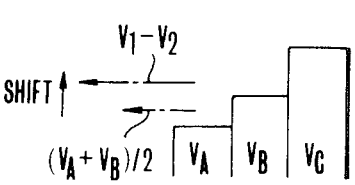
Figure 15C:
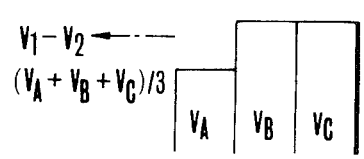

(2-2) Under a condition of $$\begin{pmatrix} VP3 & < & \Delta BA \\ VQ3 & < & \Delta CB \end{pmatrix},$$

that is, when the difference ΔBA between the luminance signals of the areas 2A and 2B is larger than the predetermined value VP3 while the difference ΔCB between the luminance signals of the areas 2B and 2C is also larger than the predetermined value VQ3, as shown in FIG. 15(b), the main object can be assumed to be in the whole area 2A and a part of the area 2B and to be in a blackish color. Then, to give a shadow depicting exposure for the main object like in the case of Para. (2-1) above, the photometric value V1−V2 is obtained from the following formula (2-2) using a negative correction value −VR12 along with the luminance values of the areas 2A and 2B:

$$V1-V2=(VA+VB)/2+Vr12 \quad (2-2)$$

The circuit operation: The comparators 186 to 191 all produce high level outputs. The AND gate 194 produces a high level output while other AND gates 195 to 202 produce low level outputs. The inverter 203 produces a high level output. Therefore, the output level of the OR gate 212 becomes low and that of the AND gate 220 high. The output of the operational amplifier 126 becomes a voltage (VA+VB)/2. The output V1−V2 of the operational amplifier 131 becomes (VA+VB)/2+Vr12.

(2-3) Under a condition of $$\begin{pmatrix} VP3 & < & \Delta BA & & \\ VQ4 & < & \Delta CB & < & VQ3 \end{pmatrix},$$

that is, when the difference ΔBA between the luminance signals of the areas 2A and 2B is larger than the predetermined value VP3 while the difference ΔCB between the luminance signals of the areas 2B and 2C is small as shown in FIG. 15(c, the main object to be photographed can be assumed to be either in the whole area 2A or small in size and to be in a blackish color. In that case, to give an exposure that produces a shadow depicting effect on the main object, the photometric value V1−V2 is obtained from the following formula (2-3) using the luminance values of the areas 2A and 2B without correction:

$$V1-V2=(VA+VB)/2 \quad (2-3)$$

The circuit operation: The comparator 191 produces a low level output. The comparators 186 to 190 produce high level outputs. The AND gate 195 produces a high level output. Other AND gates 194 and 196 to 202 produce low level outputs. The inverter 203 produces a high level output. Therefore, the output level of the OR gate 212 becomes low and that of the NOR gate high. The output of the operational amplifier 126 becomes a voltage $(VA+VB)/2$ and the output $V1-V2$ of the operational amplifier 131 becomes $(VA+VB)/2$.

Figure 15D:
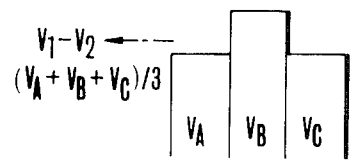

(2-4) Under a condition of $$\begin{pmatrix} VP3 & < & \Delta BA \\ \Delta CB & < & VQ4 \end{pmatrix},$$

that is, when the difference $\Delta BA$ between the luminance signals of the areas 2A and 2B is larger than the predetermined value VP3 and the difference $\Delta CB$ between the luminance signals of the areas 2B and 2C larger than the predetermined value VQ4 in negative absolute value, as shown in FIG. 15(d), the main object can be assumed to be of about the same size as in the case of Para. (2-3) above with some object of a high degree of luminance such as an electric lamp in the area 2B. Compared with outdoor photographing with the sun or the like existing in the area 2B, indoor photographing with an object of a high degree of luminance existing in the area 2B like in this case the photograph is not much affected by the high degree of luminance. Therefore, the photometric value is obtained from the following formula (2-4) using the luminance values of the areas 2A, 2B and 2C without any correction:

$$V1-V2=(VA+VB+VC)/3 \qquad (2-4)$$

The circuit operation: The comparators 190 and 191 produce low level outputs. The comparators 186 and 187 produce high level outputs. The AND gate 196 produces a high level output. Other AND gates 194, 195 and 197 to 202 produce low level outputs. The inverter 203 produces a high level output. The output level of the OR gate 212 becomes high and that of the NOR gate 225 also high. The output of the operational amplifier 126 becomes a voltage $(VA+VB+VC)/3$. The output $V1-V2$ of the operational amplifier 131 becomes also $(VA+VB+VC)/3$.

Figure 15E:
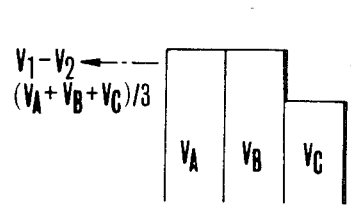

(2-5) Under a condition of $$\begin{pmatrix} VP4 & < & \Delta BA & < & VP3 \\ \Delta CB & < & VQ4 & & \end{pmatrix},$$

that is, when the difference $\Delta BA$ between the luminance signals of the areas 2A and 2B is small while the difference $\Delta CB$ between the luminance signals of the areas 2B and 2C is larger in negative absolute value than the predetermined value VQ4 as shown in FIG. 15(e), the main object can be assumed to be in both the areas 2A and 2B with these areas 2B alone illuminated by some light or the like. Under such a condition, it is conceivable to obtain a photometric value from the luminance values of only the areas 2A and 2B. In the case of this embodiment, however, the dark peripheral area 2C of the photographing field is also taken into consideration to some degree. The photometric value $V1-V2$ is thus obtained from the following formula (2-5) using the luminance values of the areas 2A, 2B and 2C without any correction:

$$V1-V2=(VA+VB+VC)/3 \qquad (2-5)$$

The circuit operation: The comparators 186, 190 and 191 produce low level outputs while the comparator 187 produces a high level output. The AND gate 199 produces a high level output while other AND gates 194 to 198 and 200 to 202 produce low level outputs. The inverter 203 produces a high level output. As a result, the output level of the OR gate 212 becomes high while that of the NOR gate also becomes high. The output of the operational amplifier 126 becomes a voltage $(VA+VB+VC)/3$. The output $V1-V2$ of the operational amplifier 131 also becomes $(VA+VB+VC)/3$.

Figure 15F:
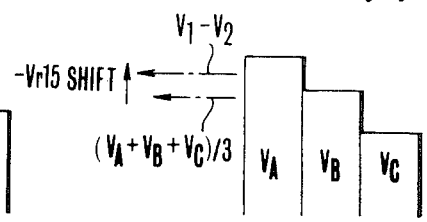

(2-6) Under a condition of $$\begin{pmatrix} \Delta BA & < & VP4 \\ \Delta CB & < & VQ4 \end{pmatrix},$$

that is, when the difference $\Delta BA$ between the luminance signals of the areas 2A and 2B is larger in negative absolute value than the predetermined value VP4 and the difference $\Delta CB$ between the luminance signals of the areas 2B and 2C is also larger in negative absolute value than the predetermined value VQ4, as shown in FIG. 15(f), the main object can be assumed to exist in the whole area 2A and in a part of the area 2B with the area partly illuminated by some light or the like. In this instance, unlike in the case of Para. (2-5) above, the photometric value must be corrected in order to obtain an exposure apposite to the main object. Therefore, the photometric value $V1-V2$ is obtained from the following formula using a negative correction value $-Vr15$ along with the luminance values of the areas 2A, 2B and 2C:

$$V1-V2=(VA+VB+VC)/3+Vr15 \qquad (2-6)$$

Figure 15G:
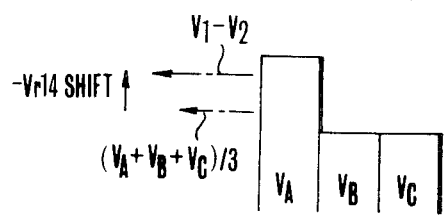

(2-7) Under a condition of $$\begin{pmatrix} \Delta BA & < & VP4 & \\ VQ4 & < & \Delta CB & < & VQ3 \end{pmatrix},$$

that is, when the difference $\Delta BA$ between the luminance values of the areas 2A and 2B is larger in negative absolute value than the predetermined value VP4 and the difference $\Delta CB$ between the luminance values of the areas 2B and 2C is small, as shown in FIG. 15(g), the main object can be assumed to be in the whole area 2A or to be small thus occupying only a part of the area 2A. To make an exposure apposite to the main object in this case, the photometric value $V1-V2$ is obtained from the following formula (2-7) using a negative correction value $-Vr14$ along with the luminance values of the areas 2A, 2B and 2C:

$$V1-V2=(VA+VB+VC)/3+Vr14 \qquad (2-7)$$

The circuit operation: The comparators 186, 187 and 191 produce low level outputs while the comparator 190 produces a high level output. The AND gate 201 produces a high level output while other AND gates 194 to 200 and 202 produce low level outputs. The inverter 203 produces a high level output. The output level of the OR gate 212 becomes high. The output level of the OR gate 224 also becomes high. The output of the operational amplifier 126 becomes a voltage $(VA+VB VC)/3$. The output $V1-V2$ of the operational amplifier 131 becomes $(VA-VB+VC)/3 + Vr14$.

Figure 15H:
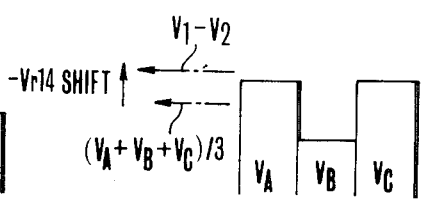

(2-8) Under a condition of $$\begin{pmatrix} \Delta BA & < & VP4 \\ VQ3 & < & \Delta CB \end{pmatrix},$$

that is, when the difference ΔBA between the luminance signals of the areas 2A and 2B is larger in negative absolute value than the predetermined value VP4 while the difference ΔCB between the luminance signals of the areas 2B and 2C is larger than the predetermined value VQ3, as shown in FIG. 15(h), the main object can be assumed to be of about the same size including light and dark parts to result in a somewhat high degree of luminance of the area 2A and to be in a blackish color as a whole; or, in the event of a landscape scenery, the area 2B can be assumed to be occupied by an object of a considerably low degree of luminance. It is known from data that, under such a condition, a fairly good result is obtainable depending on the conditions of the photographing field with the photometric value V1−V2 obtained from the formula V1−V2=(VA+VB+VC)/3 using the luminance values of the areas 2A, 2B and 2C without using any correction value. In the case of this specific embodiment, however, a method for ensuring an overall good result is employed. Namely, the photometric value V1−V2 is obtained from the following formula (2-8) using a negative correction value −Vr14 along with the luminance values of all the areas 2A, 2B and 2C:

$$V1-V2=(VA+VB+VC)/3+Vr14 \quad (2-8)$$

The circuit operation: The comparators 186 and 187 produce low level outputs. Other comparators 190 and 191 produce high level outputs. The AND gate 200 produces a high level output while other AND gates 194 to 199, 201 and 202 produce low level outputs. The inverter 203 produces a high level output. Therefore, the output level of the OR gate 212 becomes high and that of the OR gate 224 also high. The output of the operational amplifier 126 becomes a voltage (VA+VB+VC)/3. The output V1−V2 of the operational amplifier 131 becomes (VA+VB+VC)/3+Vr14.

Figure 15I:
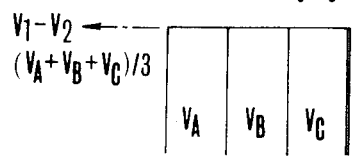

(2-9) Under a condition of $$\begin{pmatrix} VP4 & < & \Delta BA & < & VP3 \\ VQ4 & < & \Delta CB & < & VQ3 \end{pmatrix},$$

that is, when the difference ΔBA between the luminance signals of the areas 2A and 2B is small and the difference ΔCB between the luminance signals of the areas 2B and 2C is also small as shown in FIG. 15(i), the main object can be assumed to be occupying the whole photographing field or, as in the case of a landscape scenery, nothing can be assumed to be the main object. To give an exposure adequate for all the areas 2A, 2B and 2C under that condition, the photometric value V1−V2 is obtained from the following formula (2-9) using the luminance values of the areas 2A, 2B and 2C without any correction value:

$$V1-V2=(VA+VB+VC)/3 \quad (2-9)$$

The circuit operation: The comparators 186 and 191 produce low level outputs while the comparators 187 and 190 produce high level outputs. The AND gate 198 produces a high level output while other AND gates 194 to 197 and 199 to 202 produce low level outputs. The inverter 203 produces a high level output. Therefore, the OR gate 212 produces a high level output. The NOR gate 225 also produces a high level output. The output of the operational amplifier 126 becomes a voltage (VA+VB+VC)/3. Then, the output V1−V2 of the operational amplifier 131 also becomes (VA+VB+VC)/3.

It is a feature of the embodiment described that, with the main object assumed to be in the middle part (the area 2A) of the photographing field, the light measuring device is capable of carrying out necessary correction according to the size of the main object by judging the size of the object.

Further, in cases where the mean value of the luminance signals obtained from the small subdivision areas 2C1 to 2C4 is high, the output of some of the small areas 2C1 to 2C4 that is at a lower luminance value is ignored so that any element having undesirable luminance as the background such as an outdoor ground in the shade under a cloudless sky can be effectively removed. In case that the mean value of the luminance signals obtained from the small divided areas 2C1 to 2C4 is low, the output of some of them that is at a high degree of luminance is ignored, so that any element having undesirable luminance as the background such as an electric lamp light in a night scenery can be likewise removed.

Another feature of the embodiment resides in that: When the main object to be photographed is found to be whitish or blackish, the photometric value is corrected under highlight or shadow depicting control, so that the object can be photographed showing its whitish or blackish state without fail. Besides, since the degree of such correction is adjusted according to the detected size of the object, the photometric value can be effectively controlled.

In FIGS. 14(a) to 15(i) which illustrate this embodiment, when the luminance signal difference between adjacent areas among the areas 2A, 2B and 2C is small, these areas are shown as if they are at an equal level of luminance for the sake of illustration of the invention. In actuality, the measured luminance value of each area of course differs from that of the neighboring area in most cases even when, for example, the luminance difference between the adjacent areas is smaller than the predetermined value VP1. Further, in the foregoing description of the embodiment, the computing formulas used for obtaining the photometric value V1−V2 are divided into four groups according to the levels of luminance of the peripheral parts of the image plane (the subdivided areas VC1 to VC4). However, this arrangement may be replaced with a more elaborate or rougher arrangement dividing the peripheral area into greater number of subdivisions or without subdividing it (VC). Further, the computing method for obtaining the photometric value V1−V2 is divided into a method of using the luminance values VA and VB of the middle and intermediate measuring areas and another method of using all the luminance values VA, VB and VC of the image plane. However, that arrangement may be changed to include a part of or the whole of the subdivided peripheral area. The photographing field may be divided into more than three annular zones or areas to use the luminance signal differences among a greater number of neighboring areas.

As described in the foregoing, the second embodiment gives a highly advantageous photometric device based on the assumption that the main object is located in the middle part of the photographing field. The device is particularly advantageous in that the size of the main object is discernible and that a computing formula apposite to the size of the main object is selectable from among a plurality of photometric value computing formulas. It is another advantage of the embodiment that, in obtaining luminance data for the outermost areas of the field which tends to include some undesirable element, the luminance data for such an undesirable element is removed, so that a photometric value apposite to the main object is obtainable by computation.

Figure 16:
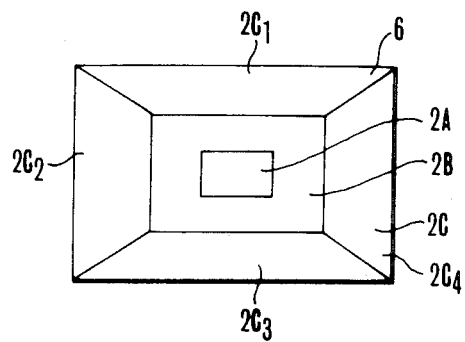
FIG. 16 is a schematic illustration showing a plurality of photometric areas of the light receiving surface of light receiving means of FIG. 1 arranged as a third embodiment of this invention.
Figure 17:
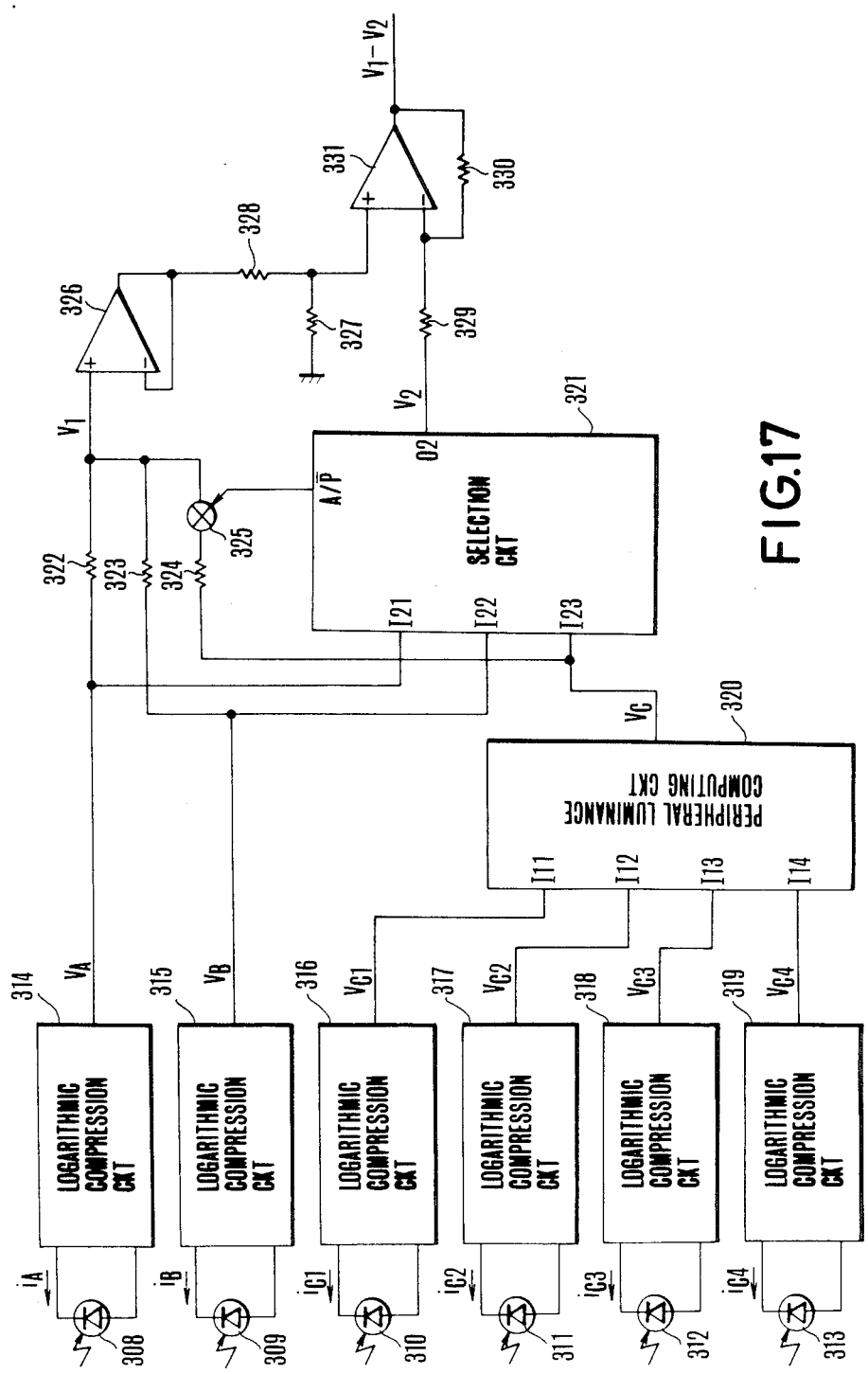
FIG. 17 is a circuit diagram showing a light measuring device arranged as the third embodiment.

A third embodiment is as described below: In the third embodiment, the light receiving surface of the light receiving part 6 shown in FIG. 1 is arranged as shown in FIG. 16. Since the light receiving surface is similar to that of the second embodiment shown in FIG. 8, the details of it is omitted from the following description. FIGS. 17 to 20 are circuit diagrams showing the circuit arrangement of the third embodiment. Referring to FIG. 17, silicon photodiodes (SPDs) 308, 309, 310, 311, 312 and 313 are arranged to correlate with the six areas 2A, 2B, 2C1, 2C2, 2C3 and 2C4. These SPDs generate photo currents iA, iB, iC1, iC2, iC3 and iC4 according to the degrees of luminance of the corresponding areas. Logarithmic compression circuits 314 to 319 are arranged to logarithmically compress these photo currents and to produce voltage values VA, VB, VC1, VC2, VC3 and VC4, which can be expressed as shown below by using constants a1, a2, a3, a4, a5, a6 ($\geq 0$) and b ($> 0$) and the photo currents iA, iB, iC1, iC2, iC3 and iC4 respectively:

$$VA = a1 + b \cdot \ln iA \quad VC2 = a4 + b \cdot \ln iC2$$
$$VB = a2 + b \cdot \ln iB \quad VC3 = a5 + b \cdot \ln iC3$$
$$vc1 = a3 + b \cdot \ln iC1 \quad VC4 = a6 + b \cdot \ln iC4$$

Figure 19:
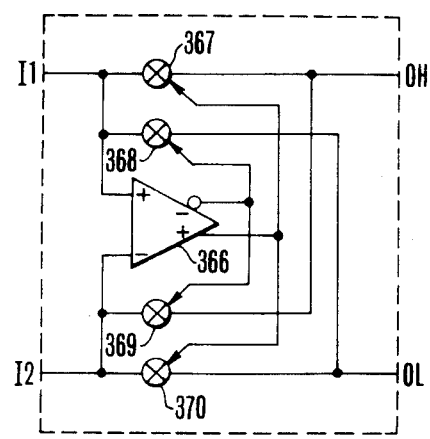
FIG. 19 is a circuit diagram showing the details of a magnitude discrimination circuit shown in FIG. 18.
Figure 18:
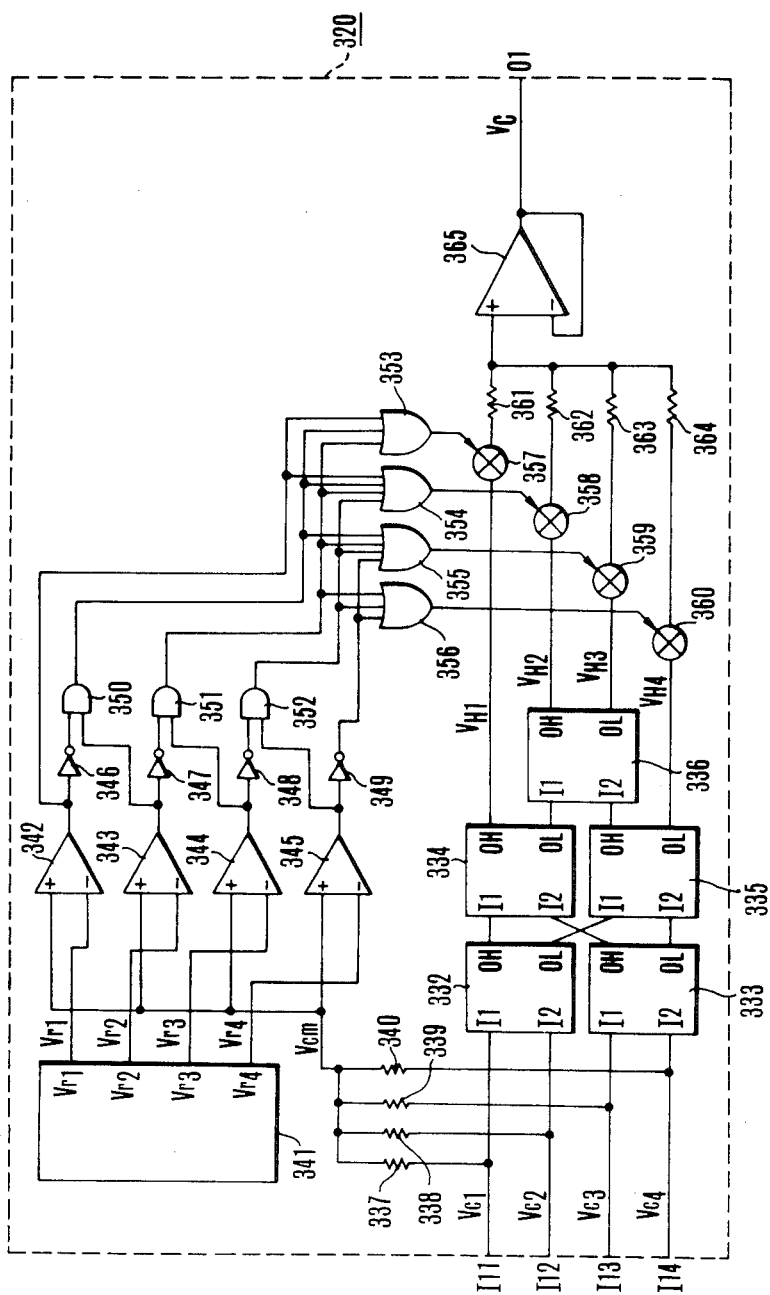
FIG. 18 is a circuit diagram showing the details of a peripheral luminance computing circuit shown in FIG. 17.

The constants a1, a2, a3, a4, a5 and a6 in the above formulas are preset within the logarithmic compression circuits 314 to 319 in such a way as to have the following relation when these areas have the same degree of luminance: VA=VB=VC1=vC2=VC3=VC4. A peripheral luminance computing circuit 320 is arranged to receive the voltages VC1, VC2, VC3 and vC4 produced from the logarithmic compression circuits 316 to 319 at its input terminals I11, I12, I13 and I14 and to produce from its output terminal 01 a voltage VC by computing the luminance value of the outermost peripheral area 2C of the photographing field. The details of arrangement of this peripheral luminance computing circuit 320 are as shown in FIG. 18. Referring to FIG. 18, each of magnitude comparison circuits 332, 333, 334, 335 and 336 is arranged to receive two voltage values at its input terminals I1 and I2 and to produce the larger of the two voltage inputs from its output terminal OH and the smaller of these inputs from another output terminal OL. FIG. 19 shows by way of example the details of arrangement of each of these comparison circuits 332 to 336. This circuit arrangement is similar to that of the second embodiment shown in FIG. 11 with the exception of the reference numerals used and is therefore omitted from the following description. In the case of FIG. 18, a total of five magnitude comparison circuits are arranged to produce the highest of the voltages VC1, VC2, VC3 and VC4 as VH1; the second highest of the voltages as VH2; the third highest of them as VH3; and the lowest of them as VH4. The voltage VC1 is supplied to the input terminal I1 of the magnitude comparison circuit 332 while the voltage VC2 is supplied to its input terminal I2. Then, the higher of the two voltage inputs is produced from the output terminal OH of the circuit 332 while the lower of them is produced from the output terminal OL thereof. The magnitude comparison circuit 333 is likewise arranged to receive the voltage VC3 at its input terminal I1 and the voltage VC4 at its other input terminal I2 and to produce the higher of these inputs from its output terminal OH and the lower of them from its output terminal OL. The magnitude comparison circuit 334 is arranged to receive the voltages produced from the output terminals OH of the comparison circuits 332 and 333 at the input terminals I1 and I2; to compare these inputs; to produce the higher of them from its output terminal OH; and to produce the lower of them from the other output terminal OL. The voltages thus produced from the output terminal OH of the circuit 334 is the highest of the voltages VC1, VC2, VC3 and VC4. The magnitude comparison circuit 335 is arranged likewise to receive at its input terminals I1 and I2 the voltages from the output terminals of the circuits 132 and 133; to compare the magnitudes of them; to produce from its output terminal OH the higher of them; and to produce from its output terminal OL the lower of them. The voltage produced from the output terminal OL of the circuit 335 is the lowest of the voltages VC1, VC2, VC3 and VC4. Another magnitude comparison circuit 336 is arranged to receive at its input terminals I1 and I2 the voltages produced from the output terminal OL of the comparison circuit 334 and the output terminal OH of the comparison circuit 335 and to compare these inputs. The magnitude comparison circuit 136 is thus arranged to compare two intermediate voltage values excluding the highest and the lowest of the voltages VC1, vC2, VC3 and VC4. As a result, the second highest of these voltages is produced from the output terminal OH of the circuit 336 while the third highest of them is produced from the output terminal OL of the circuit 336. The voltages VC1, VC2, VC3 and VC4 are thus rearranged in the order of higher voltage values, i.e. they are rearranged to be VH1$\geq$VH2$\geq$VH3$\geq$VH4. Resistors 337 to 340 are arranged to be of the same resistance value and to average the values VC1, VC2, VC3 and VC4. A voltage VCm thus obtained can be expressed as VCm=(VC1+VC2+VC3+VC4)/4. A reference voltage generating circuit 341 is arranged to generate reference voltages Vr1, Vr2, Vr3 and Vr4. They are in the following magnitude relation: VR1>VR2>VR3>VR4. Comparators 342 to 345 are arranged to compare the above stated average value VCm with these reference voltages Vr1, Vr2, Vr3 and Vr4. These comparators 342, 343, 344 and 345 produce high level voltages if the value VCm is larger than or equal to the reference voltage values Vr1, Vr2, Vr3 and Vr4 and low level voltages if the value VCm is smaller than them respectively. The embodiment includes inverters 346. 347, 348 and 349 and AND gates 350, 351 and 352. The input terminal of the inverter 346 is connected to the output terminal of the comparator 342, that of the inverter 347 to the output terminal of the comparator 343. that of the inverter 348 to the output terminal of the comparator 344 and that of the inverter 349 to the output terminal of the comparator 345. One of the input terminals of the AND gate 350 is connected to the output terminal of the inverter 346 and the other to the output terminal of the comparator 343. One of the input terminals of the AND gate 351 is connected to the output terminal of the inverter 347 and the other to the output terminal of the comparator 344. One of the input terminals of the AND gate 352 is connected to the output terminal of the inverter 348 and the other to the output terminal of the comparator 345. Reference numerals 353 to 356 denote OR gates. The OR gate 353 has three input terminals, which are connected to the output terminal of the comparator 342, to that of the AND gate 350 and to that of the AND gate 351 respectively. The OR gate 354 has four input terminals, which are connected respectively to the output terminal of the comparator 342, to that of the AND gate 350, to that of the AND gate 351 and to that of the AND gate 352. The OR gate 355 has four input terminals, which are connected respectively to the output terminal of the AND gate 350, to that of the AND gate 351, to that of the AND gate 352 and to that of the inverter 349. The OR gate 356 has three input terminals, which are respectively connected to the output terminal of the AND gate 351, to that of the AND gate 352 and to that of the inverter 349. Analog switches 357 to 360 are under the control of the OR gates 353 to 356. Resistors 361 to 364 are of the same resistance value. The resistors 361 to 364 are arranged to average two, three or four of the voltages VH1, VH2, VH3 and VH4, counting them in the order of higher voltages, according as they are produced from the analog switches 357 to 360 when these switches become conductive or to average two or three of these voltage outputs counting them in the order of lower voltages. An operational amplifier 365 has its output terminal and its inverting input terminal interconnected and is arranged to serve as voltage follower. The output terminal of the operational amplifier 365 produces a voltage which is thus arranged to be equal to an incoming voltage received at its non-inverting input terminal irrespectively of the conditions of circuit elements ensuing the output terminal. The output voltage of the amplifier 365 is used as the voltage VC and is produced from the output terminal 01 of the peripheral luminance computing circuit 320. Referring further to FIG. 18, the features of the photographing field and the value of the voltage VC which represents the luminance of the background as obtained from a magnitude relation of the above stated mean value VCm to the reference voltages Vr1, Vr2, Vr3 and Vr4 are as described below:

(1) $Vr1 \leq VCm$—Analog switches 357 and 358 are conductive: This condition strongly suggests a scene with a fairly bright background. Therefore, the value VC is set at $VC=(VH1+VH2)/2$ with the relatively low luminance of the areas among the areas 2C1, 2C2, 2C3 and 2C4 disregarded.

(2) $Vr2 \leq VCm < Vr1$—Analog switches 357, 358 and 359 are conductive: This condition suggests a scene with a rather bright background such as an outdoor scene under a clear sky. Under such a condition, however, some undesirable background object tends to appear showing a low degree of luminance like a shadowed ground. In this case, therefore, the value VC is set at $VC=(VH1+VH2+VH3)/3$ by ignoring the luminance of the area of the lowest degree of luminance.

(3) $Vr8 \leq VCm < Vr2$—Analog switches 357, 358, 359 and 360 are conductive: This suggests a normal bright scene. In this instance, therefore, relatively bright parts and relatively dark parts alike cannot be ignored. Therefore, the value VC is set at $VC=(VH1+VH2+VH3+VH4)/4$.

(4) $Vr4 \leq VCm < Vr3$—Analog switches 358, 359 and 360 are conductive: That condition suggests a scene with a rather dark background. By ignoring the area of the highest degree of luminance, therefore, the value VC is set at $VC=(VH2+VH3+VH4)/3$.

(5) $VCm < Vr4$—Analog switches 359 and 360 are conductive: The condition suggests a scene with a considerably dark background like a night scene. Under such a condition, some object that is undesirable for background luminance such as electric lamps tends to appear. In this instance, by ignoring the area of a relatively high degree of luminance, the value VC is set at $VC=(VH3+VH4)/2$.

As described above, the peripheral luminance computing circuit 320 is arranged to give the computed value VC which is obtained by averaging two, three or four of the values VH1, VH2, VH3 and VH4 counting them from larger values or by averaging two or three of them by counting them from smaller values, according to the luminance condition of the peripheral part of the field. The value VC thus computed is then produced from the output terminal 01. Again referring to FIG. 17, a selection circuit 321 is arranged to have the output voltages VA and VB of the logarithmic compression circuits 314 and 315 and the output voltage VC of the peripheral luminance computing circuit 320 supplied to its input terminals I21, I22 and I23 respectively and to determine which of a plurality of computing formulas is to be selected as will be described later. FIG. 17 includes resistors 322, 323, 324 which are of the same resistance value and an analog switch 325. The resistors 322, 323, 324 and the analog switch 325 jointly form a mean value circuit. When a high level voltage is supplied from the output terminal A/$\overline{P}$ of the selection circuit 321 to the control terminal of the analog switch 325, the switch 325 becomes conductive. Then, the output voltage V1 of the mean value circuit becomes $(VA+VB+VC)/3$. When a low level voltage is produced from the output terminal A/$\overline{P}$ of the selection circuit 321 and is supplied to the control terminal of the analog switch 325, the switch 325 opens. With the switch 325 thus opened, the output voltage V1 of the mean value circuit becomes $(VA+VB)/2$. An operational amplifier 326 has its output terminal connected to its inverting input terminal and is thus arranged to function as a voltage follower. When a high level voltage is produced from the output terminal A/$\overline{P}$ of the selection circuit 321 and comes to the control terminal of the analog switch 325, the switch 325 becomes conductive to cause the output voltage V1 of the mean value circuit to become $(VA+VB+VC)/3$. The analog switch 325 opens when a low level voltage is supplied to its control terminal from the output terminal A/$\overline{P}$ of the selection circuit 321. Then, the voltage V1 produced from the mean value circuit becomes $(VA+VB)/2$. An operational amplifier 326 is arranged to function as a voltage follower with its output terminal connected to its inverting input terminal. The non-inverting input terminal of the amplifier 326 is arranged to receive the voltage V1 from the mean value circuit. The voltage of the output terminal of the operational amplifier 326 remains at the value V1 irrespectively of the conditions of the circuit elements ensuing the amplifier. Resistors 327, 328, 329 and 330 are of the same resistance value. An operational amplifier 331 is arranged to form a subtraction circuit in conjunction with the resistors 327, 328, 329 and 330. Assuming that the voltage from the output terminal 02 of the selection circuit 321 is V2, this subtraction circuit produces V1−V2. This voltage V1−V2 represents a photometric value determined by each of a plurality of computing formulas of this embodiment as will be described later herein.

Figure 20:
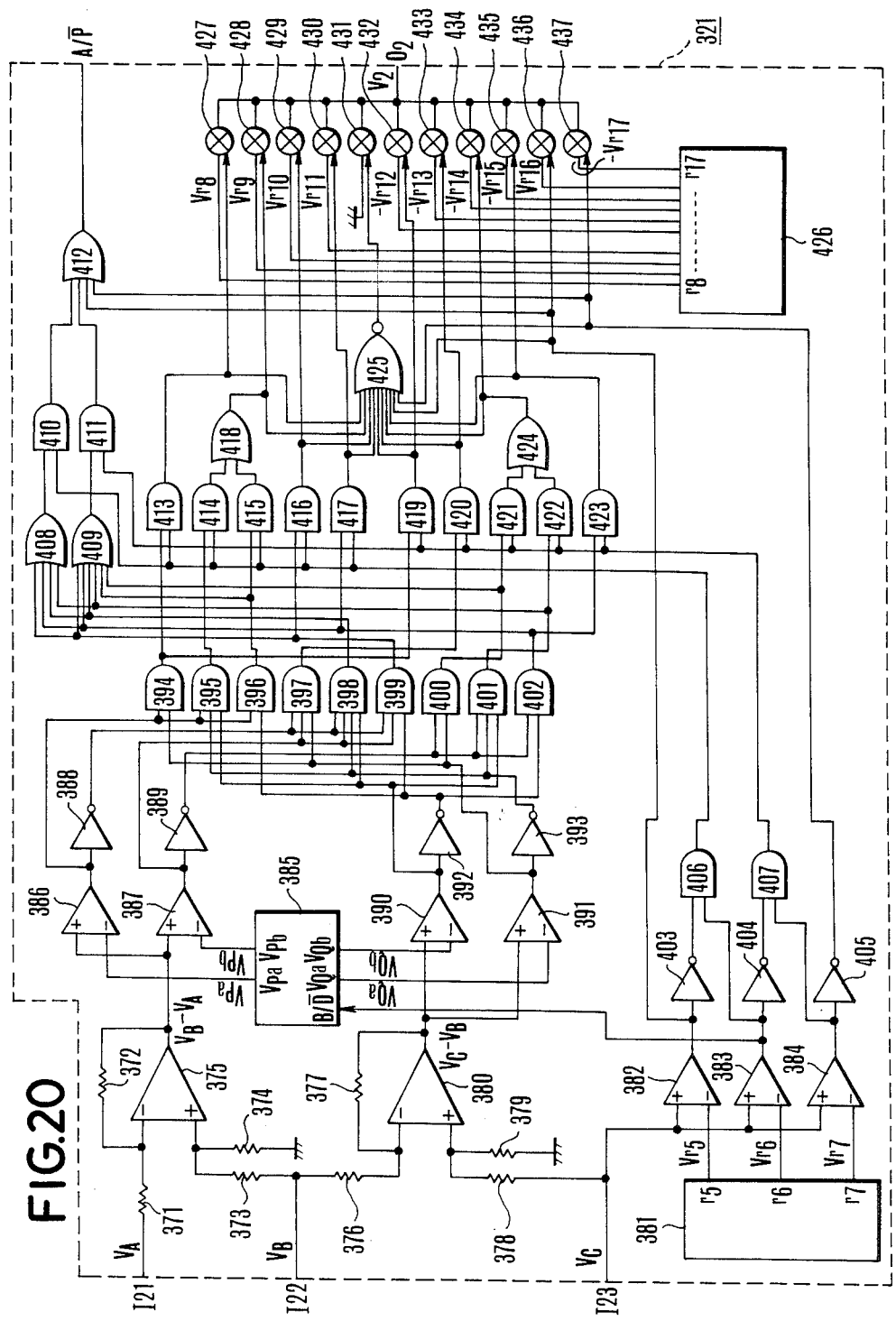
FIG. 20 is a circuit diagram showing the details of a selection circuit shown in FIG. 17.
Figure 21A:
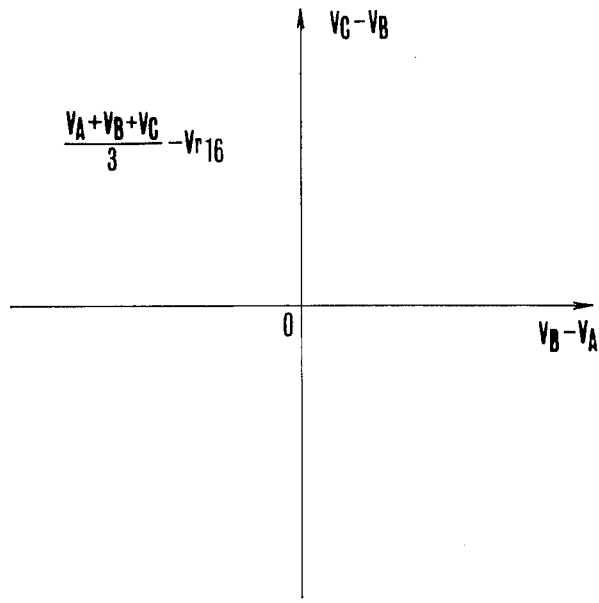
FIGS. 21($a$) to 21($d$) are illustrations of photometric value computing formulas selected by the circuit of FIG. 17.
Figure 21B:
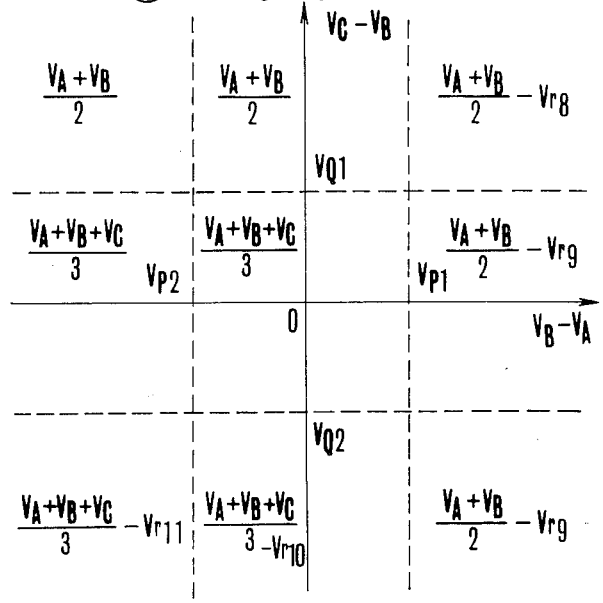
Figure 21C:
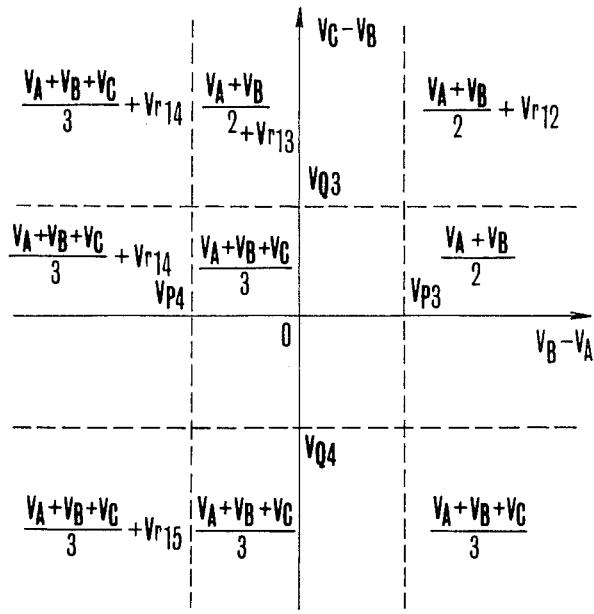
Figure 21D:
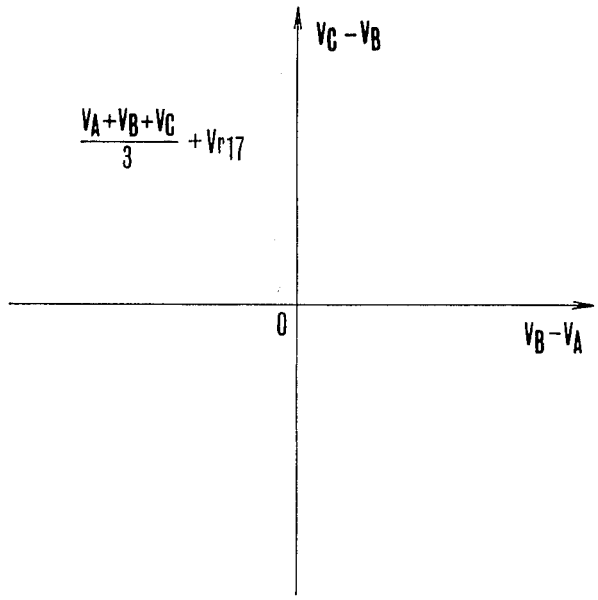

FIG. 20 shows the details of the selection circuit 321 of FIG. 17. Resistors 371, 372, 373 and 374 are of the same resistance value. An operational amplifier 375 is arranged to form a first subtraction circuit in conjunction with these resistors. Resistors 376, 377, 378 and 379 are of the same resistance value and form a second subtraction circuit in conjunction with another operational amplifier 380. The first subtraction circuit is arranged to receive the voltages VA and VB and to produce a voltage VB−VA. The second subtraction circuit is arranged to receive the voltages VB and VC and to produce a voltage VC−VB. A reference voltage generating circuit 381 is arranged to generate reference voltages Vr5, Vr6 and Vr7 (Vr5 > Vr6 > Vr7). Comparators 382, 383 and 384 are arranged to receive the voltage VC at their non-inverting input terminals and to receive the reference voltages Vr5, Vr6 and Vr7 at their inverting input terminals. The comparator 382 produces a high level voltage when the voltage VC is higher than or equal to the voltage Vr5 and a low level voltage when the voltage Vc is lower than the voltage Vr5. The comparator 383 produces a high level output when the voltage VC is higher than or equal to the voltage Vr6 and a low level output when the former is lower than the latter. The comparator 384 produces a high level output when the voltage VC is higher than or equal to the voltage Vr7 and a low level output when the former is lower than the latter. A reference voltage generating circuit 385 is arranged to generate reference voltages VPa, VPb, VQa and VQb. The circuit 385 is provided with a control terminal B/$\overline{D}$ for receiving the output of the comparator 383 as a control voltage. The reference voltages are assumed to be VPa=VP1, VPb=VP2, VQa=VQ1 and VQb=VQ2 when the control voltage input is at a high level and to be VPa=VP3, VPb=VP4, VQa=VQ3 and VQb=VQ4 when the control voltage input is at a low level. The reference voltages VP1, VP3, VQ1 and VQ3 are in positive values while the reference voltages VP2, VP4, VQ2 and VQ4 are in negative values. Reference numerals 386 and 387 denote comparators and 388 and 389 inverters. The comparators 386 and 387 are arranged to receive the voltage VB−VA produced from the amplifier 375 of the first subtraction circuit. To the inverting input terminal of the comparator 386 is supplied either the reference voltage VP1 or VP3 according as the control voltage supplied to the control terminal B/$\overline{D}$ of the reference voltage generating circuit 385 is at a high level or at a low level. The inverting input terminal of the comparator 387 is likewise arranged to receive either the reference voltage VP2 or VP4. Numerals 390 and 391 denote comparators and 392 and 393 inverters. The voltage VC−VB produced from the operational amplifier 380 of the second subtraction circuit is supplied to the non-inverting input terminals of the comparators 390 and 391. To the inverting input terminal of the comparator 391 is supplied either the reference voltage VQ1 or VQ3 according as the control voltage supplied to the control terminal B/$\overline{D}$ of the reference voltage generating circuit 385 is at a high level or at a low level. To that of he comparator 390 is likewise supplied either the reference voltage VQ2 or VQ4. Each of the output terminals of the comparators 386, 387, 390 and 391 is arranged to produce a high level voltage when the non-inverting input voltage V+ is higher than or equal to the inverting input voltage V− and to produce a low level voltage when the former is lower than the latter. Reference numerals 394 to 402 denote AND gates. One of these AND gates produces a high level voltage according to the combination of the high levels and low levels of the outputs of the comparators 386, 387, 390 and 391 while other AND gates produce low level voltages. The following tables show which of these AND gates 346 to 354 produces the high level voltage output according to the magnitude relations among the voltages VB−VA, VPa and VPb and among the voltages VC−VB, VQa and VQb:

(1) $VB - VA \geq VPa$
   (a) $VC - VB \geq VQa$    — AND gate 394
   (b) $VQa > VC - VB \geq VQb$    — AND gate 395
   (c) $VQb > VC - VB$    — AND gate 396
(2) $VPa > VB \geq VPb$
   (a) $VC - VB \geq VQa$    — AND gate 397
   (b) $VQa > VC - VB \geq VQb$    — AND gate 398
   (c) $VQb > VC - VB$    — AND gate 399
(3) $VPb > VB - VA$
   (a) $VC - VB \geq VQa$    — AND gate 400
   (b) $VQa > VC - VB \geq VQb$    — AND gate 401
   (c) $VQb > VC - VB$    — AND gate 402

Inverters 403, 404 and 405 are arranged to invert the outputs of the comparators 382, 383 and 384 respectively. Reference numerals 406 and 407 denote AND gates. The AND gate 406 is arranged to have its two input terminals connected to the output terminal of the inverter 403 and that of the comparator 383. The two input terminals of the other AND gate 407 are connected to the output terminal of the inverter 404 and that of the comparator 384. The voltage VC is thus compared with the reference voltages Vr5, Vr6 and Vr7 by means of the comparators 382, 383 and 384 and the inverters 403, 404 and 405. The result of comparison varies with the output states of the comparator 382, AND gates 406 and 407 and the inverter 405 as classified in the following table:

| | Comp'r 382 | AND gate 406 | AND gate 407 | Inv'r 405 |
| --- | --- | --- | --- | --- |
| (1) Vr5 ≦ VC | H | L | L | L |
| (2) Vr6 ≦ VC < Vr5 | L | H | L | L |
| (3) Vr7 ≦ VC < Vr6 | L | L | H | L |
| (4) VC < Vr7 | L | L | L | H |

Numerals 408 and 409 denote OR gates; 410 and 411 AND gates; and 412 an OR gate. The OR gate 408 has four input terminals connected to the output terminals of the AND gates 398, 399, 401 and 402. When any one of the AND gates 398, 399, 401 and 402 produces a high level voltage, the voltage level of the output terminal of the OR gate 408 also becomes high. The OR gate 409 has six input terminals connected to the output terminals of the AND gates 396 and 398 to 402 and produces also a high level voltage when any one of these AND gates produces a high level voltage. The AND gate 410 has its two input terminals connected to the output terminal of the OR gate 408 and that of the AND gate 406 respectively. When the output level of the AND gate 406 is high, the output of the AND gate 410 is equal to that of the OR gate 408. Under that condition, since one of the two input terminals of the AND gate 411 is connected to the output terminal of the AND gate 407, the output level of the AND gate 407 is low as one of the input of the AND gate 411 is at a low level. One of two input terminals of the AND gate 411 is connected to the output terminal of the OR gate 409 and the other to that of the AND gate 407. When the AND gate 406 is producing a low level voltage, the output level of the AND gate 410 becomes low as one of the input terminals of the AND gate 410 is receiving a low level voltage. In this instance, if the output voltage of the AND gate 407 is at a high level, the high level voltage is supplied to one of the input terminals of the AND gate 411 and, therefore, the output of the AND gate 411 becomes equal to that of the OR gate 409. The outputs of the AND gates 410 and 411 and those of the comparators 382 and the inverter 405 are supplied to an OR gate 412. When at least one of the AND gates 410 and 411, the comparator 382 and the inverter 405 is producing a high level voltage, the OR gate 412 produces a high level voltage. The output terminal of this OR gate 412 is arranged to be the output terminal A/P of the selection circuit 321. The circuit 321 includes AND gates 413 to 417 and 419 to 423; OR gates 418 and 424; a NOR gate 425; and a reference voltage generating circuit 426. The circuit 426 is arranged to generate reference voltages Vr8, Vr9, Vr10, Vr11, −Vr12, −Vr13, −Vr14, −Vr15, Vr16 and −Vr17. The circuit 321 further includes analog switches 427 to 437. One of two input terminals of each of the AND gates 413 to 417 is connected to the output terminal of the AND gate 406. One of two input terminals of each of the AND gates 419 to 423 is connected to the output terminal of the AND gate 413. The other input terminal of the AND gate 413 is connected to the output terminal of the AND gate 394. That of the AND gate 414 is connected to the output terminal of the AND gate 395; that of the and gate 415 to the output terminal of the AND gate 396; that of the AND gate 416 to the output of the AND gate 399; that of the AND gate 417 to the output terminal of the AND gate 402; that of the AND gate 419 to the output terminal of the AND gate 394; that of the AND gate 420 to the output terminal of the AND gate 397; that of the AND gate 421 to the output terminal of the AND gate 400; that of the AND gate 422 to the output terminal of the AND gate 422; and that of the AND gate 423 to the output terminal of the AND gate 402 respectively. Therefore, when a high level voltage is produced from the output terminal of the AND gate 406, the high level voltage is supplied to one of the input terminals of each of the AND gates 413 to 417 while a low level voltage is supplied to the other input terminal. Therefore, the output of the AND gate 413 becomes equal to that of the AND gate 394; that of the AND gate 414 equal to that of the AND gate 395; that of the AND gate 415 equal to that of the AND gate 396; that of the AND gate 416 equal to that of the AND gate 399; that of the AND gate 417 equal to that of the AND gate 402; and the output voltages of the AND gates 419 to 423 are at low levels respectively. Conversely, when a high level voltage is produced from the output terminal of the AND gate 407, one of the input terminal of each of the AND gates 413 to 417 receives a low level voltage while one of the input terminals of each of the AND gates 419 to 423 receives a high level voltage. In that instance, therefore, the AND gates 413 to 417 produce low level voltages. The output of the AND gate 419 becomes equal to that of the AND gate 394. The output of the AND gate 420 becomes equal to that of the AND gate 397. The output of the AND gate 421 is equal to that of the AND gate 400. That of the AND gate 422 becomes equal to that of the the AND gate 401. That of the AND gate 423 becomes equal to that of the AND gate 402. One of the two input terminals of the OR gate 418 is connected to the output terminal of the AND gate 414 while the other is connected to the output terminal of the AND gate 415. The output level of the OR gate 418 becomes high when at least one of the voltage outputs of the AND gates 415 and 416 is at a high level. One of two input terminals of the OR gate 424 is connected to the output terminal of the AND gate 421 while the other is connected to the output terminal of the AND gate 422. The output level of the OR gate 424 becomes high when at least one of the voltage outputs of the AND gates 421 and 422 is at a high level. The NOR gate 425 has ten input terminals thereof connected to the output terminals of the AND gate 413, the OR gate 418, the AND gates 416, 417, 419 and 420, the OR gate 424, the AND gate 423, the comparator 382 and the inverter 405 respectively. The voltage output of the NOR gate 425 is at a high level only when all the AND gates 413 to 417 and 419 to 423, the comparator 382 and the inverter 405 produce high level voltage outputs and is otherwise at a low level. The analog switches 427 to 430 and 432 to 437 are arranged to receive the reference voltages supplied to their input terminals from the reference voltage generating circuit 426. More specifically, the reference voltage Vr8 is supplied to the input terminal of the switch 427; the reference voltage Vr9 to that of the switch 428; the reference voltage Vr10 to that of the switch 429; the reference voltage Vr11 to that of the switch 430; the reference voltage −Vr12 to that of the switch 432; the voltage −Vr13 to that of the switch 433; the voltage −Vr14 to that of the switch 434; the voltage −Vr15 to that of the switch 435; the voltage Vr16 to that of the switch 436; and the voltage −Vr17 to that of the switch 437 respectively. The input terminal of the analog switch 431 is at zero volt. The output terminals of the analog switches 427 to 437 are interconnected to serve as an output terminal O2 of the circuit 321. The control terminal of the analog switch 427 is connected to the output terminal of the AND gate 413; that of the switch 428 to the OR gate 418; that of the switch 429 to the output terminal of the AND gate 416; that of the switch 430 to the output of the AND gate 417; that of the switch 431 to the output terminal of the NOR gate 425; that of the switch 432 to the output terminal of the AND gate 419; that of the switch 433 to the output terminal of the AND gate 420; that of the switch 434 to the output terminal of the OR gate 424; that of the switch 435 to the output terminal of the AND gate 423; that of the switch 436 to the output terminal of the comparator 382; and that of the switch 437 to the output terminal of the inverter 405 respectively. The output level of one of the AND gate 413, the OR gate 418, the AND gates 416 and 417, the NOR gate 425, the AND gates 419 and 420, the OR gate 424, the AND gate 423, the comparator 382 and the inverter 405 becomes high irrespectively of the levels and magnitudes of the inputs VA, VB and VC of the selection circuit shown in FIG. 18. Meanwhile, the output levels of other gates remains low. Therefore, one of the analog switches 427 to 437 to which a high level control voltage is applied alone becomes conductive while other switches remain in an open state. When the output of the AND gate 413 becomes a high level voltage, the analog switch 427 becomes conductive to allow the reference voltage Vr8 to be produced from the output terminal O2. When the output of the OR gate 418 becomes a high level voltage, the switch 428 becomes conductive to allow the voltage Vr9 to be produced from the output terminal O2. When the voltage output level of the switch 416 is high, the switch 429 becomes conductive to allow the voltage Vr10 to be produced from the output terminal O2. When that of the AND gate 417 is high, the switch 430 becomes conductive to allow the voltage Vr11 to be produced from the output terminal O2. When that of the NOR gate 425 is high, the switch 431 becomes conductive to allow the zero voltage produced from the output terminal O2. When that of the AND gate 419 is high, the switch 432 becomes conductive to allow the voltage −Vr12 to be produced from the output terminal O2. When that of the AND gate 420 is high, the switch 433 becomes conductive to allow the voltage −Vr13 to be produced from the output terminal O2. When that of the OR gate 424 is high, the switch 434 becomes high to allow the voltage −Vr14 to be produced from the output terminal O2. When that of the AND gate 423 is high, the switch 435 becomes conductive to allow the voltage −Vr15 to be produced from the output terminal O2. When that of the comparator 382 is high, the switch 436 allows the voltage Vr16 to be produced from the terminal O2. When that of the inverter 405 is high, the switch 437 allows the voltage −Vr17 to be produced from the terminal O2. The values of the reference voltages Vr8, Vr9, Vr10, Vr11 and Vr16 are larger than zero while those of other reference voltages −Vr12, −Vr13, −Vr14, −Vr15 and −Vr17 are smaller than zero.

Referring to FIGS. 21(a) to 23(i), the operations of the circuits shown in FIGS. 17 and 20 are as follows:

(1) VC>Vr5:

In cases where the luminance signal VC obtained from the outermost area 2C of the photographing field is higher than the predetermined (reference) value Vr5, the photographing condition can be assumed to have a cloudless bright sky in the peripheral part of the image plane or to have some object of a considerably high degree of luminance there. Under such a condition, obtaining an exposure value by using the luminance output as it is tends to result in an under-exposure. Therefore. the exposure must be adjusted to somewhat highlight the whole image plane under the so-called highlight control which ensures that a whitish object is accurately depicted. In other words, the exposure value is corrected or adjusted to give an over-exposure relative to the measured luminance of the object. Accordingly, the photometric value V1−V2 is obtained from the following computing formula (1-1) using a correction value Vr16 along with the luminance signals VA, VB and VC obtained from all the areas 2A, 2B and 2C:

$$V1 - V2 = (VA = VB = VCO/3 - Vr16 \tag{1-1}$$

In this instance. the circuit arrangements shown in FIGS. 17 and 20 operate as follows: Referring first to the selection circuit 321 of FIG. 20, since the luminance signal (or photometric signal) VC obtained from the outermost area 2C (subdivided into the areas 2C1 to 2C4) is larger than the reference value Vr5, the comparator 382 produces a high level output. Therefore, the OR gate 412 produces a high level output to make the output level of the output terminal A/$\overline{P}$ high. At the same time, the analog switch 436 alone becomes conductive to allow the reference voltage Vr16 generated by the reference voltage generating circuit 426 to be produced from the output terminal O2. Therefore, the analog switch 325 shown in FIG. 17 becomes conductive to allow a voltage (VA+VB+VC)/3 to be produced from the operational amplifier 326. Since the voltage Vr16 is supplied to the inverting input terminal of the operational amplifier 331, the output V1−V2 of the amplifier 331 becomes a voltage (VA+VB+VC)/3−Vr16.

Figure 22A:
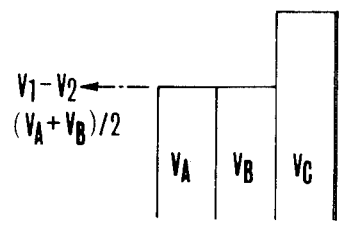
FIGS. 22($a$) to 22($i$) and 23($a$) to 23($i$) are illustrations of the levels of photometric values obtained by the photometric value computing formulas selected by the circuit of FIG. 17.

(2) In cases where the luminance signal VC exceeds the predetermined value Vr6 but is smaller than another predetermined value Vr5, that is, in the event of Vr6≦VC<Vr5, this condition suggests that the photographing field is an outdoor scene under a moderately clear sky (not very bright) or under a normal cloudy sky and has the relatively bright object such as the sky in the background. Under such a condition, the reference voltages VP1, VP2, VQ1 and VQ2 (which are in the relations of VP2<0<VP1 and VQ2<0<VQ1) are employed as constants according to a luminance signal difference VB−VA (hereinafter referred to as ΔBA) and another luminance signal difference VC−VB (hereinafter referred to as ΔCB) in obtaining the photometric value V1−V2 from one of the following computing formulas as applicable:

(2-1) Under condition of $$\begin{pmatrix} VP2 & < & \Delta BA & < & VP1 \\ VQ1 & < & \Delta CB & & \end{pmatrix},$$

that is, when the luminance signal difference ΔBA between the luminance signals for the middle area 2A of the photographing field and for the first outer (intermediate) area 2B is small while the luminance signal difference ΔCB between the intermediate area 2B and the outermost area 2C is larger than the positive predetermined value VQ1, as shown in FIG. 22(a), the main object to be photographed can be assumed to be likely existing in both the areas 2A and 2B. To give an exposure opposite to the main object, therefore, the photometric value V1−V2 is obtained from the following formula (2-1) using the luminance signals VA and VB of the areas 2A and 2B without any correction value:

$$V1 - V2 + (VA + VB)/2 \tag{2-1}$$

In this case, the selection circuit 321 of FIG. 20 operates as follows Since the photometric signal (voltage) for the outermost area 2C (including the subdivisions 2C1 to 2C4) is larger than the reference voltage Vr6 but is smaller than another voltage Vr5, the comparators 383 and 384 produce high level outputs. The comparator 382 produces a low level output. The output level of the AND gate 406 becomes high. Accordingly, a high level signal is supplied to the control terminal B/$\overline{D}$ of the reference voltage generating circuit 385. The reference voltages to be generated from the circuit 385 then become VPa=VP1, VPb=VP2, VQa=VQ1 and VQb=VQ2. Meanwhile, the voltage signal output VB−VA of the operational amplifier 375 brings about the condition of VP2<ΔBA<VP1. Therefore, the output level of the comparator 386 becomes low and that of the comparator 387 high. Further, since the signal voltage output VC−VB of the operational amplifier 380 brings about the condition of VQ1<ΔCB, the output level of the comparator 390 becomes high and that of the comparator 391 also high. Therefore, the AND gate 397 alone produces a high level output. Then, the OR gate 412 is caused to produce a high level output jointly by the high level output of the AND gate 397, the low level outputs of other AND gates 394 to 396 and 398 to 402 and the high level output of the AND gate 406. The output level of the output terminal A/$\overline{P}$ then becomes low. The output level of the NOR gate 425 becomes high. The output levels of other AND gates 413 to 423 become low to make the voltage output of the output terminal O2 zero. As a result, the operational amplifier 326 shown in FIG. 17 produces a voltage (VA+VB)/2. Since the inverting input terminal of the operational amplifier 331 receives zero voltage, the output V1−V2 of the amplifier 331 becomes (VA+VB)/2.

Figure 22B:
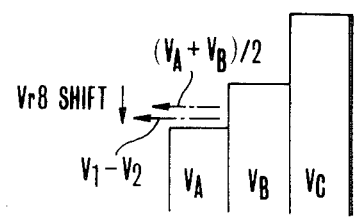

(2-2) Under a condition of $$\begin{pmatrix} VP1 & < & \Delta BA \\ VQ1 & < & \Delta CB \end{pmatrix},$$

that is, when the luminance signal difference ΔBA between the areas 2A and 2B is larger than the predetermined positive value VP1 and the luminance signal difference ΔCB between the areas 2B and 2C is also larger than the predetermined positive value VQ1, as shown in FIG. 22(b), the main object can be assumed to exist in a part of the area 2B as well as in the whole area 2A. In that instance, the photometric value V1−V2 may be obtained by using only the luminance signal VA of the area 2A. However, it is known by experience that a better exposure value is obtainable by taking into consideration to some degree the luminance signal for the background. Therefore, the photometric value V1−V2 is obtained from the following formula (2-2) by using a correction value Vr8 along with the luminance signals VA and VB for the main object:

$$V1-V2=(VA+VB)/2-Vr8 \qquad (b\ 2\text{-}2)$$

The circuit operation: The comparators 388, 389, 392 and 393 and the AND gate 406 all produce high level outputs. The AND gate 394 alone produces a high level output while other AND gates 395 to 402 produce low level outputs. Therefore, the output level of the OR gate 412 becomes low. The output level of the AND gate 413 becomes high. The voltage output of the operational amplifier 326 becomes (VA+VB)/2. The output V1−V2 of the operational amplifier 331 becomes (VA+VB)/2−Vr8.

Figure 22C:
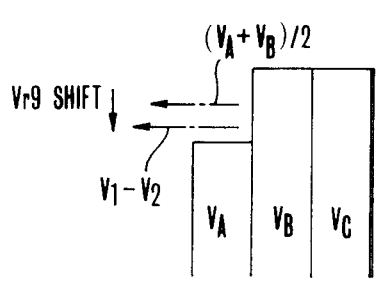

(2-3) Under a condition of $$\begin{pmatrix} VP1 & < & \Delta BA & \\ VQ2 & < & \Delta CB & < & VQ1 \end{pmatrix},$$

that is when the luminance signal difference ΔBA between the areas 2A and 2B is larger than the predetermined positive value VP1 while the luminance signal difference ΔCB between the areas 2B and 2C is small as shown in FIG. 22(c), the main object can be assumed to exist either in the whole area 2A or in a part of the area 2A as it is small in size. In this case, the photometric value V1−V2 may be obtained solely from the luminance signal of the area 2A. However, to obtain a better exposure for the main object by taking into consideration the luminance signal VB of the area 2B which corresponds to the background, the photometric value V1−V2 is obtained from the following formula using a correction value Vr9 (larger than Vr8) along with the luminance signals of the areas 2A and 2B:

$$V1-V2=(VA+VB)/2-Vr9 \qquad (2\text{-}3)$$

The circuit operation: The comparators 386, 387 and 390 all produce high level outputs. The AND gate 395 alone produces a high level output while other AND gates 394 and 395 to 402 produce low level outputs. The AND gate 406 produces a high level output. The output level of the OR gate 412 becomes low. That of the OR gate 418 becomes high. The voltage output of the operational amplifier 326 becomes (VA+VB)/2. The output V1−V2 of the operational amplifier 331 becomes (VA+VB)/2−Vr9.

Figure 22D:
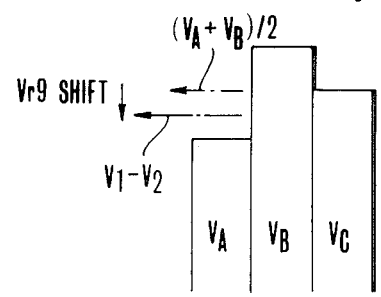

(2-4) Under a condition of $$\begin{pmatrix} VP1 & < & \Delta BA \\ \Delta CB & < & VQ2 \end{pmatrix},$$

that is, when the luminance signal difference ΔBA between the areas 2A and 2B is larger than the predetermined positive value VP1 while the luminance signal difference ΔCB between the areas 2B and 2C is smaller than the predetermined negative value VQ2 as shown in FIG. 22(d), the main object can be assumed to be of about the same size as in the case of Para. (2-3) above with a highly bright object (such as the sun, a sea surface reflection or the like) existing in the area 2B or with a considerably bright object existing in the area 2B in the event of a landscape scenery. It has been found from data that a fairly good result is obtainable by obtaining the photometric value V1−V2 under such a condition by using the luminance signals of all the areas 2A, 2B and 2C without any correction value. In the case of this embodiment, however, another method for obtaining a good result is employed. Namely, the photometric value V1−V2 is obtained from the following formula using a correction value Vr9 along with the luminance signals of the areas 2A and 2B in the same manner as in the case of Para. (2-3) above:

$$V1-V2=(VA+VB)/2-Vr9 \qquad (2\text{-}4)$$

The circuit operation: The comparators 386 and 387 produce high level outputs. The comparators 390 and 391 produce low level outputs. The AND gate 396 produces a high level output. Other AND gates 394, 395 and 397 to 402 produce low level outputs. Another AND gate 406 produces a high level output. Therefore, the OR gate 412 produces a low level output. The OR gate 418 produces a high level output. The voltage output of the operational amplifier 326 becomes (VA+VB)/2. The output V1−V2 of the operational amplifier 331 becomes (VA+VB)/2−Vr9.

Figure 22E:
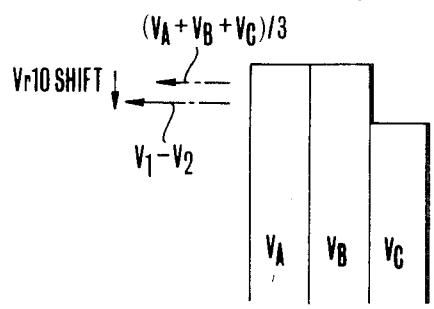

(2-5) Under a condition of $$\begin{pmatrix} VP2 & < & \Delta BA & < & VP1 \\ \Delta CB & < & VQ2 & & \end{pmatrix},$$

that is, when the luminance signal difference ΔBA between the areas 2A and 2B is small while the luminance signal difference ΔCB between the areas 2B and 2C is larger in negative absolute value than the predetermined value VQ2, as shown in FIG. 22(e), the main object can be assumed to be large thus existing in both the areas 2A and 2B and to be in a whitish color. In that instance, the photometric value may be obtained from the luminance signals for the areas 2A and 2B. In the event that the peripheral part of the image plane has a lower degree of luminance than the middle part, however, a photometric value obtained with the luminance of the peripheral area 2C taken into consideration to some degree gives a highlight control effect more clearing depicting the whitish main object. It is known from data that a photometric value obtained by the latter method gives a more apposite exposure value. Therefore, to give a highlighting effect on the main object part, the photometric value V1−V2 is obtained from the following formula (2-5) using a correction value Vr10 along with all the luminance signals VA, VB and VC:

$$V1-V2=(VA+VB+VC)/3-Vr10 \quad (2-5)$$

The circuit operation: The comparator 387 produces a high level output. Meanwhile, the comparators 386, 390 and 391 produce low level outputs. The AND gate 399 produces a high level output while other AND gates 394, 398 and 400 to 402 produce low level outputs. The AND gate 406 produces a high level output. Accordingly, the output level of the OR gate 412 becomes high. The voltage output of the operational amplifier 326 becomes (VA+VB+VC)/3. The output V1−V2 of the operational amplifier 331 becomes (VA+VB+VC)/3−Vr10.

Figure 22F:
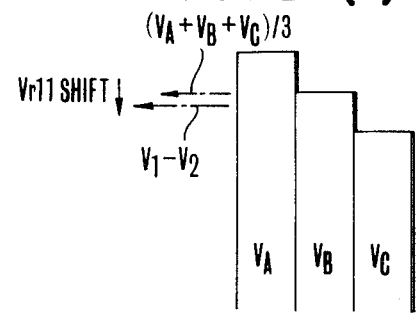

(2-6) Under a condition of $$\begin{pmatrix} \Delta BA & < & VP2 \\ \Delta CB & < & VQ2 \end{pmatrix},$$

that is, when the luminance signal difference ΔBA between the areas 2A and 2B is larger in negative absolute value than the predetermined value VP2 while the luminance signal difference ΔCB between the areas 2B and 2C is also larger in negative absolute value than the predetermined value VQ2 as shown in FIG. 22(f), the main object can be assumed to be of an intermediate size existing in a part of the area 2B as well as in the whole area 2A and to be in a whitish color. In this case, to give the same highlighting effect on the main object like in the case of Para. (2-5) above, the photometric value V1−V2 is obtained from the following formula (2-g) using a correction value Vr11 (smaller than Vr10) along with the luminance signals of the areas 2A, 2B and 2C:

$$V1-V2=(VA+VB+VC)/3-Vr11 \quad (2-6)$$

The circuit operation: The comparators 386 to 391 produce low level output. The AND gate 402 produces a high level output. Other AND gates 394 to 401 produce low level outputs. The AND gate 406 produces a high level output. Therefore, the OR gate 412 produces a high level output to make the output level of the AND gate 417 high. The voltage output of the operational amplifier 326 becomes (VA+VB+VC)/3. The output V1−V2 of the operational amplifier 331 becomes (VA+VB+VC)/3−Vr11.

Figure 22G:
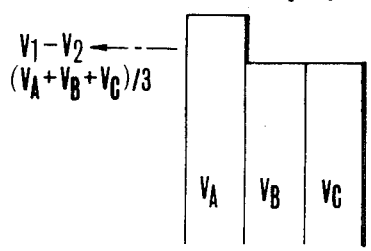

(2-7) Under a condition of $$\begin{pmatrix} \Delta BA & < & VP2 \\ VQ2 & < & \Delta CB & < & VQ1 \end{pmatrix},$$

that is, when the luminance signal difference ΔBA between the areas 2A and 2B is larger in negative absolute value than the predetermined value Vr2 while the luminance signal difference ΔCB between the areas 2B and 2C is small as shown in FIG. 22(g), the main object to be photographed can be assumed to exist either in the whole area 2A or, because of its small size, in a part of the area 2A and, in addition to that, to be in a whitish color. Then, to highlight the main object in the same manner as mentioned above, the photometric value V1−V2 is obtained from the following formula using the luminance signals of the areas 2A and 2B without using any correction value:

$$V1-V2=(VA+VB+VC)/3 \quad (2-7)$$

The circuit operation: The comparator 390 produces a high level output. Other comparators 386, 387 and 391 produce low level outputs. The AND gate 401 produces a high level output while other AND gates 394 to 400 and 402 produce low level outputs. Another AND gate 406 produces a high level output. Accordingly, the OR gate 412 produces a high level output to make the output level of the NOR gate 425 high. The voltage output of the operational amplifier 326 then becomes (VA+VB+VC)/3. The output V1−V2 of the operational amplifier 331 also becomes (VA+VB+VC)/3

Figure 22H:
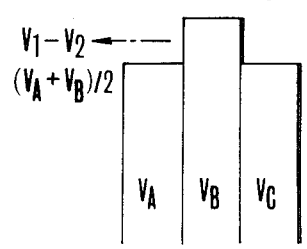

(2-8) Under a condition of $$\begin{pmatrix} \Delta BA & < & VP2 \\ VQ1 & < & \Delta CB \end{pmatrix},$$

that is, when the luminance signal difference ΔBA between the areas 2A and 2B is larger in negative absolute value than the predetermined value VP2 while the luminance signal difference ΔCB between the areas 2B and 2C is also larger than the predetermined value VQ1 as shown in FIG. 22(h), the main object can be assumed to be of about the same size as in the case of Para. (2-1) above and to include bright and dark parts resulting in a rather high degree of luminance of the area 2A; or the area 2B can be assumed to be occupied by an object of a considerably low degree of luminance in a landscape or the like. In this instance, the present inventors know from data, an adquate result is obtainable by obtaining the photometric value using the luminance signals of all the areas 2A, 2B and 2C without any correction value. In the case of this specific embodiment, however, another method for obtaining an adequate result is employed. Namely, the photometric value V1−V2 is obtained from the following formula (2-8) using the luminance signals of the areas 2A and 2B without any correction value in the same manner as in the case of Para. (2-1) above:

$$V1-V2=(VA+VB)/2 \quad (2-8)$$

The circuit operation: The comparators 390 and 391 produce high level outputs. The comparators 386 and 387 produce low level outputs. The AND gate 400 produces a high level output while other AND gates 394 to 399, 401 and 402 produce low level outputs. Another AND gate 406 produces a high level output. Therefore, the output level of the OR gate 412 becomes low to make that of the NOR gate 425 high. The voltage output of the operational amplifier 326 becomes (VA+VB)/2. The output V1−V2 of the other operational amplifier 331 becomes (VA+VB)/2.

Figure 22I:
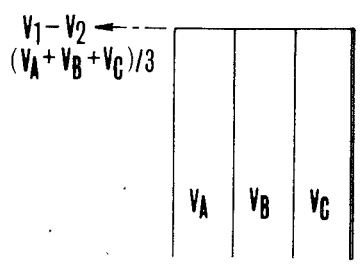

(2-9) Under a condition of $$\begin{pmatrix} VP2 & < & \Delta BA & < & VP1 \\ VQ2 & < & \Delta CB & < & VQ1 \end{pmatrix},$$

that is, when the luminance signal difference ΔBA between the areas 2A and 2B is small while another luminance signal difference ΔCB between the areas 2B and 2C is also small as shown in FIG. 22(i), the photographing field can be assumed either to have the whole field occupied by the main object or to have nothing in particular as a main objects in the case of a landscape. In that instance, the photometric value V1−V2 is obtained from the following formula (2-9) using the luminance signals of the areas 2A, 2B and 2C without any correction value:

$$V1-V2=(VA+VB+VC)/3 \tag{2-9}$$

The circuit operation: The comparators 387 and 390 produce high level outputs while other comparators 386 and 391 produce low level outputs. The AND gate 398 produces a high level output while other AND gates 394 to 397 and 399 to 402 produce low level outputs. Another AND gate 406 produces a high level output. Therefore, the OR gate 412 produces a high level output. The output level of the NOR gate 425 becomes high. The voltage output of the operational amplifier 326 becomes (VA+VB+VC)/3. The output V1−V2 of the operational amplifier 331 also becomes (VA+VB+VC)/3.

Figure 23A:
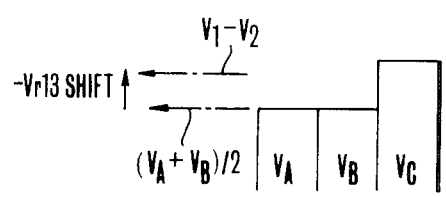

(3) In cases where the luminance signal VC is larger than the predetermined value Vr7 but is smaller than another predetermined value Vr6, i.e. in the event of Vr7≦VC<Vr6, the photographing field is considered to be an ordinary outdoor scene in the shade or an indoor scene (with the peripheral part of the image plane or the background darkened by walls or the like). In such cases, the reference voltages VP3, VP4, VQ3 and VQ4 (VP4<0<VP3 and VQ4<0<VQ3) are employed as constants as necessary along with the luminance signal differences VB−VA (ΔBA) and VC−VB (ΔCB) in obtaining the photometric value V1−V2 from applicable computing formulas as described below:

(3-1) Under a condition of $$\begin{pmatrix} VP4 & < & \Delta BA & < & VP3 \\ VQ3 & < & \Delta CB & \end{pmatrix},$$

that is, when the luminance signal difference ΔBA between the luminance signals obtained from the areas 2A and 2B is small while another difference ΔCB between the luminance signals from the areas 2B and 2C is larger than the predetermined value VQ3 as shown in FIG. 23(a), the main object to be photographed can be assumed to be large thus existing in both the areas 2A and 2B and, in addition, to be blackish in color. In this case, the photometric value may be obtained by simply using the luminance signals of the areas 2A and 2B. However, it is preferable to have the blackish state of the main object accurately depicted (by shadow control). Therefore, in order to give a shadow depicting exposure for the main object, this embodiment is arranged to obtain the photometric value V1−V2 from the following formula using a negative correction value −Vr13 along with the luminance signals of the areas 2A and 2B:

$$V1-V2=(VA+VB)/2+Vr13 \tag{3-1}$$

In this case, the circuit arrangement operates as follows: Since the photometric (luminance) signal voltage VC for the outermost area 2C (including the subdivisions 2C1 to 2C4) is lower than the predetermined (reference) voltage Vr6 but is higher than another predetermined voltage Vr7, the comparator 383 produces a low level output to supply the control terminal B/D̄ of the reference voltage generating circuit 385 with a low level signal. This causes the reference voltages to be generated by the circuit 385 to become VPa=VP3, VPb=VP4, VQa=VQ3 and VQb=VQ4 respectively. Meanwhile, the comparators 387, 390 and 391 produce high level outputs. The AND gate 397 produces a high level output. Other AND gates 394 to 396 and 398 to 402 produce low level outputs. Another AND gate 407 produces a high level output. As a result, the output level of the OR gate 412 becomes low while that of the AND gate 420 becomes high. The voltage output of the operational amplifier 326 becomes (VA+VB)/2. The output V1−V2 of the operational amplifier 331 becomes (VA+VB)/2+Vr13.

Figure 23B:
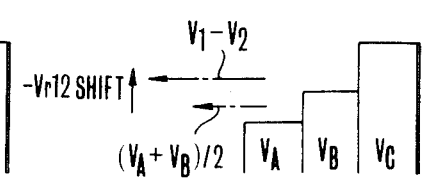

(3-2) Under a condition of $$\begin{pmatrix} VP3 & < & \Delta BA \\ VQ3 & < & \Delta CB \end{pmatrix},$$

that is, when the luminance signal difference ΔBA between the areas 2A and 2B is larger than the predetermined value VP3 while the luminance signal difference ΔCB between the areas 2B and 2C is larger than the predetermined value VQ3 as shown in FIG. 23(b), the main object then can be assumed to be in both the areas 2A and 2B and, in addition, to be in a blackish color. In that case, to give a shadow depicting exposure in the same way as in the case of Para. (3-1) above, the photometric value V1−V2 is obtained from the following formula using a negative correction value −Vr12 along with the luminance signals of the areas 2A and 2B:

$$V1-V2=(VA+VB)/2+Vr12 \tag{3-2}$$

circuit operation: The comparators 386 to 391 all produce high level outputs. The AND gate 394 produces a high level output while other AND gates 395 to 402 produce low level outputs. The AND gate 407 produces a high level output. The output level of the OR gate 407 becomes low and that of the AND gate 420 high. The voltage output of the operational amplifier 326 becomes (VA+VB)/2. The output V1−V2 of the operational amplifier becomes (VA+VB)/2+Vr12.

Figure 23C:
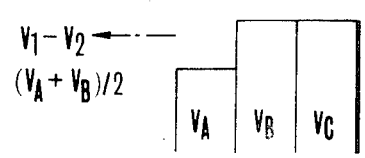

(3-3) Under a condition of $$\begin{pmatrix} VP3 & < & \Delta BA \\ VQ4 & < & \Delta CB & < & VQ3 \end{pmatrix},$$

that is, when the luminance signal difference ΔBA between the areas 2A and 2B is larger than the predetermined value VP3 while the other luminance signal difference ΔCB between the areas 2B and 2C is small as shown in FIG. 23(c), the main object can be assumed to be either in the whole area 2A or, because of its small size, in a part of the area 2A and to be in a blackish color. Then, to give a shadow depicting exposure for the main object, the photometric value V1−V2 is obtained from the following formula (3-3) using the luminance signals of the areas 2A and 2B without using any correction value:

$$V1-V2=(VA+VB)/2 \tag{3-3}$$

The circuit operation: The comparator 391 produces a low level output. Other comparators 386 to 390 produce high level outputs. The AND gate 395 produces a high level output. The AND gates 394 and 396 to 402 produce low level outputs. The AND gate 407 produces a high level output. The output level of the OR gate 412 becomes low and that of the NOR gate 425 high. The voltage output of the operational amplifier 326 becomes (VA+VB)/2. The output V1−V2 of the operational amplifier 331 also becomes (VA+VB)/2.

Figure 23D:
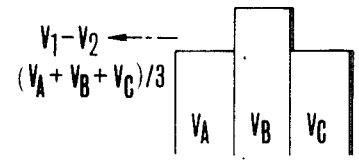

(3-4) Under a condition of $$\begin{pmatrix} VP3 & < & \Delta BA \\ \Delta CB & < & VQ4 \end{pmatrix},$$

that is, when the luminance signal difference ΔBA between the areas 2A and 2B is larger than the predetermined value VP3 while the luminance signal difference ΔCB between the areas 2B and 2C is larger in negative absolute value than the predetermined value VQ4 as shown in FIG. 23(d), the main object can be assumed to be of about the same size as in the case of Para. (3-3) above with some object (such as an electric lamp) of a high degree of luminance located in the area 2B. Compared with an outdoor scene having the sun or the like in the area 2B, the high luminance object in the area 2B in this case does not bring about much adverse effect, according to data obtained in the past. Therefore, the photometric value V1−V2 is obtained from the following formula using the luminance signals of the areas 2A, 2B and 2C without any correction:

$$V1-V2=(VA+VB+VC)/3 \tag{3-4}$$

The circuit operation: The comparators 390 and 391 produce low level outputs. Other comparators 386 and 387 produce high level outputs. The AND gate 396 produces a high level output. Other AND gates 394, 395 and 397 to 402 produce low level outputs. Another AND gate 407 produces a high level output. Therefore, the output level of the OR gate 412 becomes high and that of the NOR gate 425 also high. The voltage output of the operational amplifier 326 becomes (VA+VB+VC)/3. The output V1−V2 of the operational amplifier also becomes (VA+VB+VC)/3.

Figure 23E:
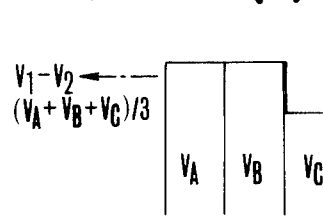
Figure 23F:
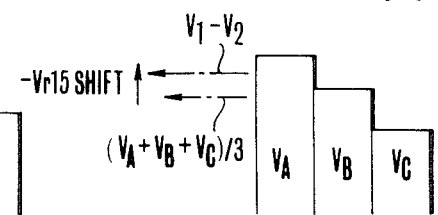

(3-5) Under a condition of $$\begin{pmatrix} VP4 & < & \Delta BA & < & VP3 \\ \Delta CB & < & VQ4 & & \end{pmatrix},$$

that is, when the luminance signal difference 66 BA between the areas 2A and 2B is small while the luminance signal difference ΔCB between the areas 2B and 2C is larger in negative absolute value than the predetermined value VQ4 as shown in FIG. 23(e), the main object can be assumed to exist in both the areas 2A and 2B while the areas 2A and 2B are alone illuminated by some light. Under this condition, the photometric value may be obtained only from the luminance signals of the areas 2A and 2B. In the case of this embodiment, however, the darker peripheral area, i.e. the area 2C, is considered to be depicted to some extent. Namely, the photometric value V1−V2 is obtained from the following formula (3-5) using not only the luminance signals of the areas 2A and 2B but also that of the area 2C without using any correction value:

$$V1-V2=(VA+VB+VC)/3 \tag{3-5}$$

The circuit operation: The comparators 386 390 and 391 produce low level outputs. The comparator 387 produces a high level output. The AND gate 399 produces a high level output while other AND gates 394–398 and 400 to 402 produce low level outputs. The AND gate 407 produces a high level output. Therefore, the output level of the OR gate 412 becomes high and that of the NOR gate 425 also high. The voltage output of the operational amplifier 326 becomes (VA+VB+VC)/3. The output V1−V2 of the operational amplifier 331 also becomes (VA+VB+VC)/3.

(3-6) Under a condition of $$\begin{pmatrix} \Delta BA & < & VP4 \\ \Delta CB & < & VQ4 \end{pmatrix},$$

that is, when the luminance signal difference ΔBA between the areas 2A and 2B is larger in negative absolute value than the predetermined value VP4 while the luminance signal difference ΔCB between the areas 2B and 2C is also larger in negative absolute value than the predetermined value VQ4, as shown in FIG. 23 (f), the main object can be assumed to be in the whole area 2A and a part of the area 2B with the whole of the area 2A and a part of the area 2B illuminated by some light or the like. Under that condition, unlike in the case of Para. (3-5) above, correction with some correction value is necessary for an exposure apposite to the main object. Therefore, the photometric value V1−V2 is obtained from the following formula (3-6) using a negative correction value −Vr15 along with the luminance signals of the areas 2A, 2B and 2C:

$$V1-V2=(VA+VB+VC)/3+Vr15 \tag{3-6}$$

The circuit operation: The comparators 386 to 391 all produce low level outputs. The AND gate 402 produces a high level output while other AND gates 394 to 4-1 produce low level outputs. The AND gate 407 produces a high level output. Therefore, the output level of the OR gate 412 becomes a high level and that of the AND gate 423 also a high level. The voltage output of the operational amplifier 326 becomes (VA+VB+VC)/3. The output V1−V2 of the operational amplifier 331 becomes (VA+VB+VC)/3+Vr15.

Figure 23G:
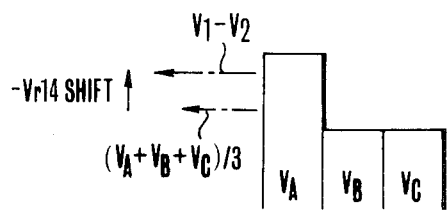

(3-7) Under a condition of $$\begin{pmatrix} \Delta BA & < & VP4 & \\ VQ4 & < & \Delta CB & < & VQ3 \end{pmatrix},$$

that is, when the luminance signal difference ΔBA between the areas 2A and 2B is larger in negative absolute value than the predetermined value VP4 while the luminance signal difference ΔCB between the areas 2B and 2C is small as shown in FIG. 23(g), the main object can be assumed either to exist in the whole area 2A or, because of its small size, in a part of the area 2A. In this instance, to give an exposure apposite to the main object, the photometric value V1=V2 is obtained from the following formula using a negative correction value −Vr14 (|Vr14|>|Vr15|) along with the luminance signals of the areas 2A, 2B and 2C:

$$V1-V2=(VA+VB+VC)/3+Vr14 \qquad (3\text{-}7)$$

The circuit operation: The comparators 386, 387 and 391 produce low level outputs. The comparator 390 produces a high level output. The AND gate 401 produces a high level output. The AND gates 394 to 400 and 402 produce low level outputs. The AND gate 407 produces a high level output. The OR gate 412, therefore, produces a high level output. Another OR gate 424 produces a high level output. The voltage output of the operational amplifier 326 becomes (VA+VB+VC)/3. The output V1−V2 of the operational amplifier 331 becomes (VA+VB+VC)/3+Vr14.

Figure 23H:
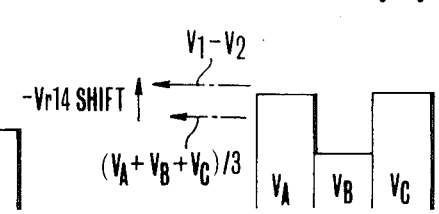

(3-8) Under a condition of $$\begin{pmatrix} \Delta BA & < & VP4 \\ VQ3 & < & \Delta CB \end{pmatrix},$$

that is, when the luminance signal difference ΔBA between the areas 2A and 2B is larger in negative absolute value than the predetermined value VP4 while the luminance signal difference ΔCB between the areas 2B and 2C is also larger than the predetermined value VQ3 as shown in FIG. 23(h), the main object can be assumed to be of about the same size as in the case of Para. (3-1) above and to have bright and dark parts thus resulting in a rather high degree of luminance of the area 2A though, as a whole, it is in a blackish color; or the photographing field can be assumed to be, for example, an indoor scene having some object of a considerably low degree of luminance such as a window or the like in the area 2B. It is known from data that, under such a condition, an acceptable result may be obtainable by obtaining a photometric value by simply using the measured luminance values of all the areas 2A, 2B and 2C without using any correction value depending on the conditions of the photographing field. In the case of this embodiment, however, a method for obtaining an overall acceptable result is employed. Namely, the photometric value V1−V2 is obtained from the following formula using a negative correction value −Vr14 along with the luminance signals of all the areas 2A, 2B and 2C:

$$V1-V2=(VA+VB+VC)/3+Vr14 \qquad (3\text{-}8)$$

The circuit operation: The comparators 386 and 387 produce low level outputs. The comparators 390 and 391 produce high level outputs. The AND gate 400 produces a high level output. Other AND gates 394 to 399, 401 and 402 produce low level outputs. Another AND gate 407 produces a high level output. Therefore, the OR gates 412 and 424 produce high level outputs. The voltage output of the operational amplifier becomes (VA+VB+VC)/3. The output V1−V2 of the operational amplifier 331 becomes (VA+VB+VC)/3+VR14.

Figure 23I:
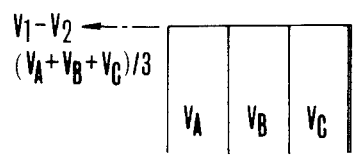

(3-9) Under a condition of $$\begin{pmatrix} VP4 & < & \Delta BA & < & VP3 \\ VQ4 & < & \Delta CB & < & VQ3 \end{pmatrix},$$

that is, when the luminance signal difference ΔBA between the areas 2A and 2B is small while the luminance signal difference ΔCB between the areas 2B and 2C is also small as shown in FIG. 23(i), the main object can be assumed to occupy the whole photographing field; or the field can be assumed to have no main object in particular. In this case, to give an exposure apposite to all the areas 2A, 2B and 2C, the photometric value V1−V2 is obtained from the following formula using the luminance signals of all the areas 2A, 2B and 2C without using any correction value:

$$V1-V2=(VA+VB+VC)/3 \qquad (3\text{-}9)$$

The circuit operation: The comparators 386 and 391 produce low level output. Other comparators 387 and 390 produce high level outputs. The AND gate 398 produces a high level output while other AND gate 394 to 397 and 399 to 402 produce low outputs. Another AND gate 407 produces a high level output. The OR gate 412 produces a high level output and the NOR gate 425 also produces a high level output. The voltage output of the operational amplifier 326 becomes (VA+VB+VC)/3 and the output V1−V2 of the operational amplifier 331 also becomes (VA+VB+VC)/3.

(4) In cases where the luminance signal VC is smaller than the predetermined value Vr7, the photographing field is at a considerably low degree of luminance suggesting a night scene or the like. Under such a condition, if an exposure value is obtained by using the measured luminance of the field as it is, it tends to result in an excessive over-exposure. In view of this, the measured luminance value is adjusted in the direction of giving an underexposure or a shadow depicting exposure (or shadow control) for the whole image plane to have dark objects appear on the picture in the dark state. For that purpose, the photometric value V1−V2 is obtained, under such a condition, from the following formula (4-1) using a negative correction value −Vr17 along with the luminance signals of all the areas 2A, 2B and 2C:

$$V1-V2=(VA+VB+VC)/3+Vr17 \qquad (4\text{-}1)$$

It is a feature of the light measuring device described as the third embodiment that, with the main object assumed to be in the middle part (the area 2A) of the field, the device is capable of detecting the size of the main object and carrying out necessary correction according to the detected size of the main object.

It is another feature of the embodiment that, when the main object is found to be whitish or blackish, the photometric value is corrected under highlight or shadow depicting control, so that the object can be photographed showing its whitish or blackish state without fail. Besides, since the degree of such correction is adjusted according to the detected size of the object, the photometric value can be effectively controlled.

Further, in FIGS. 22(a) to 23(i), in the event of small luminance signal differences among the areas 2A, 2B and 2C, these areas are shown as if they are at an equal level of luminance for the sake of illustration. In actuality, the measured luminance value of each area of course differs from that of the neighboring areas in most cases even when, for example, the luminance difference between the adjacent areas is smaller than an applicable predetermined value, such as the value VP1.

Further, in the foregoing description of the embodiment, the computing formulas used for obtaining the photometric value V1−V2 are divided into four groups according to the levels of the luminance of the peripheral parts of the image plane (the subdivision areas VC1 to VC4). However, this arrangement may be replaced with a more elaborate or rougher arrangement dividing the peripheral area into a greater number of subdivisions or without subdividing it (VC). Further, the computing method for obtaining the photometric value V1−V2 is divided into two methods. In one method, the luminance signals VA and VB of the middle and intermediate measuring areas are used. In the other, the luminance signals VA, VB and VC for all the areas of the image plane are used. However, that arrangement may be changed to include luminance information on a part of or the whole of the subdivided peripheral area. Further, the photographing field may be divided into more than three annular zones or areas to use the luminance signal differences among a greater number of neighboring areas.

As described in the foregoing, the third embodiment gives a light measuring device wherein: When the luminance value of a specific one of the plurality of areas of the photographing field is larger than a first predetermined luminance value which is preset at a high luminance value, a computing formula is selected for giving a highlighting exposure. When the luminance value of the specific area is smaller than a second luminance value preset at a low luminance value, another computing formula is selected for giving a shadow depicting exposure. Further, when the luminance value of the specific area is smaller than the first luminance value but is larger than the second luminance value, a computing formula is selected according to the luminance values of the divided areas and the differences among them. Therefore, an apposite photometric value can be obtained to have a whitish or blackish object accurately photographed in its whitish or blackish state without fail.

This invention is applicable not only to a single lens reflex camera but also to cameras of other types such as a lens shutter camera, etc. While a logic circuit arrangement is employed in the embodiment described, that arrangement of course can be replaced with some software processing arrangement using a microcomputer.

What is claimed is:

1. A light measuring device comprising:
(a) light receiving means arranged to divide a photographic field into a plurality of areas inclusive of at least three areas including a middle area located in the middle of said field, a first outer area located on the outer side of said middle area and a second outer area located on the outer side of said first outer area and to obtain luminance information values on each of said plurality of areas;
(b) luminance difference detecting means for obtaining a plurality of luminance information difference values between adjacent areas among said plurality of areas from a plurality of said luminance information values obtained by said light receiving means;
(c) computing means including photometric value computing circuits for implementing a plurality of computing formulas each of which includes as a functions at least one of said plurality of said luminance information values obtained by said light receiving means; and
(d) selection means for selecting one of said photometric value computing circuits as operative in providing light measurement output by said device on the basis of at least one of said plurality of said luminance information values obtained by said light receiving means and said luminance information difference values obtained by said luminance difference detecting means.

2. A device according to claim 1, wherein said photometric value computing circuits of said computing means implement a formula dividing by 2 the sum of the luminance information values obtained on said middle area and said first outer area and a formula of dividing by 3 the sum of luminance information values obtained on all of the middle area, the first outer area and the second outer area.

3. A device according to claim 2, wherein said photometric value computing circuits of said computing means further implement a formula of correcting, with a correction value, a value obtained by dividing by 2 the sum of the luminance information values obtained on said middle area and said first outer area and another formula of correcting, with a correction value, a value obtained by dividing by 3 the sum of luminance information values obtained on all of the middle area, the first outer area and the second outer area.

4. A device according to claim 1, where said selection means is operative to select said one circuit on the basis of the luminance information on the second outer area and said luminance information difference values.

5. A light measuring device comprising:
(a) light receiving means including a plurality of light receiving parts arranged to divide a photographing field into a plurality of area inclusive of at least three areas including a middle area located in the middle of said field, a first outer area located on the outer side of said middle area and a second outer area located on the outer side of said first outer area, to subdivide at least said second outer area into a plurality of smaller areas, and to obtain luminance information on each of said middle area, said first outer area, said second outer area and said smaller area, said light receiving means obtaining luminance information values on peripheral areas from a peripheral luminance computing circuit implementing a computing formula which includes, as a function, the luminance information value obtained on at least one of said smaller peripheral areas;
(b) luminance difference detecting means for obtaining luminance information difference values between adjacent areas among said plurality of areas from a plurality of said luminance information values obtained by said light receiving means;

(c) computing means including photometric value computing circuits for implementing a plurality of computing formulas each of which includes as a function at least one of said plurality of said luminance information values obtained by said light receiving means; and (d) selection means for selecting one of said photometric value computing circuits as operative in providing light measurement output by said device on the basis of at least one of said plurality of said luminance information values obtained by said light receiving means and said luminance information difference values obtained by said luminance difference detecting means.

6. A device according to claim 5, wherein said photometric value computing circuits of said computing means implement a formula of dividing by 2 the sum of said luminance information values obtained on said middle area and said first outer area and a formula of dividing by 3 the sum of luminance information values obtained on all of said middle, the first outer and the second outer areas.

7. A device according to claim 6, wherein said photometric value computing circuits of said computing means further implement a formula of correcting, with a correction value, a value obtained by dividing by 2 the sum of the luminance information values obtained on said middle and first outer areas and another formula of correcting, with a correction value, a value obtained by dividing by 3 the sum of the luminance information values obtained on all of said middle, the first outer and the second outer areas.

8. A device according to claim 5, wherein said selection means is operative to select said photometric value computing circuit on the basis of luminance information values obtained on the second outer area of said light receiving means and said luminance information difference values.

9. A light measuring device comprising:
(a) light receiving means arranged to divide a photographing field into a plurality of areas and to obtain luminance information values on each of said plurality of areas;
(b) luminance difference detecting means for obtaining luminance information difference values among said areas from a plurality of said luminance information values obtained by said light receiving means;
(c) computing means including photometric value computing circuits for implementing computing formulas each of which includes as a function at least one of said plurality of luminance information values obtained by said light receiving means, said computing formulas including
(1) a formula for highlighting a specific area of said photographic field,
(2) a formula for shadow depicting a specific area of said photographing field; and
(d) selection means for selecting one of said photometric value computing circuits of said computing means as operative in providing light measurement output by said device on the basis of at least one of said plurality of luminance information values obtained by said light receiving means and said luminance information difference values obtained by said luminance difference detecting means.

10. A device according to claim 9, wherein said selection means is operative to select from said computing means a circuit thereof implementing said highlighting formula when the luminance information value of a specific area of said light receiving means is larger than a predetermined value.

11. A device according to claim 9, wherein said selection means is operative to select from said computing means a circuit thereof implementing said shadow depicting formula when the luminance information value of a specific area of said light receiving means is smaller than a predetermined value.

12. A light measuring device comprising:
(a) light receiving means arranged to divide a photographing field into a plurality of areas and to obtain luminance information values on each of said areas;
(b) luminance difference detecting means for obtaining luminance information difference values among said plurality of areas from a plurality of said luminance information values obtained by said light receiving means;
(c) computing means including photometric value computing circuits for implementing a plurality of computing formulas each of which includes as a function at least one of said plurality of said luminance information values obtained by said light receiving means; and
(d) selection means for selecting one of said photometric value computing circuits of said computing means, said selection means being operative:
(1) to select from said computing means a first photometric computing circuit which gives an exposure for highlighting a specific area of said photographing field when a predetermined one of said plurality of luminance information values is detected to be larger than a first luminance value which is preset at a high luminance value,
(2) to select from said computing means a second photometric computing circuit which gives an exposure for shadow depicting a specific area of said field when said predetermined one of said plurality of luminance information values is detected to be smaller than a second luminance value preset at a low luminance value, and
(3) to select from said computing means one of said photometric value computing circuits on the basis of at least one of said plurality of luminance information values and at least two luminance information difference values obtained by said lumiannce difference detecting means when said specific luminance information value is detected to be smaller than said first luminance value and larger than said second luminance value.

13. A device according to claim 1, wherein said photometric value computing circuits of said computing means include a circuit implementing a formula using only luminance information values obtained on an approximately middle part in said pohotographing field, and a formula using luminance information values obtained on the entirety of said photographing field.

14. A device according to claim 5, wherein said photometric value computing circuits of said computing means include a circuit implementing a formual using only luminance information values obtained on an approximately middle part in said photographing field, and a formula using luminance information values obtained on the entirety of said photographing field.

15. A light measuring device comprising:
(a) light receiving means arranged to divide a photographic field into a plurality of areas inclusive of at least three areas including a middle area located in the middle of said field, a first outer area located on the outer side of said middle area and a second outer area located on the outer side of said first outer area and to obtain luminance information values on each of said plurality of areas;
(b) luminance difference detecting means for obtaining a plurality of luminance information difference values between adjacent areas among said plurality of areas from a plurality of said luminance information values obtained by said light receiving means; and
(c) a circuit for determining a photometric value on the basis of at least the luminance information in said first outer area, said circuit being operative to substantially correct the luminance information value of said middle area and the luminance information value of said first outer area in accordance with said plurality of luminance information difference values.

16. A device according to claim 15, wherein said determining circuit determines said photometric value with correction so as to obtain a highlight depiction when the luminance information value of a specific area of said light receiving means is larger than a predetermined value.

17. A device according to claim 15, wherein said determining circuit determines said photometric value with correction so as to obtain shadow depiction when the luminance information value of a specific area of said light receiving means is larger than a predetermined value.

* * * * *

UNITED STATES PATENT AND TRADEMARK OFFICE
CERTIFICATE OF CORRECTION

PATENT NO. : 4,786,935

DATED : November 22, 1988

INVENTOR(S) : Shingo Hayakawa et al.

It is certified that error appears in the above-identified patent and that said Letters Patent is hereby corrected as shown below:

Item [57] Abstract, line 8, change "of" to -- on --.
Col. 2, line 53, change "a" to -- an --.
Col. 3, line 13, change ">0" first occurrence to -- $\geq 0$ --.
Col. 3, lines 15-20, change the formulas from "$VA=a1+b \cdot 1niA$
$VB=a2+b \cdot 1niB$       to
$VC=a3+b \cdot 1niC$"

-- $VA=a1+b \cdot \ell niA$
$VB=a2+b \cdot \ell niB$
$VC=a3+b \cdot \ell niC$ --.

Col. 4, line 57, change "volage" to -- voltage --.
Col. 5, line 49, after "illustration" insert -- includes --.
Col. 7, line 15, change "produces" to -- produce --.
Col. 9, line 50, change "60to 60d" to -- 60b to 60d --.
Col. 9, line 51, change "(VA VB+VC)" to -- (VA+VB+VC) --.
Col. 10, line 19, change "V1 V2" to -- V1-V2 --.
Col. 10, line 64, change "60to 60e" to -- 60b to 60e --.
Col. 11, line 32, change "(2) luminance" to -- (2) When the luminance --.
Col. 11, line 37, after "V1-V2" insert -- is --.
Col. 11, line 61, after "main object" insert -- is --.
Col. 12, line 9, change "becomes" to -- become --.
Col. 12, line 19, after "60j" insert -- low --.
Col. 12, line 22, change "(VA+VB)/2 Vr7." to -- (VA+VB)/2+Vr7. --.
Col. 12, line 51, change "60low," to -- 60a low, --.
Col. 12, line 52, change "60high" to -- 60g high --.
Col. 14, line 17, change "comparators 39" to -- comparator 39 --.
Col. 15, line 17, change "28" to -- 2B --.
Col. 17, lines 55-59, change the formulas from "$VA=a1+b \cdot 1niA$      $VC2=a4+b \cdot 1niC2$
$VB=a2+b \cdot 1niB$      $VC3=a5+b \cdot 1niC3$
$VC1=a3+b \cdot 1niC1$    $VC4=a6+b \cdot 1niC4$"
                to
-- $VA=a1+b \cdot \ell niA$      $VC2=a4+b \cdot \ell niC2$
$VB=a2+b \cdot \ell niB$      $VC3=a5+b \cdot \ell niC3$
$VC1=a3+b \cdot \ell niC1$    $VC4=a6+b \cdot \ell niC4$ --.

UNITED STATES PATENT AND TRADEMARK OFFICE
CERTIFICATE OF CORRECTION

PATENT NO. : 4,786,935  Page 2 of 3
DATED : November 22, 1988
INVENTOR(S) : Shingo Hayakawa et al.

It is certified that error appears in the above-identified patent and that said Letters Patent is hereby corrected as shown below:

Col. 20, line 30, change "highe" to -- higher --.
Col. 21, line 12, change "object that is" to -- objects that are --.
Col. 21, line 13, change "tends" to -- tend --.
Col. 22, line 18, change "ontrol" to -- control --.
Col. 23, line 1, change "produces" to -- produce --.
Col. 23, line 26, change "210 and 211 denote AND gate;" to -- 210 and 211 denote AND gates; --.
Col. 24, line 48, change "g te" to -- gate --.
Col. 25, line 67, change "-vrl2," to -- -Vrl2, --.
Col. 28, line 51, change "(105)" to -- (1-5) --.
Col. 29, line 54, change "(VA+VB+VC)/3 Vrl1." to -- (VA+VB+VC)/3-Vrl1. --.
Col. 31, line 13, change "V1-V2=(VA+VB+VC)3" to -- V1-V2=(VA+VB+VC)/3 --.
Col. 31, lines 29-30, change "(VP4 0 VP3" to -- (VP4<0<VP3 --.
Col. 31, line 67, change "becomes" to -- become --.
Col. 32, line 55, change "15(c," to -- 15(c), --.
Col. 34, line 68, change "(VA-VB+VC)/3+Vrl4." to -- (VA+VB+VC)/3+Vrl4. --.
Col. 37, line 10, change "ment," to -- ments, --.
Col. 37, line 18, change "is" to -- are --.
Col. 37, lines 33-38, change the formulas from
"VA=a1+b·lniA     VC2=a4+b·lniC2
 VB=a2+b·lniB     VC3=a5+b·lniC3
 vc1=a3+b·lniC1   VC4=a6+b·lniC4"
                to
-- VA=a1+b·$\ell$niA     VC2=a4+b·$\ell$niC2
   VB=a2+b·$\ell$niB     VC3=a5+b·$\ell$niC3
   VC1=a3+b·$\ell$niC1   VC4=a6+b·$\ell$niC4 --.
Col. 37, line 56, change "fromanother" to -- from another --.
Col. 38, line 35, change "vC2," to -- VC2, --.
Col. 40, line 9, change "object" to -- objects --, and "is" to -- are --.
Col. 40, line 10, change "tends" to -- tend --.
Col. 41, line 54, change "lkewise" to -- likewise --.
Col. 43, line 7, change "gatc" to -- gate --.
Col. 43, line 66, change "terminal" to -- terminals --.

UNITED STATES PATENT AND TRADEMARK OFFICE
CERTIFICATE OF CORRECTION

PATENT NO. : 4,786,935
DATED : November 22, 1988
INVENTOR(S) : Shingo Hayakawa et al.

It is certified that error appears in the above-identified patent and that said Letters Patent is hereby corrected as shown below:

Col. 44, line 68, change "remains" to -- remain --.
Col. 45, line 9, change "voltagc" to -- voltage --.
Col. 45, line 50, change "Therefore." to -- Therefore, --.
Col. 45, line 61, change "V1-V2=(VA=VB=VCO/3-Vrl6" to -- V1-V2=(VA=VB=VCO)/3-Vrl6 --.
Col. 46, line 55, after "follows" insert -- : --.
Col. 47, line 45, change "(b 2-2)" to -- (2-2) --.
Col. 49, line 15, change "ing" to -- ly --.
Col. 49, line 53, change "(2-g)" to -- (2-6) --.
Col. 51, line 20, change "objects" to -- object --.
Col. 52, line 54, before "circuit" insert -- The --.
Col. 53, line 65, change "66" to -- $\Delta$ --.
Col. 54, line 17, change "386 390" to -- 386, 390 --.
Col. 54, line 60, change "4-1" to -- 401 --.
Col. 55, line 14, change "V1=V2" to -- V1-V2 --.
Col. 56, line 31, change "gate 394" to -- gates 394 --.
Col. 58, line 11, change "functions" to -- function --.
Col. 58, line 24, before "dividing" insert -- of --.
Col. 58, line 57, change "smaller area," to -- smaller areas, --.
Col. 60, line 48, change "lumiannce" to -- luminance --.
Col. 60, line 60, change "formual" to -- formula --.

Signed and Sealed this

Fourth Day of July, 1989

Attest:

DONALD J. QUIGG

Attesting Officer

Commissioner of Patents and Trademarks